April 19, 1960 G. C. ELLERBECK 2,933,247
SHORT-CUT MULTIPLYING MACHINE
Filed Feb. 1, 1955 21 Sheets-Sheet 1

April 19, 1960
G. C. ELLERBECK
2,933,247
SHORT-CUT MULTIPLYING MACHINE
Filed Feb. 1, 1955
21 Sheets-Sheet 6
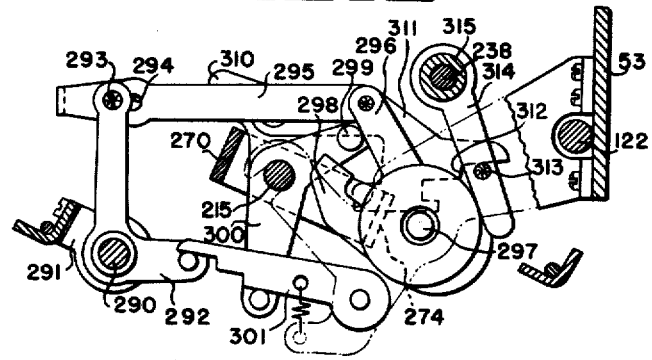
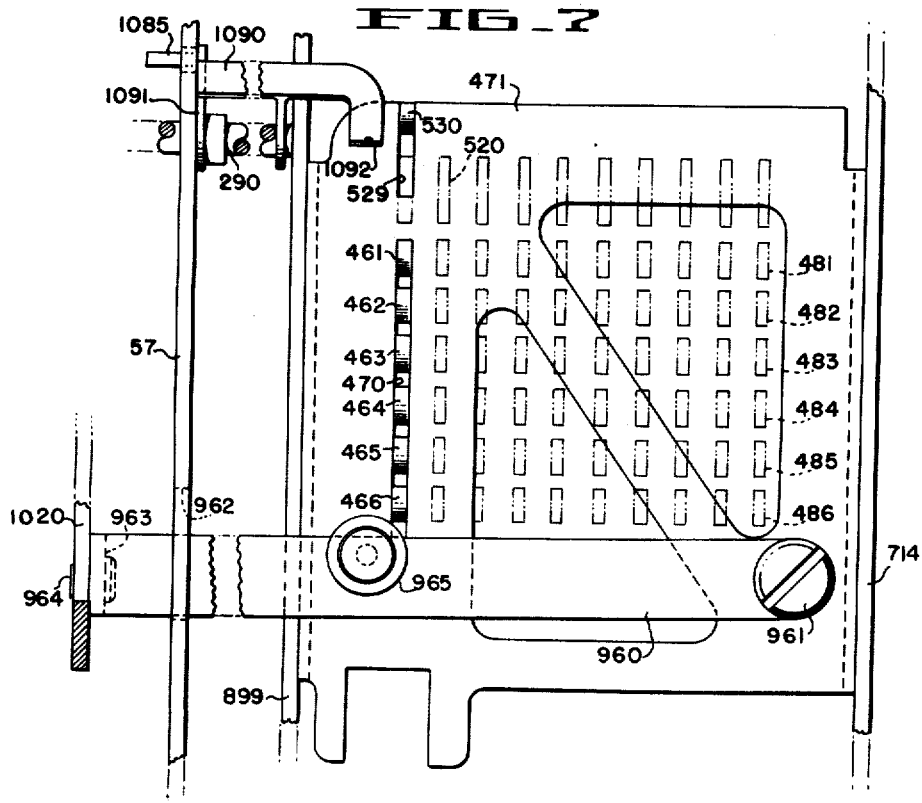

April 19, 1960 G. C. ELLERBECK 2,933,247
SHORT-CUT MULTIPLYING MACHINE
Filed Feb. 1, 1955 21 Sheets-Sheet 7
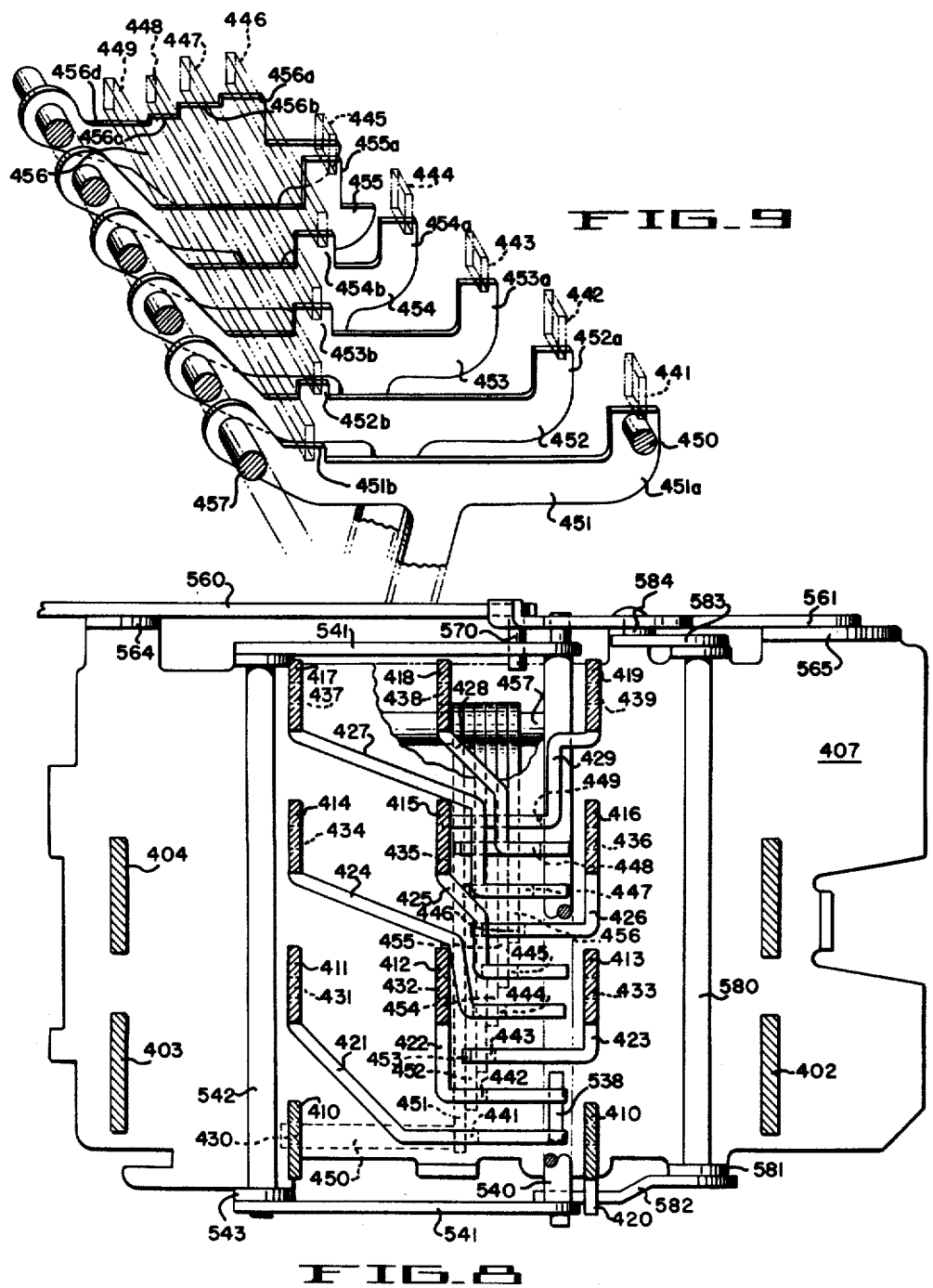

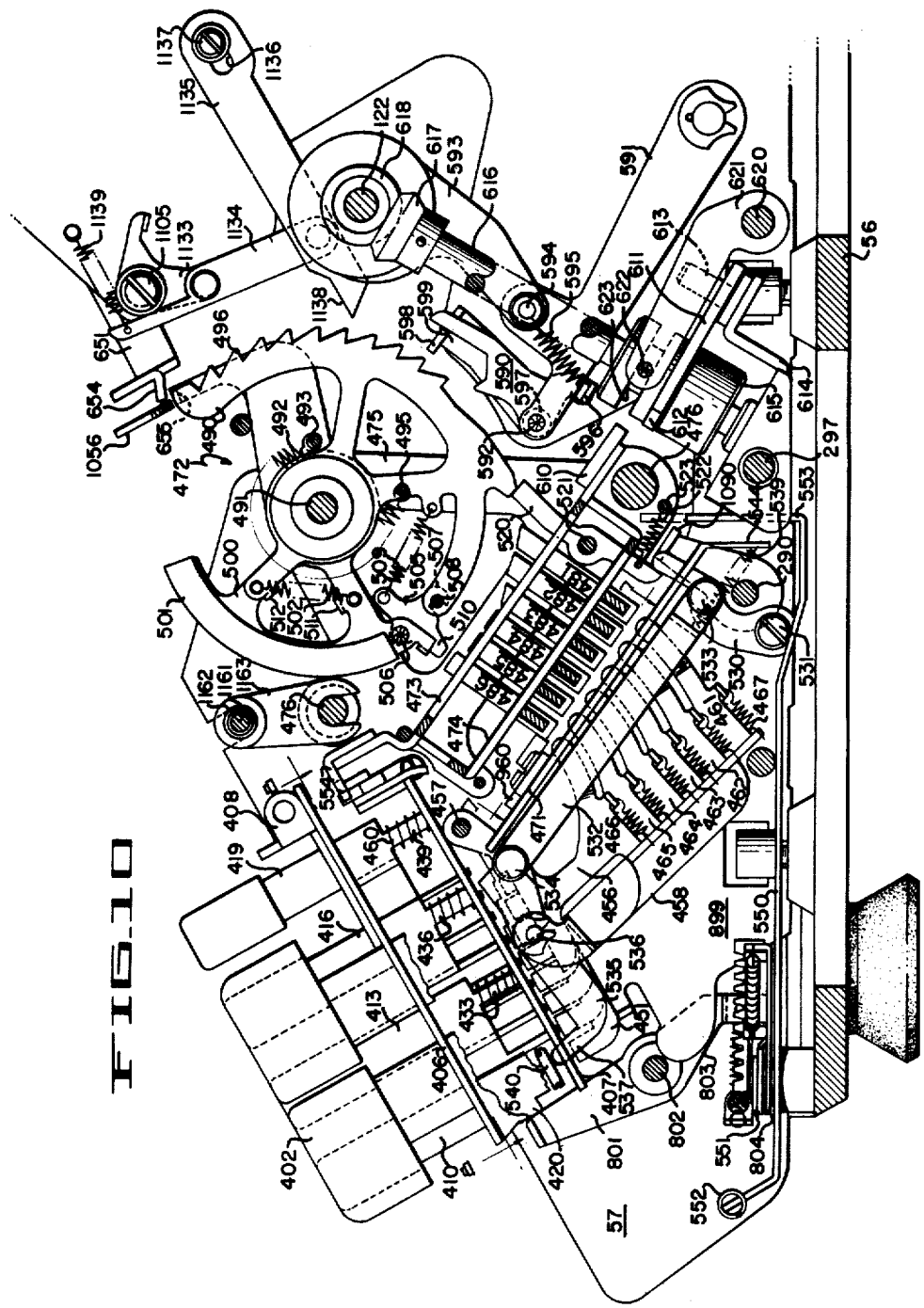

April 19, 1960 G. C. ELLERBECK 2,933,247
SHORT-CUT MULTIPLYING MACHINE
Filed Feb. 1, 1955 21 Sheets-Sheet 9
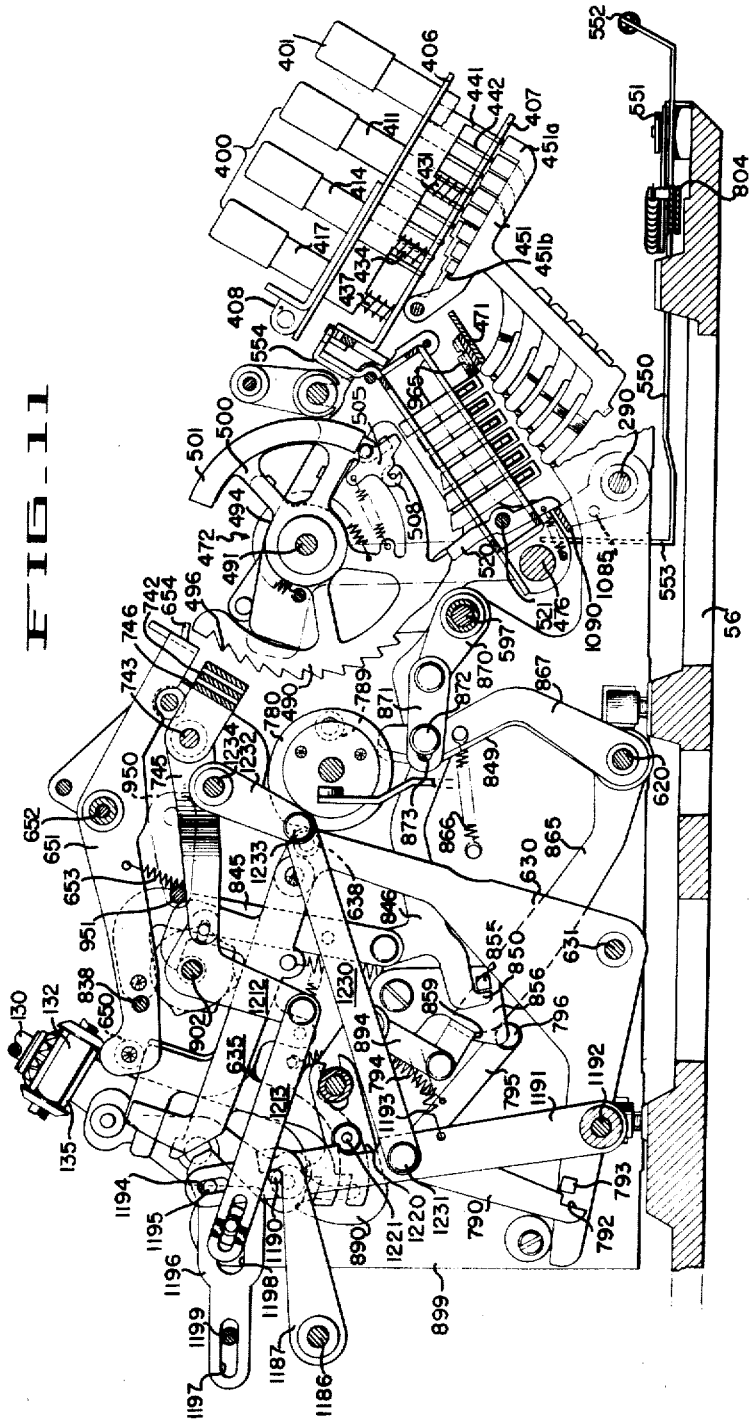
FIG_11

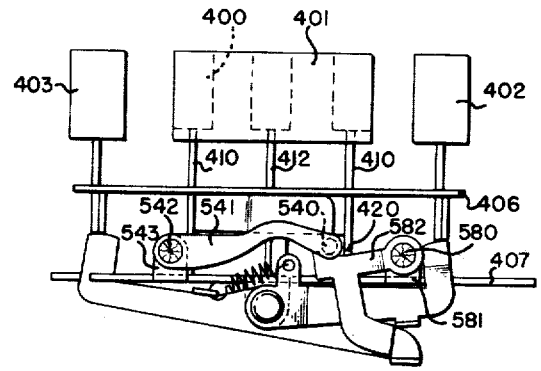
FIG_12
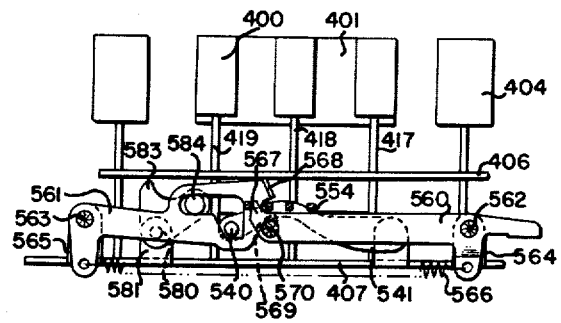
FIG_13
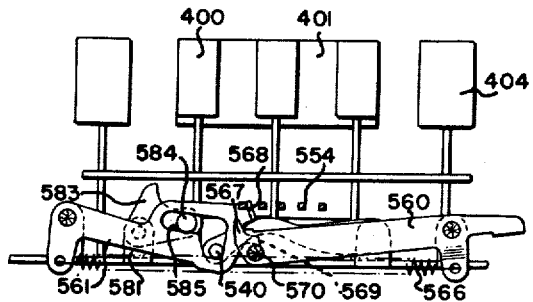
FIG_14

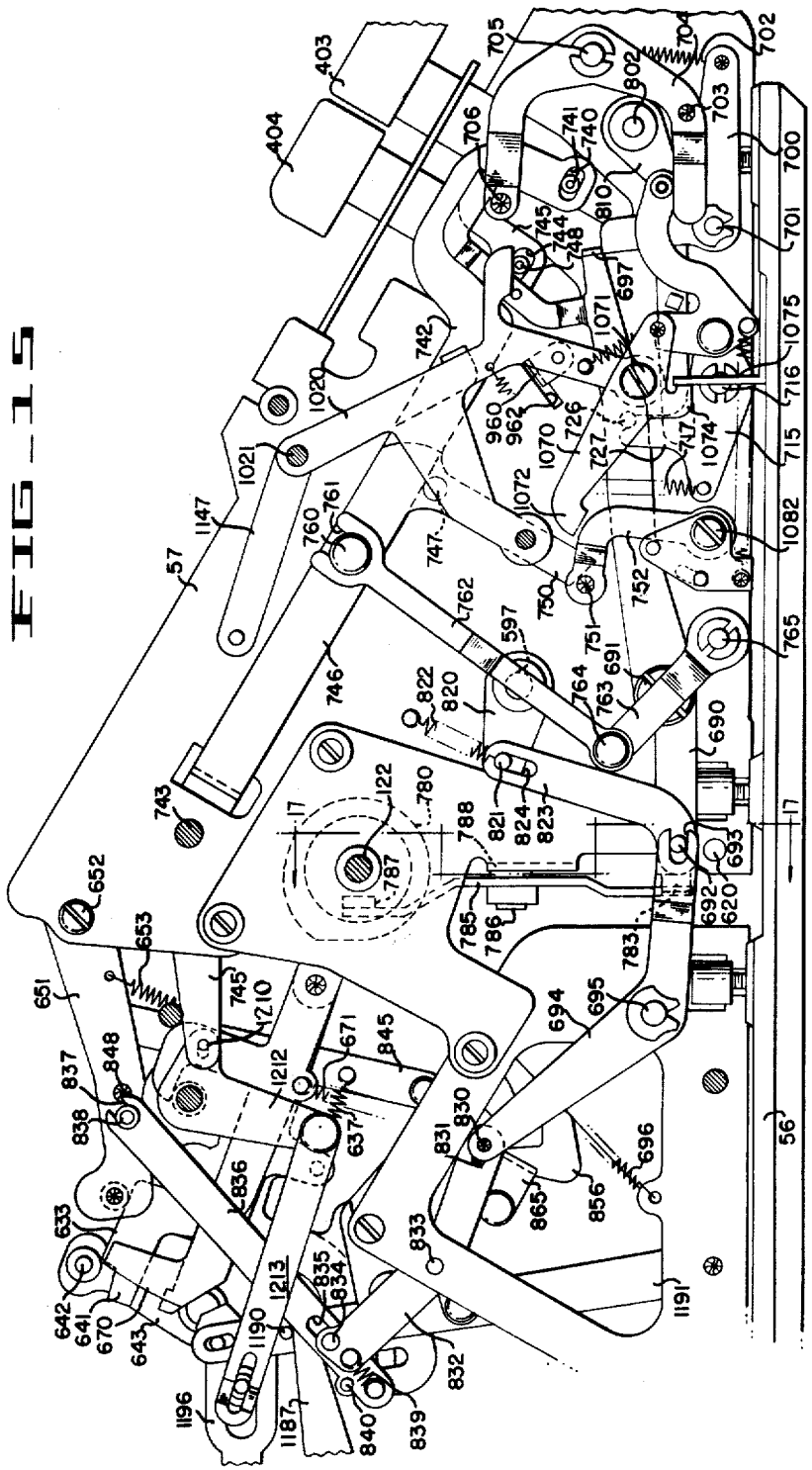

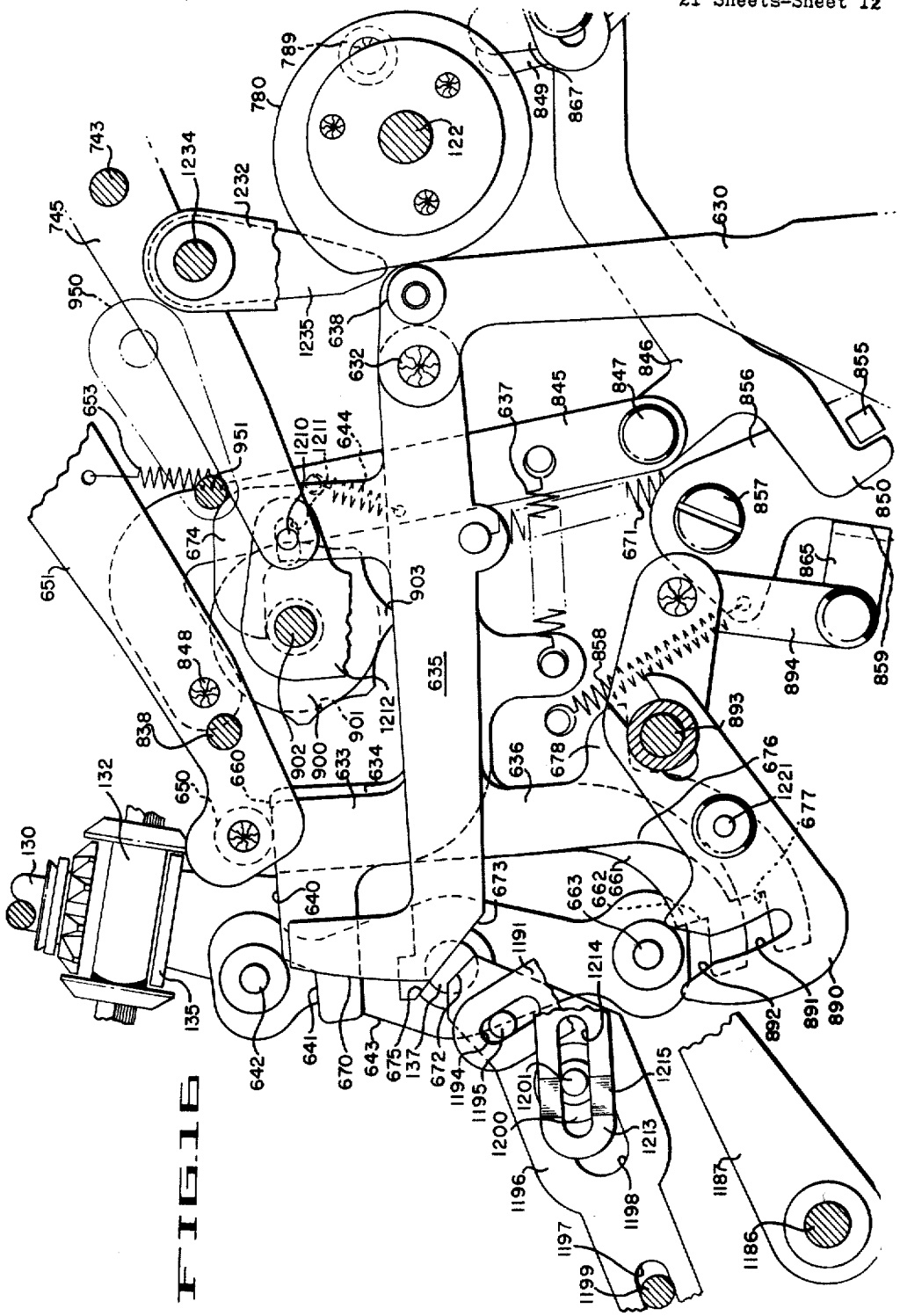

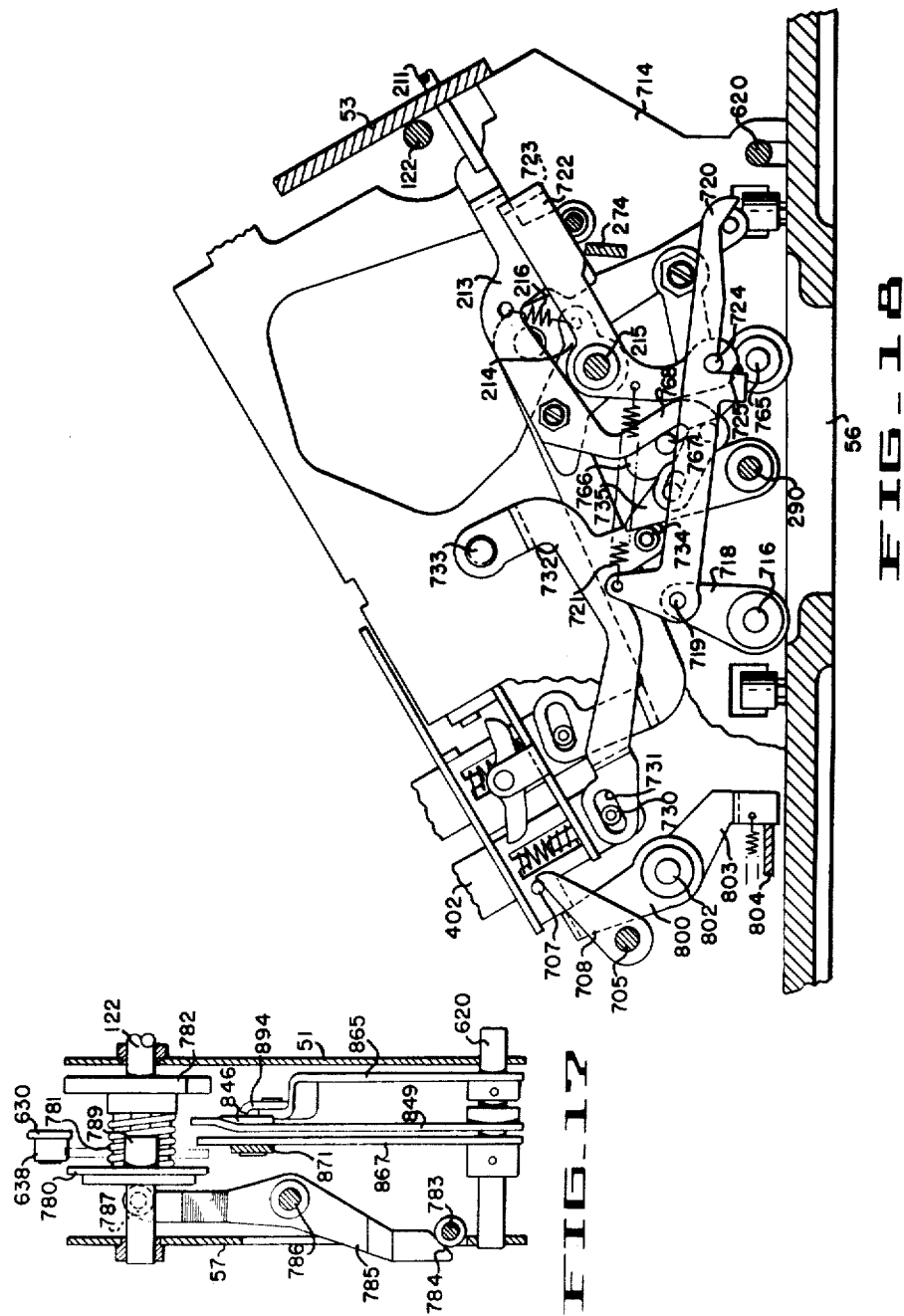

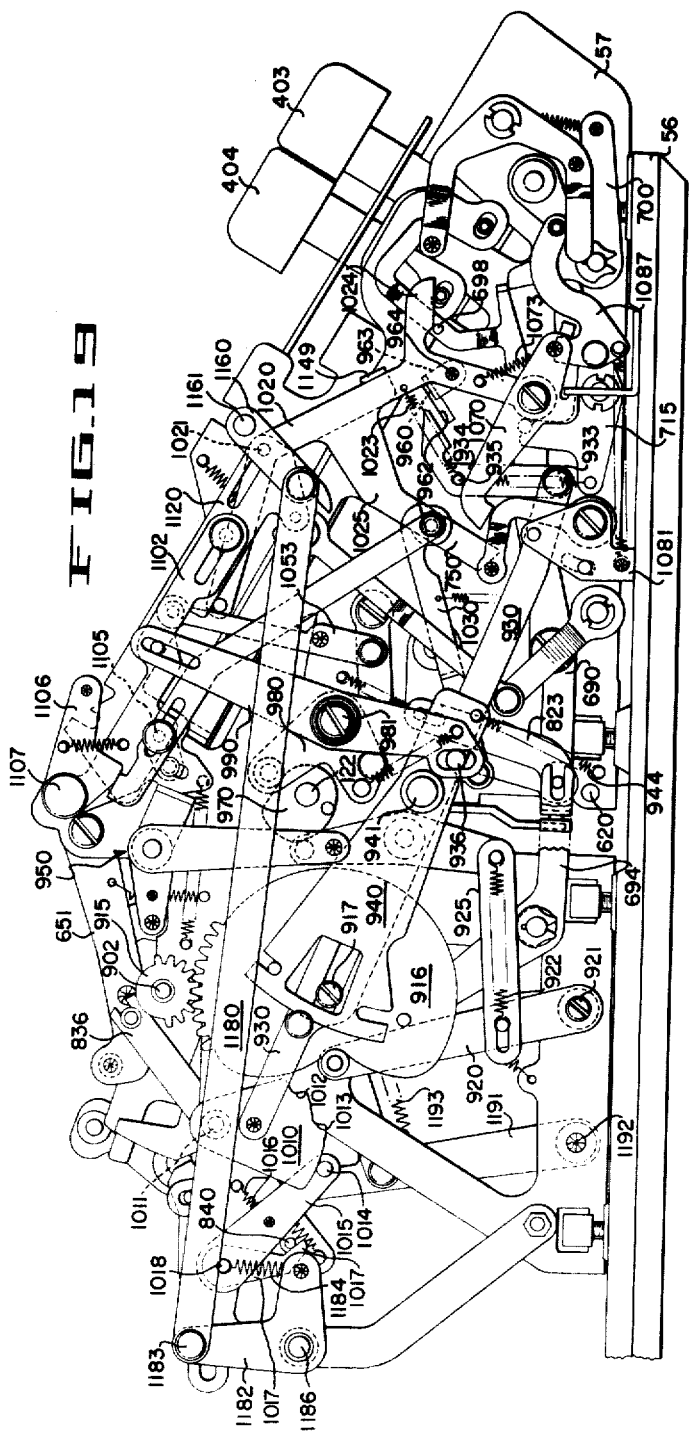

April 19, 1960 G. C. ELLERBECK 2,933,247
SHORT-CUT MULTIPLYING MACHINE

Filed Feb. 1, 1955

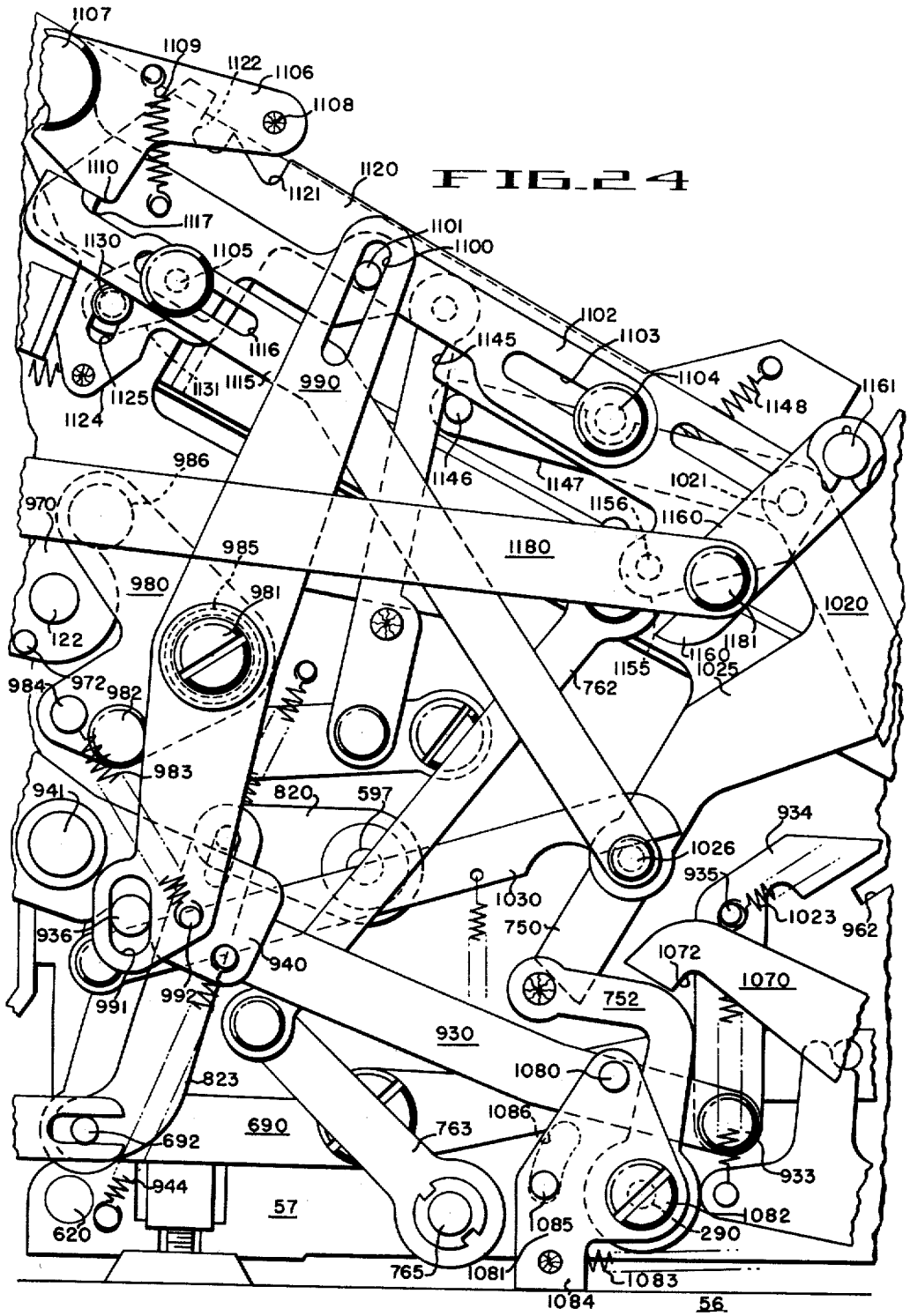

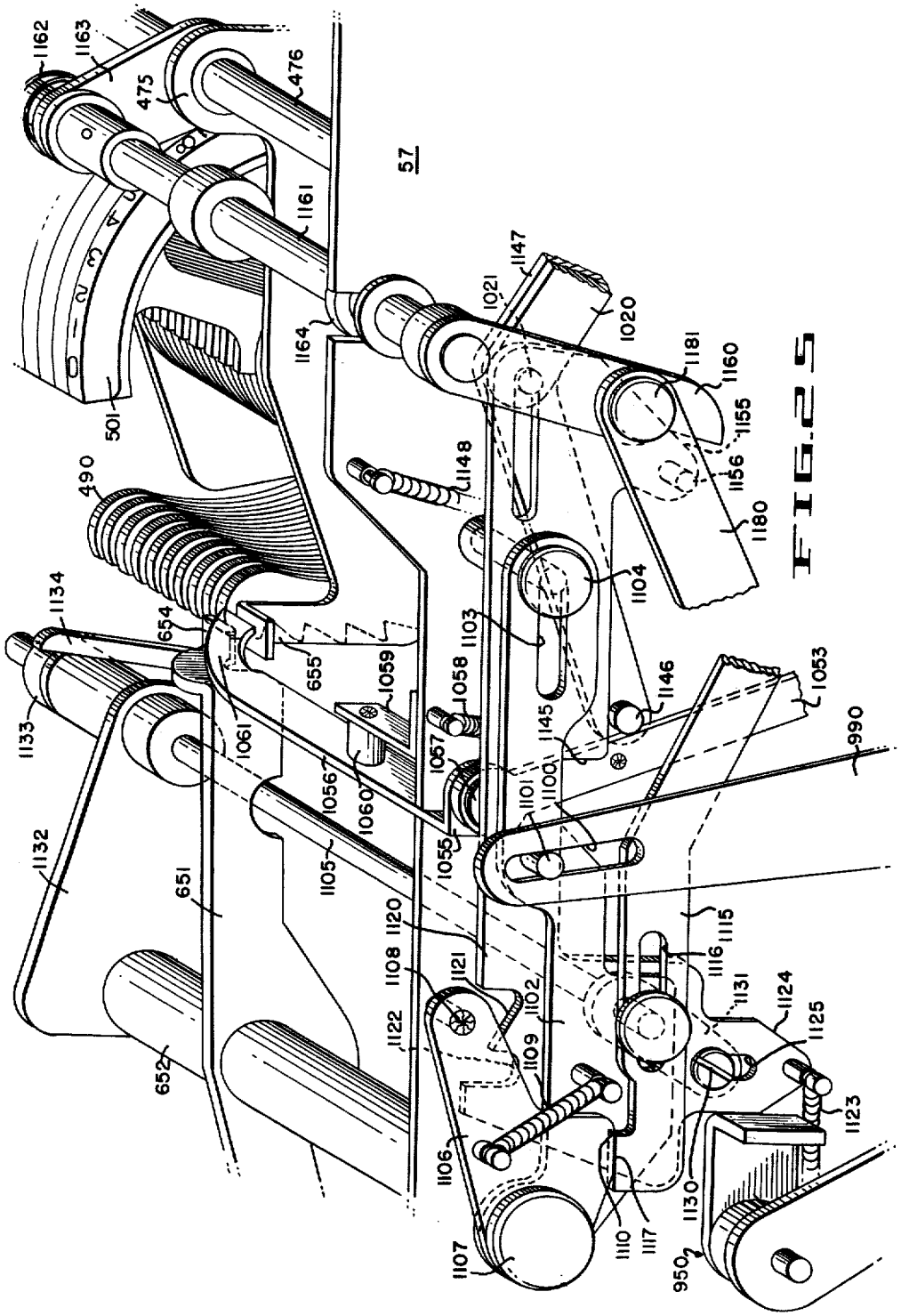

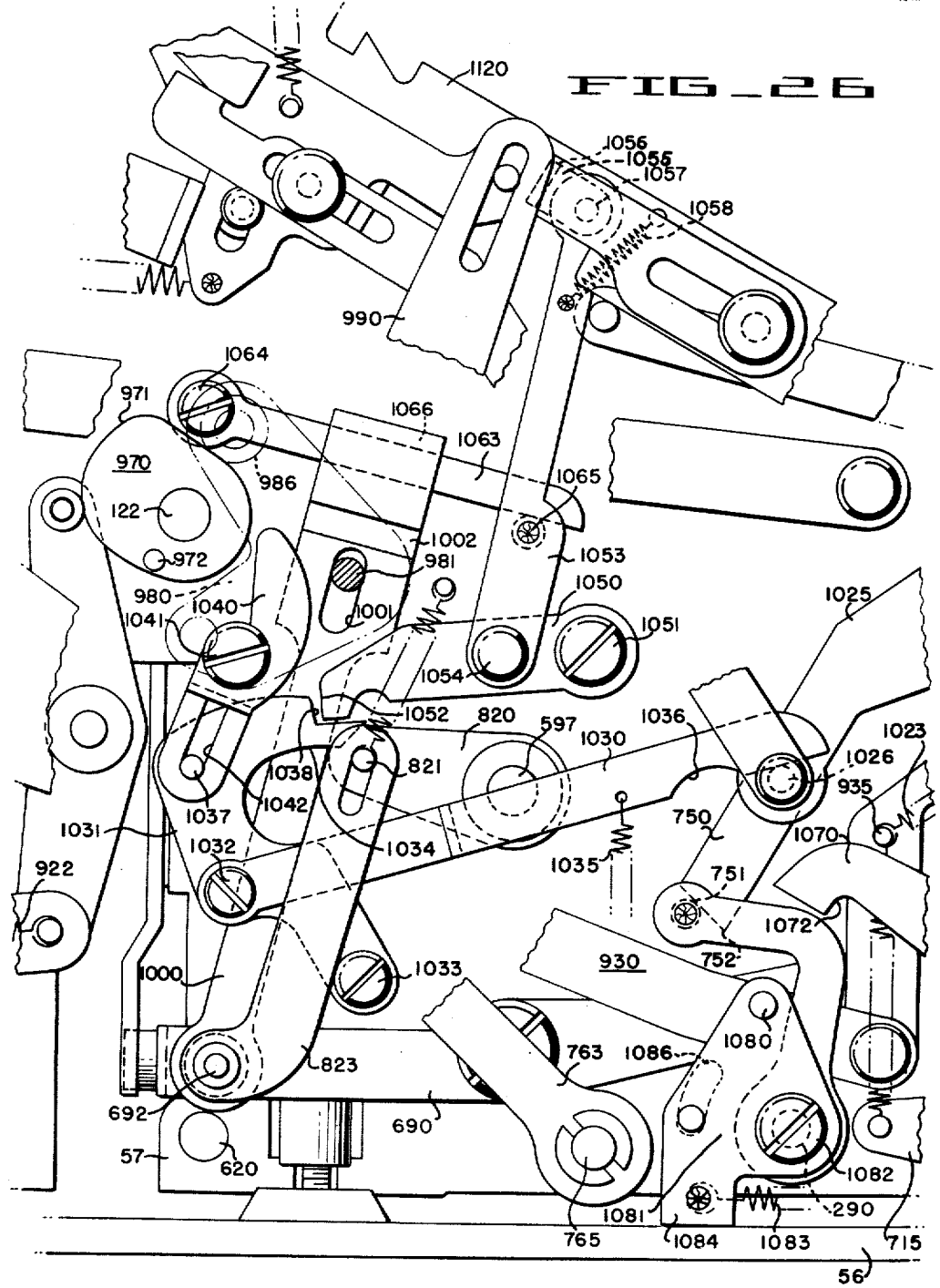

United States Patent Office 2,933,247
Patented Apr. 19, 1960

2,933,247

SHORT-CUT MULTIPLYING MACHINE

Grant C. Ellerbeck, San Leandro, Calif., assignor to Friden, Inc., a corporation of California Application February 1, 1955, Serial No. 485,393

21 Claims. (Cl. 235—63)

INDEX

| | Column |
|---|---|
| 1. General aspects of operation | 5 |
| 2. Machine frame | 6 |
| 3. Carriage | 7 |
| 4. Tens-transfer mechanism | 7 |
| 5. Selection mechanism | 7 |
| 6. Accumulator drive | 9 |
| 7. Counter actuator | 10 |
| 8. Register clearing mechanisms | 10 |
| 9. Carriage shift | 11 |
| 10. Left shift terminating mechanism | 12 |
| 11. Shift and clear programming mechanism | 14 |
| 12. Multiplier keyboard | 15 |
| 13. Multiplier control segments | 18 |
| 14. "0" Latch | 19 |
| 15. Multiplier carriage escapement mechanism | 20 |
| 16. Segment feed mechanism | 22 |
| 17. Multiplier carriage shifting mechanism | 23 |
| 18. Multiplier control mechanism | 24 |
| 19. Preliminary shifting and clearing controls | 29 |
|    a. Shift the gate setting cam to its operative position | 30 |
|    b. Enable segment feed pawl | 31 |
|    c. Condition carriage shifting mechanisms | 32 |
| 20. Centralizing computation controls during shifting | 35 |
| 21. Operation controls—General | 36 |
|    A. Normal operation controls | 39 |
|    B. Extra cycle mechanism | 47 |
|    C. Cycle-reducing mechanism | 49 |
|    D. Final corrective cycle mechanism | 52 |
|    E. Tripping "0" latch | 56 |
| 22. Operation | 58 |

This invention relates to calculating machines and is concerned particularly with the provision of an improved mechanism for performing plural order multiplication operations automatically.

It is a primary object of the present invention to provide an improved and faster automatic mechanism for performing plural order multiplication problems, using what is commonly known as the "shortcut" method. Most automatic calculating machines utilize the "repeated addition" system of multiplication in which a factor is added a number of times in each order corresponding to the multiplier digit value for that order. Thus, if the multiplier is "92," the multiplicand is added twice with the register in its home, or units order, position; the carriage shifted one order; and the multiplicand then added nine times in the next ordinal position. While this method is the most simple, and therefore generally provides the most trouble-free operation, it is subject to the drawback that a multiplier factor of "9" requires nine cycles of operation, a multiplier value of "8" requires eight cycles of operation, etc. Expert calculator operators long ago, in the days of manual operation and antedating the automatic multiplying machines now available, learned to multiply by the "short-cut" method in which values of "6" or greater were handled by subtracting the tens-complement of the value in the particular order and then adding a value of "1" in the next higher order. In this system, a multiplier factor of "92" would be handled by two additive cycles in the lowest order, shifting the carriage one order, then subtracting once in the second, or tens, order, shifting the carriage to the third, or hundreds, ordinal position, and finally adding once. Various machines have endeavored to adapt the short-cut method to the automatic multiplication machines, although such mechanisms are very complicated and often require very careful adjustment with resultant heavy manufacturing and upkeep costs. My invention is directed to a new and improved mechanism for automatic shortcut multiplication which can be constructed as simply and sturdily as the "repeated addition" systems of the past, but which will operate at the higher speeds incidental to shortcut operation.

Another object of the present invention is to provide a shortcut multiplication mechanism which provides automatically an additional cycle of operation in the higher order whenever the multiplier value in the adjacent lower order requires operation in the reverse direction (conventionally a value of "6" to "9") and the value in the higher order necessitates operation in the selected direction (conventionally "1" to "5") or is "0"; which drops a cycle of operation in the higher order whenever the multiplier values in two adjacent orders require operation in the reverse direction in both orders (for example, multiplying by "88" requires two subtractive cycles in the lowest order; a single subtractive cycle in the next higher, or tens, order; and single additive cycle in the third, or hundreds, order); and enables the correct number of cycles in the higher order whenever the multiplier value in the adjacent lower order necessitates operation in the selected direction, regardless of whether operation in the higher order is in the selected direction or in the reverse direction. That is, one of the objects of the present invention is to provide a mechanism which automatically adds an additional cycle of operation in a higher order whenever the machine changes from operation in the reverse direction (generally subtraction) to operation in the selected direction (usually addition); which eliminates a cycle of operation in the higher order whenever the operation in both orders is in the reverse direction; and which neither adds nor subtracts a cycle of operation in the higher of any two orders whenever operation in the lower of the two requires operation in the selected direction.

Another important object of the present invention is to provide an improved shortcut multiplication mechanism which is operable in either positive or negative multiplication—these terms being used, respectively, as indicating conventional multiplications by repeated additive cycles in order to add one product to another, and the reverse operation of repeated substraction when it is desired to subtract a second product from the first. It will be recognized that in positive multiplication the values "1" to "5" will cause adding, or positive, operation while the larger values of "6" to "9" will cause subtractive operation a number of times corresponding to the tens-complement of the multiplier value, and that the result gives the true product of the factors multiplied; and that negative operation involves the repeated subtraction for the lower multiplier values of "1" to "5" and addition (equal to the tens-complement of the digit) for the larger values of "6" to "9." In each case, a single cycle in the selected direction is required in the order above the highest multiplier digit whenever operation in that highest order is in the direction opposite to that selected, i.e., when operation in the highest order is subtractive in a conventional, or positive, multiplication operation; or additive in a negative one. It will be understood that a shortcut multiplication mechanism for positive multiplication only would be much simpler than one which is adapted to perform both positive and negative multiplication. In the first system, it is merely necessary to set the machine for addition or subtraction according to the multiplier value of a particular order (invariably operate additively for multiplier values of "1" to "5" and invariably operate subtractively for multiplier values of "6" to "9"). On the other hand, in a machine for both positive and negative multiplication, the setting must be the result of two factors: the operator selected control key and the automatic selection from the multiplier value, for the machine runs in an additive direction when the multiplier value is "1" to "5" for conventional (additive) multiplication and when the multiplier value is "6" to "9" in negative (subtractive) multiplication; and in the negative direction whenever the multiplier value is "6" to "9" in conventional multiplication or the multiplier value is "1" to "5" in negative multiplication.

A further object of the present invention is to provide an improved multiplying mechanism for a unidirectional, rotary calculating machine; which multiplying mechanism embodies a plural order multiplier mechanism operative to control the entry of the product into a product register either additively or subtractively at the will of the operator.

Another important object of the present invention is to provide an improved multiplying mechanism in which the character of the operation (in a selected or in the reverse direction) is determined by the entry of the multiplier value into the multiplier mechanism (at the time the value is entered); and the selected direction (positive for the entry of the true product, or negative for the entry of the complement thereof) is determined by the operation of control keys thereafter. It can be mentioned that the program of operations in either positive or negative multiplication, by the shortcut method of my invention, is the same regardless of whether the true product or the complement thereof is desired, and this program is set in the machine by the entry of the multiplier value; and the direction of operation is determined by the operator by the depression of the positive or negative multiplier control keys.

Another object of the present invention is to provide an improved calculating machine capable of carrying out the foregoing objects and in which all of the power driven operations are performed by a single train of power flow from a motor, and utilizing unidirectional actuating means, whereby the machine can operate continuously and uninterruptedly throughout the calculating operation.

Another aspect of the present invention is to provide an improved means for setting the tens-complement of a value in a multiplication mechanism and simultaneously setting a control means to effect a reverse operation of the machine during operation in that order.

Another important object of the present invention is to provide means for reducing the setting of a multiplier control segment, such as shown in the patents to Friden, Nos. 2,371,752 and 2,399,917, by a single step of movement during a shifting of the multiplier carriage, in order to reduce the cycles of operation in the new order when required by the nature of the problem, as in operation in a reverse direction in both of two adjacent orders.

Another important object of the present invention is to provide means for disabling the feed pawl for a multiplier control segment for a single cycle of machine operation, in order to secure an additional cycle of operation in the new order when required in certain operations, as in operation in a selected direction following an order in which reverse operation was utilized.

Another object of the present invention is to provide a control means set by the "0" key which is effective in certain operations to cause shifting of the carriage without a cycle of operation and in other situations to provide for a single cycle of operation in that order, as required by the conditions of the multiplication operation.

Another object of the present invention is to provide an automatic mechanism operative to supply an extra cycle of machine operation after return of the multiplier mechanism to its home, or inoperative, position whenever operation in the highest order is in the reverse direction.

These and other objects of the invention will be apparent from a consideration of the following description, which will be readily understood by reference to the drawings forming a part hereof and in which:

Fig. 6 is a right side view showing the details of the power operated mechanism for programming a shifting and clearing operation in the machine shown in Fig. 1, the view being taken on a plane substantially as indicated by the line 6—6 of Fig. 4.

Fig. 7 is a plan view of a portion of the multiplier setting mechanism of my invention, being taken on the oblique plane indicated by the line 7—7 of Fig. 10.

Fig. 8 is a plan view of the multiplier keyboard of my invention, taken immediately under the top frame plate, substantially on the plane indicated by the line 8—8 of Fig. 10.

Fig. 9 is an exploded detail view of the multiplier setting arms shown in plan view in Fig. 8.

Fig. 10 is a right side view of the multiplier mechanism of the present invention, taken on a plane immediately to the left of the left frame plate, substantially on the plane indicated by line 10—10 of Fig. 1.

Fig. 11 is a left side view of the multiplier setting mechanism of my invention, and certain controls associated therewith, being taken on a plane substantially that indicated by the line 11—11 of Fig. 1.

Fig. 12 is a front view of the multiplier keyboard, showing particularly a front view of the escapement mechanism.

Figs. 13 and 14 are rear views of the multiplier keyboard, showing particularly the escapement mechanism associated therewith—Fig. 13 showing the escapement mechanism in its normal position and Fig. 14 showing the same elements during operation of the escapement mechanism.

Fig. 15 is a left side view of the machine of my invention, taken immediately to the left of the left control plate, as along a longitudinal vertical plane indicated by the line 15—15 in Fig. 1.

Fig. 16 is an enlarged detail view of the rear portion of the mechanism shown in Fig. 15, with certain parts broken away to show particularly the means for setting the computation control mechanism in a multiplication operation.

Fig. 17 is a front view of certain elements shown in partial side view in Fig. 15, and particularly the means for setting the computation control mechanism in multiplication, such as taken along the plane indicated by the lines 17—17 of Fig. 15.

Fig. 18 is a longitudinal vertical view of multiplier control elements taken on a plane slightly to the right of that of Fig. 10.

Fig. 19 is a left side view of the machine of my invention, taken to the left of the plane of Fig. 15, showing additional control mechanisms mounted to the left, or on the outside, of the parts shown in Fig. 15.

Fig. 24 is an enlarged detail view of the mechanisms shown in the central portion of Fig. 19.

Fig. 25 is a perspective view of the elements located in the upper part of Fig. 24.

Fig. 26 is an enlarged detail view of mechanisms lying behind those shown in Fig. 24.

1. GENERAL ASPECTS OF OPERATION

Figure 1:
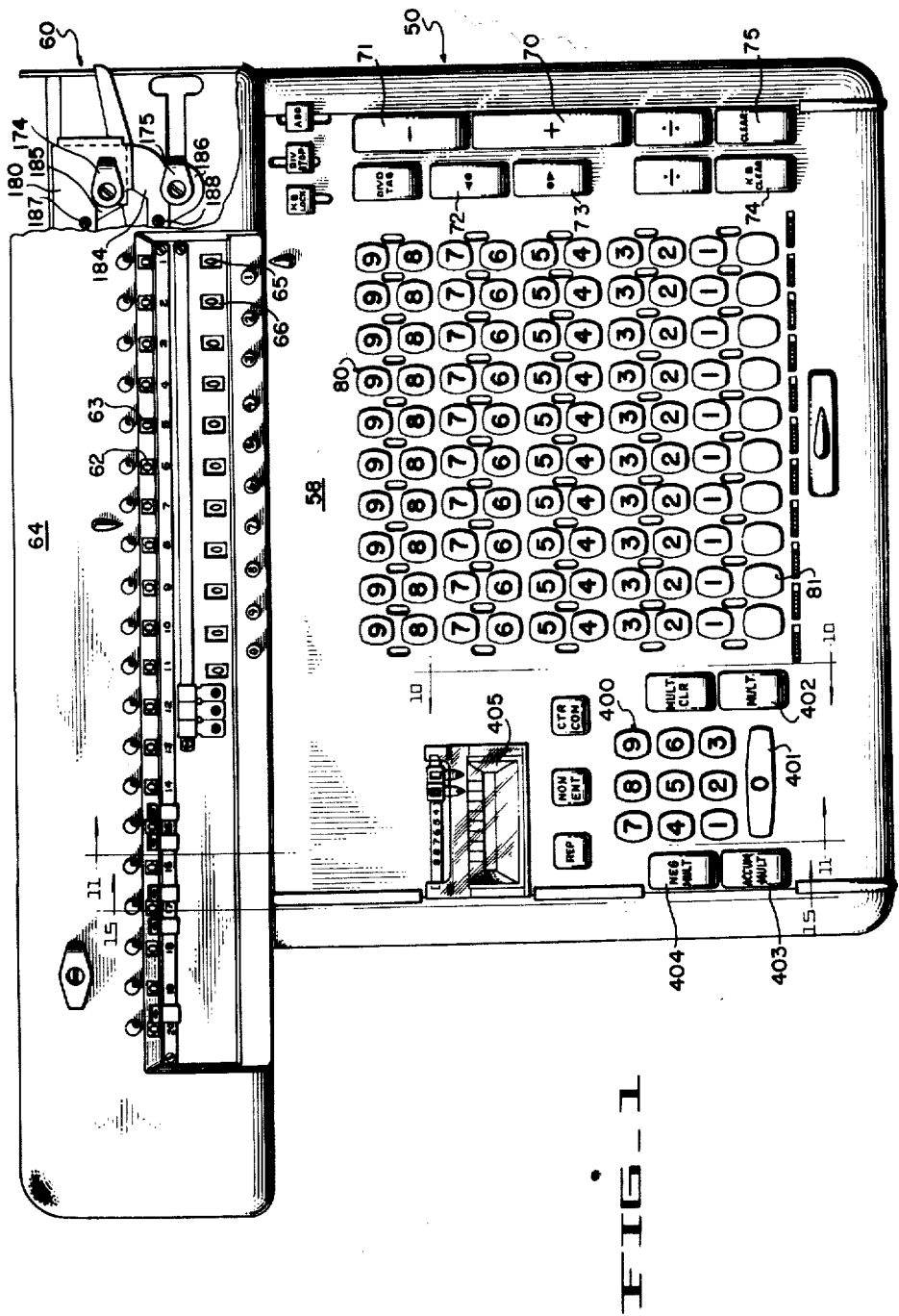
Fig. 1 is a plan view of the machine manufactured and sold under the patents to Friden above-mentioned, which is the machine with which my invention is preferably associated.

In my invention, the shortcut multiplication mechanism operates either additively or subtractively with equal facility. In the former instance a true product is secured, which will be added to any value previously standing in the accumulator, or product register. In the second instance the tens-complement of the product is secured, which is most often used to subtract one product from a value previously standing in the product register, as when it is desired to take discounts from a previous accumulation. Additive multiplier values of "1" to "5" are handled by repeated addition from one to five times, respectively, while values of "6" to "9" are handled by repeated subtraction a number of times corresponding to the tens-complement of the multiplier value and adding once in the next higher order. For example, a multiplier value of "95" would be handled by five cycles of addition in the lower order followed by a single subtraction in the second, or tens, order, and that, in turn, is followed by a single additive cycle in the third, or hundreds, order. It will be understood that "95" is the equivalent of 100−10+5.

Conversely, in negative operation, the machine operates in repeated subtraction for multiplier values of "1" to "5" and repeated addition for multiplier values of "6" to "9." Thus, if the product of "95" and any multiplicand value is to be subtracted from a previous accumulation, then the complement of the product is desired, and, in the machines described in the patents above mentioned, the negative multiply key would be depressed. In such a subtractive, or negative, multiplication the "5" value of the multiplier is handled by repeated subtraction of the multiplicand for five cycles of operation in the lowest order, followed by a single additive cycle in the second, or tens, order, and that, in turn, is followed by a single negative, or subtractive, cycle of operation in the third, or hundreds, order—the −95 being the equivalent of −100+10−5.

In either event, it will be noted that the values of "1" to "5" are handled by repeated cycling of the machine with the accumulator, or product register, set for the accumulation of values in the direction determined by the control key depressed (additively or subtractively, respectively); and that values of "6" to "9" are handled by repeated cycling of the machine a number of times equivalent to the tens-complement of the multiplier value, with the accumulator set for operation in the reverse direction (for subtraction or addition subtractively), followed by a corrective operation in the next higher order. In view of the fact that this machine is designed for both positive and negative multiplication, it would be confusing to refer to multiplication of values from "1" to "5" as additive cycles and those of from "6" to "9" as subtractive cycles, for those designations would be true only of positive multiplication. Therefore, in order to avoid confusion, the term "selected direction" will be used to indicate the operation controlled by the "1" to "5" multiplier values (which will be addition in positive multiplication and subtraction in negative multiplication); and "reverse direction" will be used to indicate the operation controlled by the multiplier values of "6" to "9" (which will be subtraction in positive multiplication and addition in negative multiplication).

This shortcut system of multiplication requires certain automatic controls for controlling the corrective operation in the next higher order above mentioned, which corrective operation varies according to the various situations that may arise. Specifically, the following situations arise where adjustment of the normal multiplier controls is required:

(1) An extra cycle must be taken in any order in which operation is in the selected direction when operation in the preceding order was in the reverse direction (i.e., must add "1" in positive multiplication when operation in the preceding order was subtraction of a complement and vice versa in negative multiplication).

(2) On the other hand, the machine must take one less cycle than the tens-complement of the multiplier value when operating in the reverse direction and operation in the preceding order was also in the reverse direction (i.e., must drop a subtractive count in subtraction when the operation of the previous order was subtraction, in positive multiplication, and the reverse in negative multiplication). For example, in positive operation, for multiplying by a value of "189," the machine must subtract once in the lowest order, must subtract once in the second order, and must add twice in the third order.

(3) The machine must shift and operate for a single cycle in the selected direction when the highest order of operation was in the reverse direction, but must not do so when the operation in the highest order was in the selected direction (in positive multiplication, the machine must shift and add once when the highest multiplier value is "6" to "9," but must not do so when the value is "1" to "5").

(4) In order to handle these various conditions, a "0" must be considered as a positive number so that a "0" in the order above a value of "1" to "5" is handled in the conventional way of shifting the carriages an additional step without operating the accumulator. However, when the value in the order below the "0" is "6" to "9," an extra count is required, as indicated in the example of multiplying by a value of "95" above mentioned.

It is, therefore, necessary, in the present invention, to provide devices associated with the multiplier mechanism of the type described in the above-mentioned patents, for controlling the entry of a multiplicand value an extra time in any order whenever an operation in the adjacent lower order is in the reverse direction; to automatically omit a cycle of operation in the reverse direction whenever the operation in the preceding order is in the reverse direction; and to shift the product and multiplier carriages an additional step when a "0" stands in the multiplier factor if the operation in the preceding order was in the selected direction, but to enter the multiplicand value once in the selected direction if the operation in the next lower order was in the reverse direction.

The present invention is shown, for purposes of exemplification, as applied to the present Friden automatic calculating machine, which machine is constructed in accordance with the patent to Carl M. Friden No. 2,229,889 of January 28, 1941, as modified by a multiplying mechanism shown and described in the patents to Carl M. Friden, Nos. 2,371,752 of March 20, 1945, and 2,399,917 of May 7, 1946.

2. MACHINE FRAME

Figure 3:
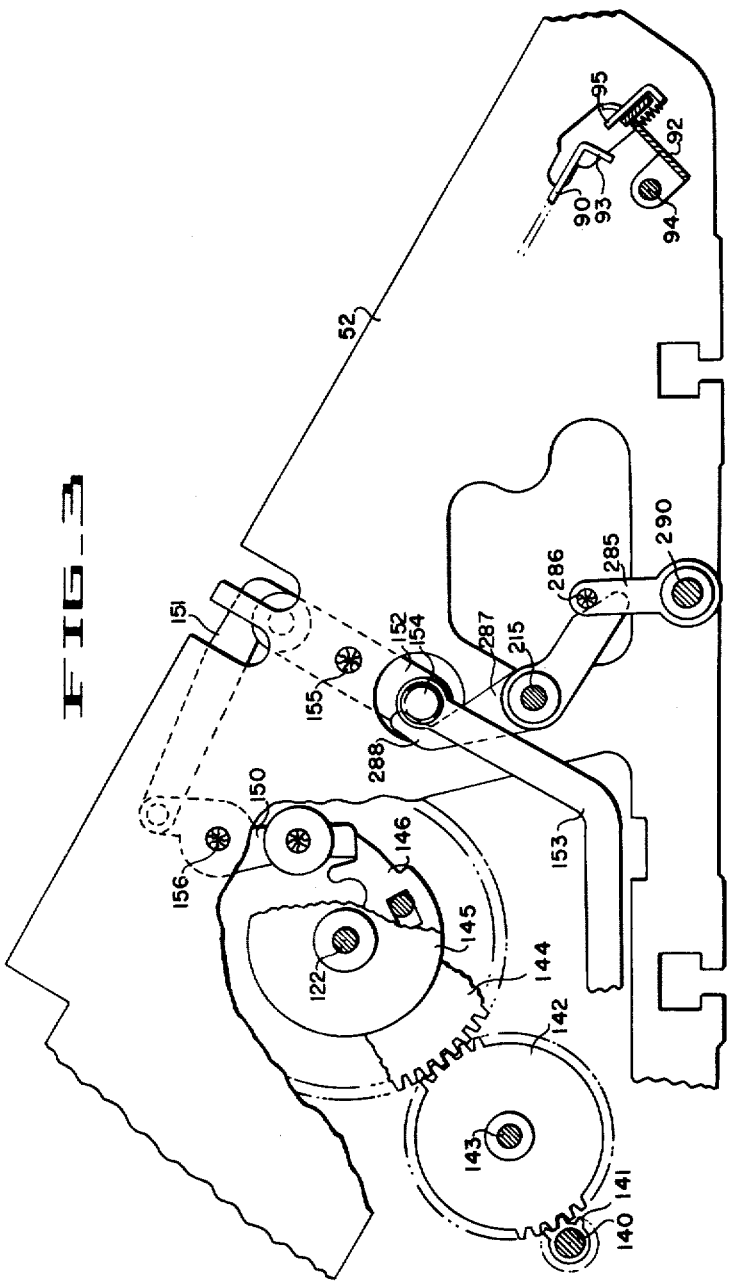
Fig. 3 is a left side view of the right-hand frame plate, showing particularly the drive means of the machine of Fig. 1.
Figure 4:
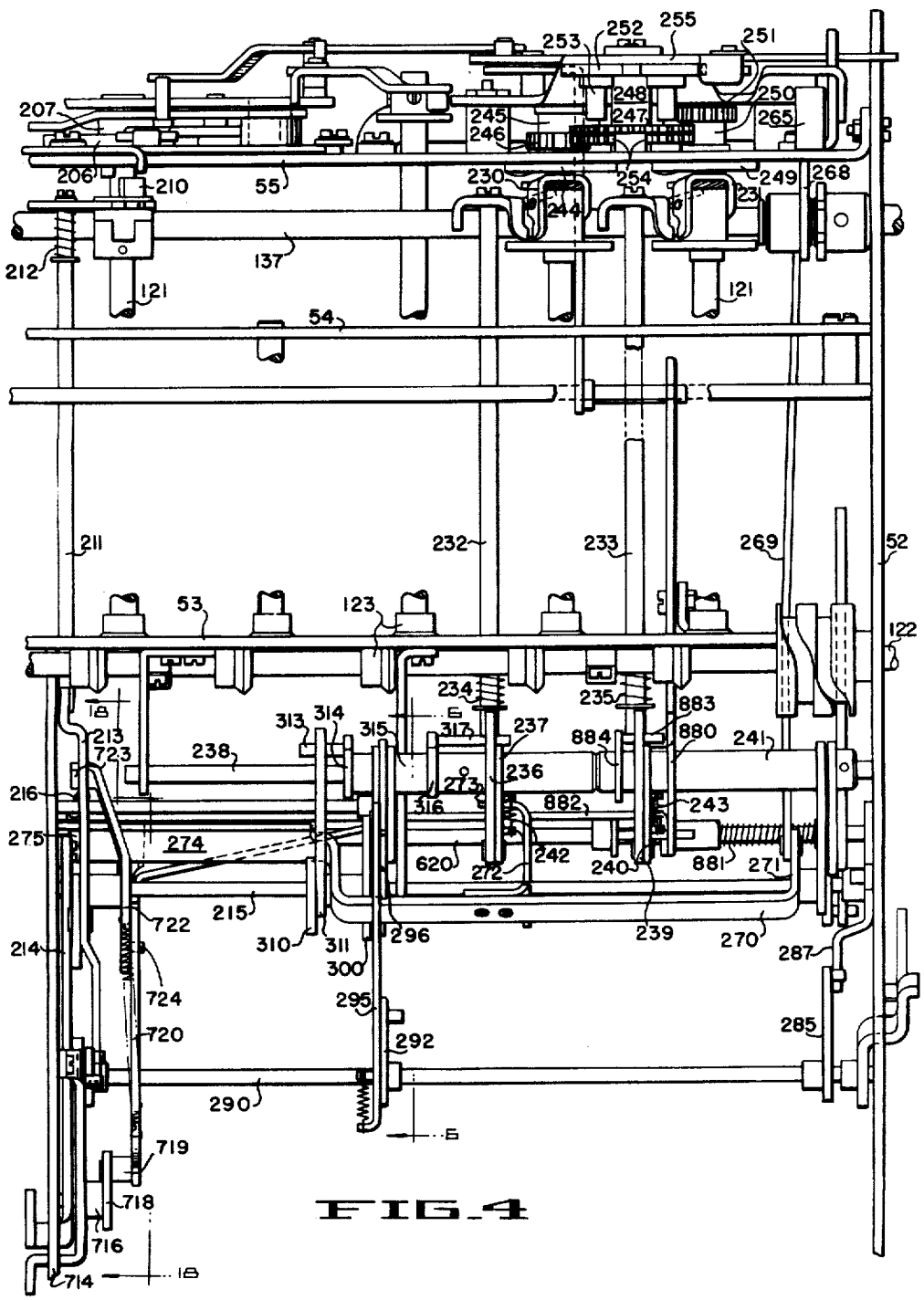
Fig. 4 is a plan view of the shifting and clearing mechanisms of the machine of Fig. 1.

The calculating machine used for exemplification, and the one with which my invention is preferably associated, is shown in Fig. 1. This machine, as shown, is generally divided into a body, or frame portion, 50 and a shiftable carriage 60. The frame conventionally consists of a base plate 56 (see Figs. 10 and 11) upon which are rigidly mounted a left side frame plate 51 (Figs. 4 and 5) and a right side frame plate 52 (Figs. 3 and 4). The various operating mechanisms, such as the motor and drive, the actuating mechanism, the keyboard, the selection mechanism, the controls for the positive or negative operation of the accumulator, the shifting mechanism, the multiplier mechanism, and the like, are mounted in, or upon, the frame portion 50, all of them with the exception of the keyboard and control keys, being enclosed within a cover 58. As shown in Fig. 1, the value keys 80 and the various control keys project upwardly through suitable apertures in the cover 58.

The frame plates 51 and 52 cooperate with a number of cross-members, such as the crossbars 53, 54, and 55 (see Figs. 2 and 4) to rigidly brace the frame and also to support many of the operating parts.

3. CARRIAGE

Figure 2:
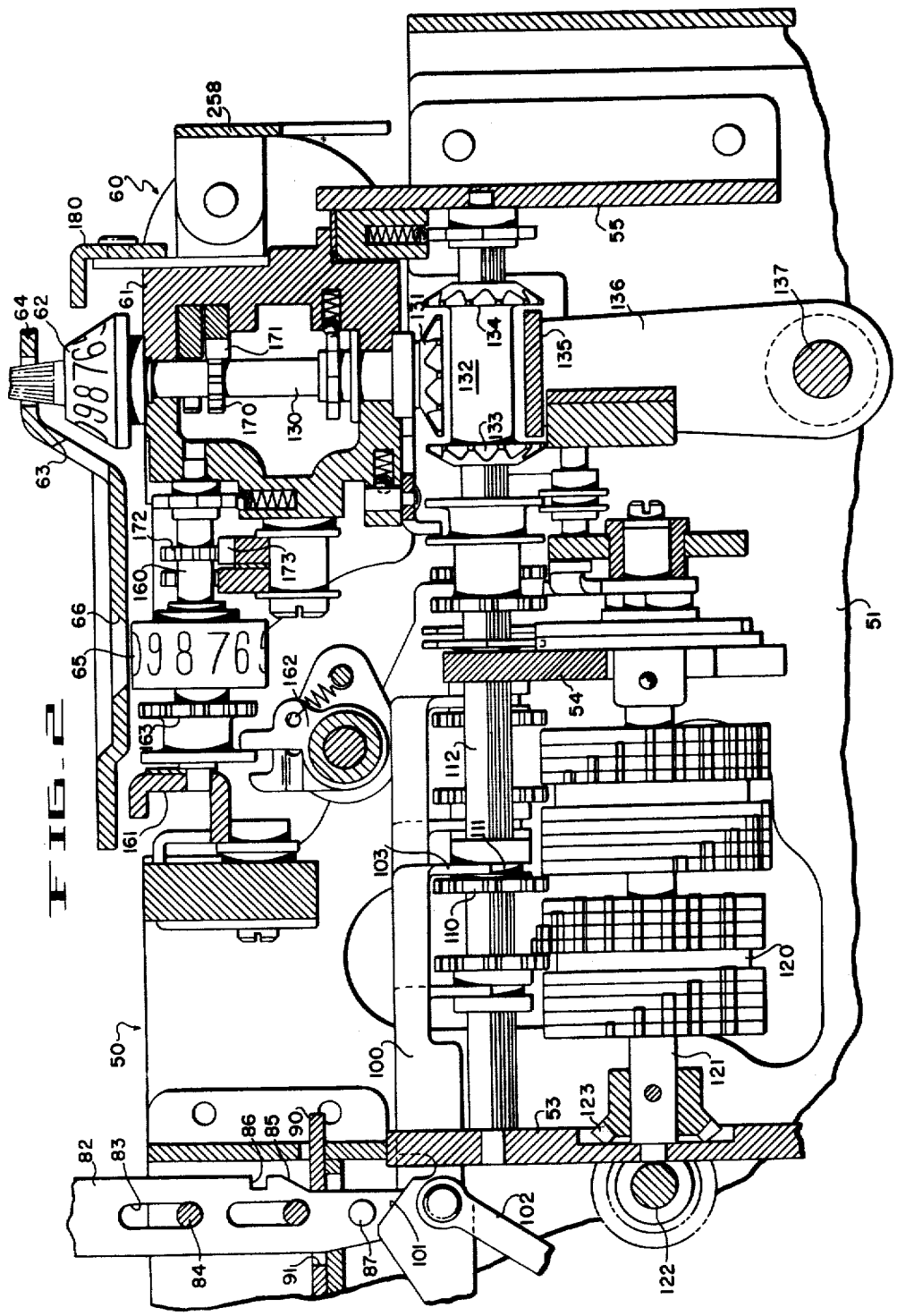
Fig. 2 is a longitudinal, cross-sectional view of the actuating and registering mechanism of the machine shown in Fig. 1.

The carriage 60, which is shiftable longitudinally upon the frame 50, is primarily constructed upon a main hollow frame bar 61 (see Fig. 2). The accumulator, or product register, comprising a plurality of ordinally arranged dials 62, is mounted in the carriage, the dials being visible through windows, or apertures, 63 in the carriage cover 64. A counter register comprising a plurality of ordinally arranged counter dials 65, viewable through apertures, or windows, 66 in the carriage cover are also mounted in the carriage. The counter dials are utilized to count the cycles of operation and thereby register a quotient in division operations or to show the multiplier value at the end of a multiplication operation.

4. TENS-TRANSFER MECHANISM

It will be understood that both the accumulator, or product register, dials 62 and the counter dials 65 are provided with tens-transfer mechanisms operative to effect any necessary tens-transfer between the various dials as required. The tens-transfer mechanisms shown in Fig. 2 are conventional in the machine mentioned and are fully shown and described in the patent to Friden, No. 2,229,889.

In a machine utilizing the shortcut principle of multiplication, it is necessary to have a full capacity tens-transfer for the accumulator, or product register, 62. In the preferred embodiment of my invention, I utilize the full-carry mechanism shown and described in the patent to Machado, No. 2,597,507, issued May 20, 1952. It is, therefore, believed unnecessary to describe this portion of the conventional machine, although it can be mentioned that it is esesntial to effect tens-transfers to the full width of the accumulator register as the first cycle of muliplication operation may be a subtractive one. Such a subtractive operation would, of course, register "9's" as far as the tens-transfer was effective. If this transfer were effective only part way across the register, the later shifting of the register as the multiplication progressed might cause an error, for values then might be entered in orders which stood at "0" instead of "9." It will be obvious to those skilled in the art that any full-carry mechanism would be operable in connection with my invention, the one mentioned being preferred for use in the machine described in the patents heretofore mentioned.

5. SELECTION MECHANISM

Values are entered into the machine by means of a keyboard, which, in its preferred embodiment, consists of ten orders of value keys 80 progressively arranged for the values "1" to "9," inclusive—the keys 80 also being arranged in banks, or transverse rows, of keys of like value, as shown in Fig. 1. Aligned with each order of keys 80 is a single "0," or ordinal clear, key 81, as shown. A number of control keys are arranged to the right of the main keyboard and include a plus bar 70, a minus key 71, a left shift key 72, a right shift key 73, a keyboard clear key 74, and a register clearing key 75.

The value keys 80 are mounted on the upper ends of identical key stems 82 (see Fig. 2). The key stems are slidably mounted in the machine frame, as by means of slots 83 in the key stems embracing crossbars 84. These key stems are individually biased to their raised position by any resilient means, such as springs, not shown. The keys can be latched in a depressed position, to control the entry of values into the machine upon cycling thereof, by a suitable ordinal latch slide 90 associated with each order of keys. These latching slides 90 are provided with a series of slots 91 which embrace the key stems 82 and are biased to a forward position (to the left in Fig. 2) by resilient means, not shown. These slides cooperate with cam faces 85 formed on the rear edge of the key stem 82, whereby the depression of the key stem cams the latching slide 90 to the rear. When a key stem 82 is depressed to its operative position, a notch 86 formed in the rear edge of the key stem lies opposite the ordinal latching slide 90, whereupon the latter is snapped into the notch 86 by its resilient means to hold the key stem latched in the operative position. A key so latched in its operative position is released by the depression of another key in that order or by operation of the ordinal clear key 81, the stem of which is provided with a cam 85 but contains no notch 86. All of the latching slides 90 can be moved rearwardly to unlatch all operative keyboard keys by depression of the keyboard clear key 74. This key operates, through conventional bellcrank means, not shown, to rock a bail 92 (see Fig. 3), the rearwardly extending flange 95 of which is adapted to engage the turned-down ears 93 formed on the forward end of each of the latching slides 90. The bail 92 is mounted on a transverse shaft 94 and thus rocks freely, although biased to an inoperative position (clockwise in Fig. 3) by means of a spring, not shown. When the bail 92 is rocked, as by depression of key 74, it engages all of the ears 93, and moves all of the slides rearwardly, thereby clearing the entire keyboard.

Each of the key stems 82 is provided with a pin 87 adjacent its lower end, each pin being adapted to engage the associated differentially angled cam face 101 of a selection, or V-notch, bar 100. The selection bars 100 are mounted for free longitudinal movement, as by pivotally mounting them on a pair of parallel arms 102 (only one of which is shown in Fig. 2).

The rear ends of the selection slides 100 are provided with a perpendicularly extending yoke 103 which engages an annular slot 111 formed in the hub of a selection gear 110. The selection gears are slidably mounted on longitudinally extending square, or selection, shafts 112, which shafts are journalled in the crossbars 53, 54 and 55, as shown in Fig. 2. There is one selection shaft 112 for each order of the keyboard, and it is conventional in the machine above mentioned to provide two selection slides 100 and two selection gears 110 for each order of the machine. It is conventional in the machine above mentioned to have the "1" to "5" keys cooperate with one slide 100, thereby moving the selection gear 110 on the rear end of that slide forwardly a differential amount determined by the key depressed; and to provide a second slide for the "6" to "9" keys of that order, which slide will differentially translate the second selection gear 110 forwardly an amount determined by the key depressed.

The selection gears, and the square shafts 112 on which they are mounted, are given differential increments of rotation determined by the longitudinal position of one or the other selection gear 110 on the shaft, by means of a conventional Thomas-type actuator 120. The actuator drums 120 are rigidly mounted on actuator shafts 121, which are driven in unison from a common transverse drive shaft 122 rotatably mounted in the machine, the various actuator shafts 121 being driven by ordinally arranged pairs of miter gears 123, as shown. The actuator drums 120 are provided with two sets of stepped, or multilated, teeth, one set serving the "1" to "5" selection gear and the other associated with the "6" to "9" gear. As shown in Fig. 2, one group (the left-hand group in that figure) has five teeth of differential length, and the second group (the rear group in Fig. 2) has six teeth of equal length and three additional teeth of differentially progressive shorter length. Obviously, the differential translation of one or the other of the selection gears 110 along its square selection shaft 112, resulting from operation of a pin 87 upon its associated V notch, will place the gear in the plane of a number of teeth on the actuator drum corresponding to the value of the key 82 depressed.

6. ACCUMULATOR DRIVE

The accumulator, or product register, dials 62 are severally mounted on accumulator shafts 130 journalled in the hollow frame bar 61, as shown in Fig. 2. An accumulator drive gear 131 is rigidly attached to the lower end of each accumulator shaft 130. The gear 131 is driven, selectively in either direction, by means of a spool, or sleeve, 132 slidably mounted on the rear end of the square, or selection, shaft 112. The spool 132 is provided with a plus, or additive, drive gear 133 and a minus, or subtractive, drive gear 134, each of which is adapted to mesh with the gear 131 when the spool is shifted rearwardly or forwardly, respectively, on the shaft 112. Normally, the spool 132 lies in the intermediate position shown in Fig. 2, so the carriage 60 may be shifted ordinally with respect to the actuating mechanism without engaging either drive gear. However, it (the spool 132) can be shifted in either direction to control additive or subtractive operation of the machine by means of a computation control gate 135. The gate 135 extends transversely of the machine, being mounted upon a pair of arms 136 affixed to a control shaft 137. The shaft 137 can be rocked in either direction by various means, such as the add bar 70 or subtract key 71 (which rock the shaft clockwise or counter-clockwise, respectively, in Fig. 2) to cause engagement of either the add gear 133 or the subtract gear 134 with the accumulator gear 131. The subsequent rotation of the drive shaft 122 and actuators 120, and the consequent differential rotation of selection gears 110 and square shafts 112 drive the accumulator shafts and dials incremental amounts in the selected direction for addition or subtraction. The conventional mechanism for so controlling the operation of the computation control shaft 137, and consequently gate 135 from the keys 70 and 71, is not here pertinent and will not be described, but it can be mentioned in this connection that the shaft 137 will be selectively rocked by the multiplying mechanism hereafter to be described to provide for either additive or subtractive multiplication and also to provide for operation in the selected direction for the multiplier values "1" to "5," inclusive, and in the reverse direction for the values "6" to "9," inclusive.

The machine is preferably driven by a motor, not shown, through a conventional unidirectional clutch. The driving mechanism includes the motor rotor shaft 140 (see Fig. 3) upon which is mounted a pinion 141. The pinion meshes with an idler gear 142, rotatably mounted on a stub shaft 143, the idler also meshing with a large clutch gear 144 which is rotatably mounted on the power shaft 122. The large gear 144 carries an integral ratchet, not shown, and constitutes the driving side of the clutch. The driven side of the clutch comprises a plate 145 keyed on, or otherwise rigidly secured to, the power shaft 122. The plate 145 carries a clutch dog 146 adapted to mesh with the ratchet, not shown, on the driving gear 144—the clutch dog being resiliently biased into engagement with the ratchet by suitable spring means, not shown. Normally, the clutch dog 146 is held away from engagement with its cooperating ratchet by a clutch control lever 150 pivotally mounted on the frame plate 52 by any suitable means, such as stud 156. The clutch control lever 150 pivotally supports the rear end of a clutch control link 151, the forward end of which is pivotally mounted on a two-armed lever 152. The two-armed lever 152 is likewise pivotally mounted on the frame plate 52 by any suitable means, such as rivet stud 155. The lower end of the control lever 152 carries a long pin 154 which extends through an aperture in the frame plate 52, on which pin is mounted the forward end of a switch control link 153. Forward movement of the link 153 closes the motor control switch, not shown, to energize the motor, likewise not shown. Operation of the motor, of course, drives the pinion 141, idler 142, and clutch gear 144. Simultaneously with the operation of the switch control link 153, the clutch control lever 150 will be rocked (counter-clockwise in Fig. 3) to permit he clutch dog 146 to engage the ratchet and thereby rotate the drive shaft 122. It is conventional in the machine herein described to provide a single cycle means which normally disengages the clutch and opens the motor switch at the end of a full cycle of rotation of drive shaft 122, but which holds the clutch engaged and the switch open until the full-cycle position is reached.

The control assembly here described, including the clutch control lever 150 and the switch control link 153, and their interconnecting link 151 and arm 152, are operated by various control keys by means not here pertinent and which, therefore, will not be described. However, it can be noted that forward rocking of the long pin 154, by means to be later described, closes the motor switch through link 153 and enables engagement of the clutch, thereby rotating drive shaft 122, and that this rotation will continue so long as the pin is held in the forward position.

7. COUNTER ACTUATOR

The counter dials 65 are mounted on a plurality of parallel shafts 160 mounted in the carriage frame 61 and the carriage rail 161, as shown. The counter dial 65 aligned with the lowest, or units, order of the keyboard is operated by a counter actuator 162 of conventional construction. This actuator is adapted to engage a gear 163 affixed to each of the counter shafts 160 to impart to the gear and dial an angular movement equivalent to a value of "1," with each cycle of machine operation. The construction and operation of the counter actuator 162 and the counter register is of no particular importance in the instant invention and will, therefore, not be described—reference being made to the Patent No. 2,229,889 for a full disclosure of this mechanism.

8. REGISTER CLEARING MECHANISMS

A conventional means for clearing the accumulator register dials 62 or the counter register dials 65 is illustrated in Figs. 1 and 2. Such mechanisms may comprise mutilated clearing gears 170 mounted on each of the accumulator shafts 130 and similar mutilated gears 172 mounted on the counter shafts 160. Preferably, these mutilated gears are staggered on their respective shafts, as shown. Associated with the clearing, or mutilated, gears 170 and 172 are clearing racks 171 and 173, respectively. The respective dials are returned to their "0," or clear, position by longitudinal translation of the racks 171 and 173, respectively, as fully shown and described in the patent to Friden, No. 2,229,889, already mentioned. These racks can be actuated manually by means of knobs 174 and 175, respectively (shown in Fig. 1). The clearing racks, or either of them, can also be operated by power, as by depression of the clear key 75, or automatically in certain operations (one of which operations will be mentioned hereafter) by a mechanism which now will be described.

Figure 5:
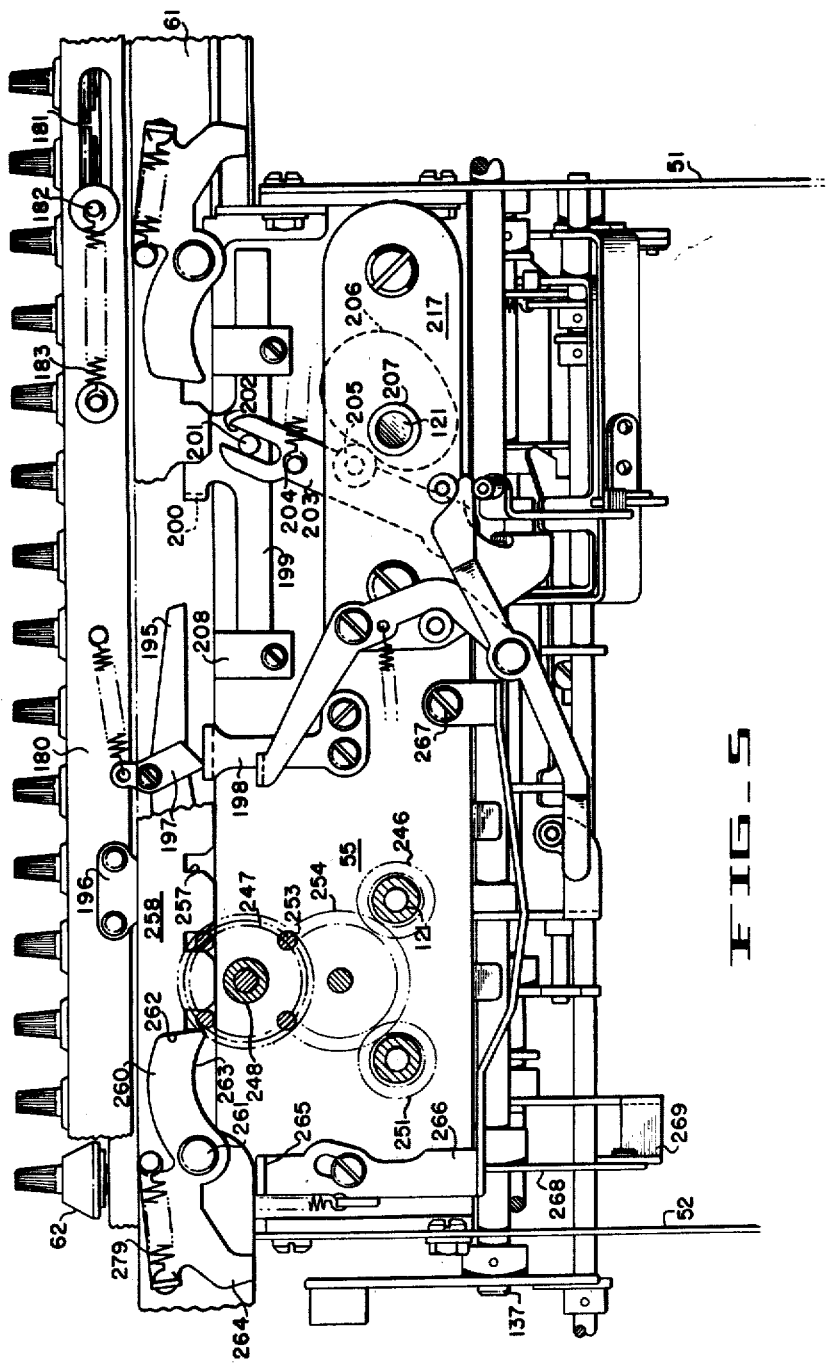
Fig. 5 is a rear view, with the cover removed, of the machine of Fig. 1, showing particularly the shifting and clearing mechanisms shown in Fig. 4.

The power clearing mechanism comprises a power-operated bar 180 slidably mounted on the rear of the carriage frame plate (see Figs. 2 and 5). Preferably, the power bar 180 is mounted by a conventional pin-and-slot mounting, which includes slots 181 in the bar embracing pins 182 mounted in the carriage frame bar 61. It is conventional to bias the bar to its left-hand (to the right in Fig. 5), or inoperative, position by a suitable tension spring 183, as shown. The right end of the power bar 180 (as shown in Fig. 1) carries an integral bracket 184 upon which are riveted, or otherwise rigidly secured, pins 187 and 188. Interponent arms 185 and 186, rigidly connected to the knobs 174 and 175, respectively, enable the operator to selectively connect the clearing racks 171 and 173 to the bracket 184, so as to clear their respective registers upon operation of the power bar 180.

The power bar 180 is operated, i.e., translated to the right against the tension of spring 183, by means of an interponent 195 (see Fig. 5) pivotally mounted on a bracket 196 affixed to the rear side of the bar 180. Preferably, the interponent 195 is provided with a live pawl 197 which is adapted to engage a bracket 198 mounted on the rear of the cross-member 55 and which is operative to lift the interponent above the path of travel of the operating ear 200 on slide 199 as the carriage approaches the extreme left-hand position, and hold the interponent in an elevated, or inoperative, position until the extreme position is reached. The slide 199 is slidably supported on the rear crossbar 55 by any suitable means, such as brackets 208, and is provided with a perpendicularly extending ear 200 which is adapted to engage the end of the interponent 195 when the carriage is in the extreme left-hand position.

The slide is operated by means of an operating arm 203 pivotally mounted on the rear crossbar 55, the slide and arm being connected by means of a pin-and-slot connection comprising the pin 201 on the slide 199 and the slot 202 in the upper end of the operating arm 203. The operating arm 203 is normally biased to its inoperative position by a suitable tension spring 204, as shown, and is rocked to its operative position by means of a cam 206 which engages a follower roller 205 on the arm 203. The cam 206 is rigidly mounted on a sleeve member 207 (see also Fig. 4) rotatably journalled on the extended rear end of the extreme left-hand actuator shaft 121, the sleeve extending rearwardly from the rear cross plate 55 to a bracket member 217 spaced therefrom. A clutch member 210, mounted adjacent to the rear end of the left-hand actuator shaft 121, is adapted to connect that shaft to the sleeve 207 for clearing operations, although normally disengaged therefrom. The clutch is controlled by a clutch control rod 211 extending longitudinally in the machine, which control rod is biased to its forward, or inoperative, position by a conventional spring 212. The clutch rod 211 can be translated rearwardly to place the clutch 210 in operative position by means of a pusher link 213 which is pivotally mounted on an arm 214 (see Figs. 4 and 18) rigidly affixed to a transverse shaft 215. The pusher 213 is resiliently biased into engagement with clutch rod 211 by any suitable means, such as spring 216. It is obvious that the rocking of the shaft 215 (clockwise when viewed from the right, as in Fig. 18) will be effective, among other things, to translate the pusher, or interponent, 213 rearwardly and thereby move the clutch control rod rearwardly to place the clutch 210 in an operative condition. Thereupon the sleeve 207 rotates with the shaft 121 on which it is journalled, and will consequently rotate the cam 206 to rock arm 203, and this, in turn, operates slide 199 to cause clearing operation of the power bar 180 as soon as the carriage 60 reaches its extreme left-hand position.

9. CARRIAGE SHIFT

The carriage 60 can be shifted in either direction, either automatically in certain operations or under control of the shift keys 72 and 73. The shifting mechanism (best shown in Fig. 4) comprises a left shift clutch 230 and a right shift clutch 231, which are mounted on the two right-hand actuator shafts 121, which shafts are extended to a point adjacent the rear cross plate 55. The operation of each of these clutches is controlled by means of clutch control rods 232 or 233. The two rods are biased to their forward, or inoperative, positions by means of compression springs 234 and 235, respectively, which springs encompass the forward end of the rods and are compressed between the forward crossbar 53 and collars secured to the rods. The left shift control rod 232 can be moved rearwardly to place the left shift clutch 230 in its operative position by means of a pusher link 236 pivotally mounted on an arm 237, the arm being rigidly secured to a transverse shaft 238. Similarly, the right shift clutch control rod 233 can be moved rearwardly to place the right shift clutch 231 in operative position by means of a pusher link 239 pivotally mounted on an arm 240, the arm being rigidly secured to a sleeve 241 journalled on shaft 238. The two pusher links 236 and 239 are respectively urged into engagement with their respective pusher control rods 232 and 233 by suitable tension springs 242 and 243, as shown.

Movement of the left shift clutch control rod 232 causes a jaw member on the clutch 230 to be moved rearwardly into engagement with the clutch disk 244, whereby the rotation of the actuator shaft 121 will simultaneously rotate the plate 244 and the sleeve 245 on which it is mounted. The sleeve 245 is rotatably journalled in the rear crossbar 55 and a bracket 255 on the rear thereof. A gear 246, rigidly mounted on the sleeve, drives a shift gear 247 integral with a sleeve 248 by means of a gear train including idler gear 254, the sleeve 248 also being journalled in the rear crossbar 55 and the bracket 255 mounted thereon. Similarly, movement of the right shift clutch control rod 233 rearwardly causes a jaw member on the right shift clutch 231 to move into engagement with the driven plate 249 associated therewith. The plate 249 is mounted on a sleeve 250, likewise journalled in the crossbar 55 and bracket 255. A gear 251 rigidly mounted on the sleeve 250 also drives the shift gear 247 by means of a train containing gear 254 and an idler between it and gear 251. It is obvious, therefore, that rotation of the actuator shafts 121, and their respective clutch plates 244 or 249 (all which rotate in the same direction), will be effective to cause reversible rotation of the gear 247 and the sleeve 248 on which it is mounted. The sleeve 248 carries a shift plate 252, upon which are mounted a number of drive pins 253 adapted to engage notches 257 formed in a rack 258 mounted on the rear of the carriage frame bar 61. Thus, movement of rod 232 to the rear causes operation of the shift plate 252 in one direction (counter-clockwise when viewed from the front, or clockwise when viewed from the rear as in Fig. 5), while operation of the rod 233 causes reverse operation of the shift plate 252 (clockwise when viewed from the front or counter-clockwise when viewed from the rear as in Fig. 5).

It can be mentioned that in its preferred form the gear trains, including the driven gear 247, have a gear ratio of 4 to 1 so that the gear 247 and plate 252 are rotated through an angle of 90 degrees for each full cycle of operation of the actuator shafts 121 (which have a 1 to 1 gear ratio with the drive shaft 122 and clutch plate 145 attached thereto). Thus, a single cycle of operation of the machine will cause a shifting of the carriage an amount equal to the space between successive notches 254 in the rack 258, the spacing being such as to cause a shift of one ordinal position of the carriage, or the distance between successive dials 62.

10. LEFT SHIFT TERMINATING MECHANISM

It is conventional, in the machine described, to provide means for terminating an automatic shift in either extreme position. The power-operated clearing mechanism heretofore described operates when the carriage is in the extreme left-hand position, so any clearing operation is immediately terminated by the shift terminating mechanism. This is required, for in a multiplication operation, for example, the carriage is conventionally shifted to the extreme left-hand position, the registers are then cleared, and multiplication begins in the same order. It is, therefore, essential to operate the clearing mechanism once, and once only. Termination of operation of both the left shift clutch and the clear clutch are controlled by an attempted overshifting of the carriage beyond the terminal position, by means which will now be described.

An override pawl 260 (see Fig. 5) is pivotally mounted adjacent the right end of the rack 258, being pivoted on a suitable stud 261 mounted on rack 258. The left end 262 of the pawl 260 is so located as to form the right side of the terminal slot 257, as shown. The lower edge of the pawl 260, adjacent the end 262, is formed with an arcuate cam face 263 adapted to be engaged by a pin 253 when the shift mechanism is operated to attempt a left-hand shift of the carriage (to the right in Fig. 5) beyond the terminal position, thereby rocking the pawl 260 against the tension of its spring 279 which biases the pawl to its normal position. The right end of the pawl 260 is provided with a nose 264, which, when the carriage is in the extreme position, overlies an ear 265 formed on the upper end of the vertical extension of an angular arm 266. The arm 266 is pivotally mounted on the rear crossbar 55, as on screw 267. The rocking of the pawl 260, during the attempted overdrive of the carriage shifting mechanism, rocks the arm 266 (counter-clockwise in Fig. 5).

The vertical extension of the angular lever 266 overlies the horizontal arm of a bellcrank 268, which is pivoted on any suitable shaft, such as computation control shaft 137. The vertical arm of the bellcrank pivotally supports the rear end of a forwardly extending link 269 (see also Fig. 4), the forward end of which is pivotally supported by an upstanding arm 271 of a bail 270 rotatably mounted on the shaft 215 upon which the clear clutch control arm 214 is mounted. The bail 270 carries a rearwardly extending arm 272 which is formed to pass beneath shaft 215 and then upwardly to adjacent the left shift pusher link 236. The arm 272 is provided, at its rear end, with an angularly extending projection, or ear, 273 which underlies the pusher link 236. Thus, the rocking of the bail 270, from operation of the override pawl 260, is effective to lift the pusher link 236 against the tension of its spring 242 so that it becomes disengaged from the clutch control rod 232—thereby permitting the spring 234 thereof to translate the rod forwardly to its inoperative position.

The bail 270 carries an extension 274 which projects to the left to the plane of the clear clutch pusher link 213, as shown in Fig. 4. This extension terminates in a nose 275 which underlies the link 213. This link, as previously mentioned, controls the positioning of the clear clutch control rod 211. Thus, the rocking of the bail 270 simultaneously disables the left shift clutch 230 and the clear clutch 210, whenever the shift of the carriage 60 is attempted beyond the extreme left-hand position.

It can be mentioned that the extension 274 also underlies a pusher link 311 which controls operation of a power-operated programming mechanism described in the next section. The operation of the bail 270 therefore disables the link 311. Also, the rocking of bail 270 is effective to initiate the operation of the multiplier mechanism, as will be described hereafter.

It can be noted that although the rocking of the bail 270 is momentary, so that the pusher links controlled thereby will be permitted to return to their normal positions immediately, such return will not re-engage the clutches. The respective links 236 and 213 will have been lifted above the respective control rods 232 and 211, permitting the rods to be biased forwardly by their respective springs, so that when the bail returns to its normal position, the pusher links 236 and 213 will ride upon the top of the control rods and will not engage the ends thereof. Thus, the left shift clutch and the clear clutch cannot become re-engaged until after the operation is terminated and the respective controls (which were latched in their operative position) are returned to their normal inoperative positions.

It may be noted in Fig. 5 that the machine shown for purposes of exemplification has a similar override pawl mounted on the left end of the carriage. The operation of this pawl has no connection with the multiplication mechanism herein described, and a description of its construction and operation can be omitted.

11. SHIFT AND CLEAR PROGRAMMING MECHANISM

It is convenient, in the machine herein shown for purposes of exemplification, to initiate those operations which include an initial left shift of the carriage, followed by a clearing of the registers in the extreme left-hand position thereof, to utilize a single, power-operated member for controlling the shifting and clearing operations. For this purpose I prefer to use the mechanism shown and described in the patent to Machado, No. 2,650,761, of September 1, 1953, a side view of which mechanism is illustrated in Fig. 6. The operation of this mechanism is controlled by the rocking of a shaft 290 (also shown in Fig. 4) suitably supported in the machine, such as by bearing bracket 291, and a bearing, not shown, in right frame plate 52. This shaft is rocked (clockwise in Fig. 6) by depression of a multiplier control key, as will hereinafter be explained, as well as by depression of the clear key 75, or other control keys not here pertinent.

The shaft 290, at its right end, as shown in Fig. 3, carries an arm 285 rigidly mounted thereon. A stud 286 on the free end of the arm engages the forward end of a two-armed lever 287 which is rotatably mounted on the transverse shaft 215. A hook 288 on the rear end of the lever engages the pin 154 which connects the switch control link 153 to the clutch control lever 152. Thus, the rocking of shaft 290 (clockwise in Fig. 6 and counter-clockwise in Fig. 3) causes the forward translation of the switch control link 153 to initiate operation of the motor and rocking of clutch lever 152 and clutch pawl 150 to engage the clutch, and thereby initiating machine operation.

The shaft 290 carries, at an interior point, a bellcrank member 292, the upper arm of which carries a pin 293 embraced within a slot 294 formed in the front end of a rearwardly extending link 295. The rear end of the link 295 is pivotally connected to one arm 296 of an eccentrically mounted hook member which is mounted on an eccentric, not shown, carried by a shaft 297. A hook arm 298 is formed integral with the arm 296 to form a bellcrank hook member, which member is reciprocated by its eccentric mounting. The shaft 297 rotates in synchronism with the main drive shaft 122, so that it reciprocates constantly. Normally, the hook arm 298 travels in a path in which it is ineffective, so that such constant reciprocation is mere idle movement. However, when the shaft 290 is rocked (clockwise in this figure) and the hook arm 298 is likewise rocked clockwise on its eccentric mounting, the hook arm will engage a pin 299 on the rear arm of a bellcrank 300. In this adjusted position of the bellcrank, the first cycle of operation thereafter will rock the bellcrank 300 clockwise. The bellcrank 300 is rigidly affixed to the shaft 215, previously mentioned, which, among other things, carries the arm 214 associated with the clearing mechanism heretofore described (see Fig. 4). The arm 300 is latched in the rocked position by a suitable latch 301, which is released only by the return of shaft 290 and its bellcrank 292 to their original positions shown in Fig. 6. Thus, the control shaft 215 is maintained in its operative position until the bellcrank 292 is returned to its inoperative position (which occurs upon termination of a multiplication operation by the automatic release of the multiplier control key).

The shaft 215 also carries an arm 310 (see Fig. 6) which is rigidly mounted thereon. A pusher link 311, similar in configuration to the pusher link 213 previously mentioned, is pivotally supported on the arm 310. The rear end of the link 310 is provided with a shoulder 312 which is adapted to engage a pin 313 mounted on the lower end of an arm 314. The arm is rigidly affixed to a sleeve 315 (see also Fig. 4) which is rotatably mounted on the left shift control shaft 238. The right end of the sleeve 315, as shown in Fig. 4, carries a second arm 316 which carries a long pin 317 at its lower end, which pin also engages the forward end of the left shift control rod 232.

The rocking of the shaft 290, upon depression of a multiplier control key, as will hereinafter be described, is effective to rock the hook member 298 so that in its reciprocation it will engage the pin 299. Thereupon the bellcrank 300 and shaft 215 are rocked (clockwise in Fig. 6) to rock arms 214 and 310, thereby enabling both the clear clutch 210 and the left shift clutch 230. The mechanism is latched in its operative position by the latch 390 and is held in that position until the multiplier key is released at the end of the multiplying operation. Thus, the carriage 60 will be shifted to the left, and the clear clutch will be effective to rotate the clear cam 206 until the carriage reaches the extreme left-hand position. On the attempted overshift beyond the extreme left-hand position the override pawl 260 will be rocked, thereby rocking bail 270, whereupon the extension 274 lifts pusher link 311 to disengage the left shift clutch 210, and link 311 to disengage the left shift clutch 230. At this point the operation of the multiplier mechanism will be tripped and the machine will proceed in the multiplication operation, as will hereinafter be described.

12. MULTIPLIER KEYBOARD

It will be seen, by reference to Fig. 1, that the machine with which my invention is preferably associated has a multiplier, or auxiliary, keyboard located in the lower left-hand corner of the machine. This keyboard comprises the multiplier value keys 400 for the values "1" to "9," inclusive; a "0" value key 401; and the three multiplier control keys 402 (for clearing the registers prior to an additive multiplication operation), 403 (for additive multiplying without clearing the registers), and 404 (for multiplying in a subtractive direction to give the complement of the true product, and therefore subtract one product from another). It is conventional in the machine of this make, as shown in this figure, to arrange the multiplier value keys in a small 3 x 3 square for the value keys 400, with the large "0" key 401 in front of the group, and to place the control keys immediately adjacent thereto on either side of the value keys.

The keyboard in which these keys are mounted comprises upper plate 406 and lower plate 407 (as shown in Figs. 10 and 11), held in spaced relationship by spacing studs, not shown, and supported in the machine by suitable brackets, such as 408.

It can be mentioned that the multiplier selection mechanism includes check dials, which, when a value is inserted in the unit and the multiplier carriage shifted to the left, as will hereinafter be described, appear through a window 405 located above the value keys 400. It will be understood that these check dials ordinarily do not appear through the window, but are shifted to the left under the window, so that they become visible as a value is inserted in the mechanism.

The keys 400 are mounted on key stems 411 to 419, inclusive, as shown particularly in Fig. 8 (the last digit in these reference characters indicating the value of the respective keys). The "0" key 401 is mounted on a pair of key stems 410, as shown in this figure as well as in Fig. 12. Each of the key stems extends through a registering slot formed in the upper plate 406, and is provided with a downwardly extending guide pin 430 to 439, inclusive, which extends through a smaller registering slot in the lower frame plate 407. Each of these guide pins is encompassed by a suitable compression spring 460 (shown only in Figs. 10 and 11) which biases the respective key upwardly to its inoperative position, thereby holding its respective bracket, or shoulder, against the upper frame plate 406.

The right-hand "0" key stem 410 is provided with a short, forwardly projecting shoulder 420, and each of the value keys 411 to 419, inclusive, is provided with laterally extending bracket members 421 to 429, inclusive, respectively. This shoulder and the bracket members are so located that they abut against the lower face of the upper plate 406 when the respective keys are in their raised, or inoperative, positions. These bracket members are formed, as shown in Fig. 8, so that each bracket member has a portion (above the lower plate 407) overlying the setting arms 451 to 456, which lie below that plate, and also overlies the escapement rod 540. Each such portion carries a depending projection, or stem, 441 to 449, respectively, which pass through registering slots in the lower frame plate 407 and engage the upper edges of the setting arms 451 to 456. The depending stems 441 to 445 of the "1" to "5" keys register with the arms 451 to 455, respectively. The stems 446 to 49 of the "6" to "9" keys are elongated (as shown in Fig. 9) so as to register with the arm 456 and also with the one of the value arms 451 to 454 representative of the tens-complement of the value key (the "6" key stem registers with the arm 454, the "7" key stem registers with arm 453, etc.).

A series of six value setting arms 451 to 456, respectively, are mounted in the machine, independently of the keyboard mechanism but immediately below the lower frame plate 407 (see Figs. 8, 9, 10 and 11). These arms are rotatably mounted on a short transverse shaft 457 and lie immediately adjacent each other, as shown in Fig. 8. The shaft 457 is mounted in the auxiliary left frame plate 714 and an auxiliary frame plate 899 (shown in Fig. 10). The five arms 451 to 455, inclusive (the left-hand five, as viewed in Fig. 8), are provided with upturned noses 451a to 455a, as shown in Figs. 9 and 10. These noses are adapted to be engaged by downwardly extending ears, or pins, 441 to 445, inclusive, which respectively extend downwardly from the brackets 421 to 425, inclusive, of the "1" to "5" keys, as previously mentioned. The sixth arm 456 is provided with four shoulders 456a, 456b, 456c, and 456d, which are respectively adapted to be engaged by the downwardly projecting ears 446, 447, 448 and 449, respectively, which extend downwardly from the brackets 426 to 429, inclusive. The arm 454 is also provided with an upwardly extending nose 454b aligned with the shoulder 456a, so that it also is engaged by the guide stem 446 of the "6" key, which is elongated so as to overlie arms 454 and 456 (the nose 455a on arm 455 being a radial distance from shaft 457 sufficient to enable the operating ear 446 to operate arms 454 and 456 without engaging arm 455). Thus operation of the "6" key rocks arms 456 (which is operative to set a control mechanism which determines operation in the reverse direction, as will be described subsequently) and the "4" value arm 454. Similarly, the arm 453 is provided with an upwardly extending shoulder 453b, aligned with the shoulder 456b of arm 456, which shoulders are engaged by the elongated operating ear 447 which depends from the bracket 427 of the "7" value key, whereby the depression of the "7" key will rock arms 456 and the "3" value arm 453. Likewise, the depression of the "8" value key, by the movement of the bracket 428 and its depending stem 448, rocks both the arm 456 and the "2" value arm 452 by engaging the shoulders 456c and 452b, respectively. Likewise, the "1" value arm 451 is provided with a second shoulder 451b aligned with the face 456d of the arm 456, both shoulders being engaged by the elongated ear, or stem, 449 of the "9" key bracket 429, whereby the depression of the "9" key rocks the control arm 456 and sets the selection mechanism for a value of "1."

Thus, the depression of the "1" key is effective to operate the arm 451, which, in turn, is effective to set a value of "1" in a multiplier selection mechanism. Similarly, the "2," "3," "4" and "5" value keys are operative to rock the arms 452, 453, 454, and 455 to set values of from "2" to "5," respectively, in the multiplier mechanism. None of these value keys "1" to "5," inclusive, have any effect upon the arm 456, the sole purpose of which is to set the multiplier mechanism for a reverse operation to take the complement of the higher values in a reverse direction. The "6," "7," "8" and "9" keys are all effective to rock the arm 456 and also to rock, respectively, the arms 454, 453, 452 and 451 to set values of "4" to "1," respectively, into the multiplier control mechanism.

The control arms 451 to 456, inclusive, are provided with a downwardly and rearwardly directed extension which terminate in rearwardly and upwardly projecting noses 461 to 466, as shown in Figs. 10 and 11. Normally, these extensions are held against the supporting bracket 458 by springs 467 tensioned between ears on the respective noses and the bracket 458. The noses 461 to 466, inclusive, terminate in a single plane and project through a slot 470 (see Fig. 7) in guide plate 471 rigidly mounted between the auxiliary plate 899 and side frame 714.

The setting arms 451 to 456, inclusive, and particularly their noses 461 to 466, inclusive, are adapted to set pins of a selection pinboard of conventional construction. These pins are similar to the setting pins shown in the patents to Friden, Nos. 2,317,752 (where they appear as pins 251 in Fig. 21), and 2,399,917 (where they appear as pins 302 in Fig. 10). In the patents above mentioned, eight such pins were utilized; while in the construction of the present machine, only six are necessary. These pins are mounted in base plates 473 and 474 of a multiplier carriage 472, the carriage also comprising end plates 475 and suitable tie rods, not identified. This carriage is substantially the same as that shown in the patents just mentioned, as will be obvious to those familiar with the patents or the machine manufactured in accordance therewith. The multiplier carriage 472 is shiftable transversely in the machine, between the auxiliary left-hand frame plate 714 and a left-hand auxiliary, or control, plate 57, being mounted on a pair of rods, or rails, 476. It can be mentioned at this point that the carriage 472 is resiliently biased to the left by means which will shortly be described and normally is latched in its right-hand position, to the right of the window 405, but is permitted to escape to the left step-by-step with the insertion of values into the multiplier keyboard 400, 401.

The depression of the "0" key is operative to set the "1" pin 481 of the aligned order of the pin box, or multiplier carriage, in order to secure an additional cycle of operation in the selected direction whenever a "0" in the multiplier factor lies in the order above one requiring a reverse operation (the operation of the multiplier mechanism proceeding from right to left, as is conventional in the patents last referred to). This is secured by operating the arm 451 from the "0" key 401, whereby the nose 461 on the lower end thereof engages a pin 481 and lifts the latter to its operative position. This operation must be handled without the operation of the "0" latch hereinafter to be described, which latch is operated by depression of all of the value keys "1" to "9," inclusive. The desired operation can best be secured by means of a pin 450 projecting to the left from the forward end of the arm 451, the left-hand end of which pin underlies the lower end of the guide stem 430 (of the left-hand key stem 410 of the "0" key 401). By this means, depression of the "0" key will set a "1" in the keyboard, by lifting the pin 481 of the aligned order, but will not operate the "0" latch mechanism, which will hereinafter be described.

13. MULTIPLIER CONTROL SEGMENTS

It will be understood that the multiplier carriage 472 will contain several orders of multiplier control mechanisms (ten being conventional in the machines manufactured in accordance with the teaching of the patents above mentioned and as indicated in Fig. 7). It thus follows that there will be a plurality of orders of the setting pins 481 to 486, inclusive (ten orders in the preferred form of my invention). In this connection it will be understood that there is only one set of value setting arms 451 to 456, inclusive, and that each of those arms has only one operating nose 461 to 466, inclusive. Normally, these noses 461 to 466 lie under the leftmost order of pins of the carriage 472 and specifically under the pins 481 to 486, inclusive, as shown in Fig. 7. The depression of the value keys 400 or 401 will operate the respective arms 451 to 456, whereby their noses 461 to 466 lift pins 481 to 486 to their operative position, this operation taking place in the left-hand order of the pin box. Thereupon, the carriage 472 is permitted to escape one step to the left by an escapement mechanism which will shortly be described, and thereafter the noses 461 to 466 underlie the respective pins of the adjacent order to the right, and so on.

It will be understood that each order of pins 481 to 486, inclusive, of the multiply carriage is associated with a corresponding ordinal selection segment, or rack, 490 (see Figs. 10 and 11). These segments 490 are journalled in immediately adjacent relationship upon a common shaft 491 that is mounted in the end plates 475 of the carriage, and preferably will form one of the tie rods of the carriage frame. These segments are individually biased to an operative position (clockwise in Fig. 10 and counter-clockwise in Fig. 11) by means of springs 492 tensioned between a crossbar 493 between the end plates 475, around the hub 494 of the segment (shown particularly in Fig. 11), and to a stud 495 on one of the spokes of the segment 490. The various segments 490 are normally latched in the counter-clockwise and inoperative position shown in Figs. 10 and 11 by individual "0" latches 520, one of which is aligned with each segment. The "0" latch aligned with the operating arms 451 to 456 is operated by depression of the value keys "1" to "9," as will shortly be explained, whereupon the segment aligned with the setting mechanism is released and becomes free to rotate under the force of its spring 492. The operation of the "0" latch 520 follows immediately after the setting of one of the pins 481 to 486 of that order, so that the segment 490 is free to rotate until further rotation is blocked by one of these pins being elevated to its effective, or blocking, position. The angular position of these segments is determinative of the number of cycles of operation to take place in that order of the multiplier—the values "1" to "5" being represented by five differential steps, while the values "6" to "9" are determined by the tens-complement of the digital value.

Preferably, as shown in the multiplier patents above mentioned, each segment carries a dial member 501 upon which are engraved, or otherwise set, the digits "0" and "1" to "9," inclusive. In the patents mentioned, these numerical values appear in consecutive order. However, in the present invention, I prefer to utilize a modified form of dial which will now be briefly described. The modified form comprises an auxiliary segment 500 upon which is rigidly secured a dial 501 representative of the multiplier value. The auxiliary segment 500 is rotatably mounted on the shaft 491, immediately adjacent the segment with which it is associated. The dial portion carries the numbers "0," "1," "2," "3," "4," "5," "9," "8," "7" and "6," reading from top to bottom. The auxiliary segments 501 are resiliently biased to an extreme operative position (clockwise in Fig. 10), with respect to the segments 490 with which they are individually associated, by suitable springs 502 tensioned between adjacent spokes of the two segments, as shown in Fig. 10.

The dials are normally latched against rotation by a latch 505 pivotally mounted on the auxiliary segment 500 by any suitable means, such as pin 506. This latch, as shown in Figs. 10 and 11, is provided with a hook 507 adapted to engage a pin 508 on the forward end of the segment 490, the latch being biased into operative position by a spring 509 tensioned between spring seats on the latch and the segment 490. The latch 505 is provided with a nose 510, which, when the segments are in their latched and inoperative position, lies immediately above the upper end of pin 486. Thus, the operation of the "6" arm 456, and the projection of pin 486 as a result thereof, causes the pin to engage the nose 510, thereby rocking the latch around its pivot pin 506 (counter-clockwise in Fig. 10 and clockwise in Fig. 11) to release pin 508. Such operation of the latch 505 releases the auxiliary segment 500 from the segment 490, thereby enabling the segment to rock under the force of its spring 502 until stopped by an ear 511 on a spoke of the auxiliary segment engaging a similar ear 512 on a spoke of the segment 490.

The depression of the "0" key 401, while setting the ordinally aligned pin 481, does not release the "0" latch 520, thereby holding the segments 490 and 500 in the position shown in Figs. 10 and 11 (in which, incidentally, the "0" is displayed through the window 405 of Fig. 1). If the value keys "1" to "5" are depressed, the keys operate the respective arms 451 to 455, thereby setting the pins 481 to 485, respectively. Simultaneously, with this operation, the "0" latch 520 is released so that the ordinally aligned segment can rotate (clockwise in Fig. 10 or counter-clockwise in Fig. 11), thereby displaying the respective values through the window 405. The depression of the value keys "6," "7," "8" and "9" operate the "6" selection arm 456 and consequently set pin 486 to its projected, or operative, position, thereby disabling the latch 505 and permitting the dial 501 to rock under the force of spring 502. Simultaneously, the depression of such larger value keys have also operated the fourth, third, second, and first selection levers (454 to 451, inclusive), respectively, thereby enabling the main segment 490 to rotate through "4," "3," "2," or "1" incremental spaces, respectively. Thus, the dial 501 will show the value to be used as the multiplier value, although the main operating segment 490 will be set in inverse incremental steps to represent the tens-complement of the values "6" to "9," inclusive.

14. "0" LATCH

It has been mentioned that the various multiplier control segments 490 are latched in their inoperative, or "0," positions (in which the "0" on the dial 501 registers with the window 405). The segment of the highest inoperative order (i.e., the first order to the right of the window) is released by the operation of any of the value keys 400 representing the values "1" to "9," inclusive, but is not released by the depression of the "0" key 401. The segment latch and its releasing mechanism will now be described, the mechanism therefor being shown primarily in Figs. 10 and 11. There is one such latch 520 for each of the segments 490, the latches being in the same plane as the associated segment and all of them being rotatably mounted on a cross shaft 521. The "0" latches 520 are individually biased to their latching position (counter-clockwise in Fig. 10 and clockwise in Fig. 11) by individual springs 522 tensioned between a seat in each of the latch members and a common crossbar 523.

The "0" latch aligned with the noses 461 to 466 of the operating arms 451 to 456 is operated by means of a latch-releasing arm 530 (see Fig. 10) which is in the same longitudinal plane as the noses (as shown in Fig. 7). This arm is pivotally mounted on a screw 531 attached to the adjacent auxiliary plate 459, the upper end of the arm 530 lying immediately behind the lower end of the latch 520 when the mechanism is in its normal, or inoperative, position. The arm 530 supports the lower and rearwardly extending end of a link 532, to which it is pivotally attached by means of a pin or other suitable pivotal stud 533. The arm 530 extends through a slot 529 (Fig. 7) in the guide plate 471, which slot is aligned with the guide slot 470 for the noses of the selection arms, as is shown in Fig. 7. The forward end of the link 532 (see Fig. 10) is pivotally connected to a two-armed lever 535 by any suitable means, such as pin 534. The two-armed lever 535 is pivotally mounted on a stud 536 mounted in bracket 458. The forward end of the two-armed lever 535 is provided with a nose 537 which lies within a slot 538 in the lower frame plate 407 (see Fig. 8), the nose 537 extending a short distance above the upper face of the frame plate 407, as is shown in Fig. 10. The entire assembly, including latch-releasing arm 530, and link 532, is held in its inoperative (rearward) position shown by a suitable spring 539 tensioned between a seat formed in the link 532 and a downwardly turned extension, or bracket, 544 formed on the rear edge of guide plate 471.

A "0" release, or operating, bar 540 cooperates with the nose 537 of the two-armed lever 535. The operating bar 540 is mounted on a pair of arms 541 (see Figs. 8, 12 and 13) located at the front and rear of the base plate 407. These arms are preferably rigidly secured to a longitudinally extending shaft 542 which is journalled in brackets 543 of the lower frame plate 407, the rigid mounting on shaft 542 being preferred so that the whole assembly will rotate without twisting, regardless of the key depressed. The bar 540 is held in its elevated position (the arms 541 are rocked counter-clockwise when viewed from the front, as in Fig. 12) by a spring 566 (Fig. 13) associated with the escapement mechanism which will hereinafter be described and also by the force of the spring 539 which biases link 532 rearwardly and levers 530 and 535 in a clockwise direction in Fig. 10. The bar 540 underlies the lower edges of the various brackets 421 to 429 of the value keys "1" to "9," respectively, whereby the depression of any of these keys is effective to depress the bar 540. The depression of the bar 540 causes it to engage the nose 537 of lever 535, thereby rocking the lever (counter-clockwise in Fig. 10) to translate the link 532 forwardly and rock the latch release arm 530 (counter-clockwise in Fig. 10). Such rocking of the arm 530 rocks the latch 520 (clockwise) to release the associated segment 490, allowing it to assume the position determined by one of the projected pins 481 to 486.

15. MULTIPLIER CARRIAGE ESCAPEMENT MECHANISM

It has been mentioned previously that the depression of any of the value keys 400 or the "0" key 401 is operative to enable the multiplier carriage 472 to escape to the left one ordinal space, so as to bring the next order of the pin box into alignment with the noses 461, 466 of the operating levers (it being understood that the entry of values into the multiplier mechanism occurs from left to right beginning with the leftmost, or highest, order). The carriage 472 is strongly and resiliently biased toward the left by means of a two-armed lever 550 pivotally mounted on the base plate 56 (Fig. 11) by any suitable means, such as screw stud 551. A relatively strong spring 552, tensioned between the front end of the lever 550 and the right side of the machine, provides the motive force necessary for such biasing. This lever is provided on its rear end with an upstanding end portion, or bracket member, 553 which bears against the right side of the carriage frame.

The carriage is latched against leftward movement by an escapement mechanism, shown particularly in Figs. 13 and 14. The multiplier carriage 472 is provided with a rack 554 at its forward and upper edge, the teeth of which are seen in cross-section in these figures. Cooperating with the rack 554 are two escapement arms 560 and 561 which are pivotally mounted on upstanding brackets 564 and 565 formed on the lower frame plate 407 (see also Fig. 8)—the two arms being mounted on pins 562 and 563. The lower arms of the bellcranks 560 and 561 are connected by a tension spring 566 which resiliently biases each arm in an upward direction. The left-hand arm 560 (toward the right in Figs. 13 and 14) is provided on its free end with a nose 567, the outer edge of which normally engages one of the teeth of the rack 554. The right-hand arm 561 (to the left in Figs. 13 and 14) is provided with an ear 568 normally lying above the teeth of the rack 554, as shown in Fig. 13, and spaced approximately half a tooth space from the nose 567 of bellcrank 560. The two bellcranks 560 and 561 are operated in unison by means which will next be described, but for the moment it should be noted that when the arms are in their raised position shown in Fig. 13, the outer edge of the nose 567 abuts one of the teeth of rack 554 and the ear 568 lies immediately above the adjacent tooth to the left. However, when the arms are depressed (to the position shown in Fig. 14), the nose 567 of bellcrank 560 drops out of engagement with the tooth 554 and simultaneously the ear 568 of bellcrank 561 drops down to catch the same tooth in approximately the half-step position. This permits a partial escape of the multiplier carriage 472 to the left on the downstroke of the value key. As the two bellcranks are permitted to rise to the position shown in Fig. 13 (by release of the key), the nose 567 will rise into the path of travel of the next tooth of the rack 554 prior to the release of the tooth to the left by ear 568. By this means the carriage is permitted to take one full ordinal step of movement to the left with each value inserted into the keyboard.

The means for operating the bellcranks 560 and 561 includes a shaft 580 rotatably mounted in bearing brackets 581 formed on the right side of lower plate 407 (see Fig. 8). The forward end of the shaft carries an arm 582 rigidly mounted thereon, the left-hand or free end of which arm underlies the operating bar 540 (as seen in Fig. 12). This arm 582 also underlies the shoulder 420 formed on the "0" key stem 410, whereby the depression of the "0" key 401 is also operative to rock arm 582 and shaft 580. The rear end of the shaft 580 carrier an arm 583, as shown in Figs. 8, 13 and 14, which arm is immediately adjacent the bellcrank 561. This arm is provided with a pin 584 which is embraced within the horizontal portion of an L-shaped slot 585 formed in the bellcrank 561. Thus, the rocking of shaft 580 and arm 583 will rock the bellcrank 561 downwardly (clockwise from the position shown in Fig. 13 to the position shown in Fig. 14). The free end of the bellcrank 561 is provided with a shoulder 569 which overlies a pin 570 carried by the free end of the arm of bellcrank 560. Thus, the rocking of the bellcrank 561 simultaneously rocks the bellcrank 560 to permit operation of the two portions of the escapement mechanism.

It can be noted that in the preferred form of construction the pin 570 extends forwardly to also underlie the rearward arm 541 carried by shaft 542 and supporting the operating bar 540. It can also be noted that in my preferred form of mechanism the bar 540 extends rearwardly through the rear arm 541 to enter the vertical portion of the L-slot 585. By this means the tension of spring 566 not only holds the two bellcranks 560 and 561 in their raised positions, but it also holds the operating bar 540 in its elevated, or inoperative, position. Also, the depression of any key 400 or the "0" key 401 will operate, through the medium of the operating bar 540, to rock shaft 580 and thus rock the escapement bellcranks 560 and 561 to enable a single step of the carriage to the left.

It is obvious from what has preceded that the depression of one of the value keys 400 is effective to set one of the selection pins 481 to 485 (and also the pin 486 if the value key was for a value of "6" to "9"); to release the "0" latch 520; and to operate the escapement mechanism just described. The depression of the "0" key 401, on the other hand, sets the "1" pin 481 but does not release the "0" latch 520 so the segment 490 remains in its "0" position, and operates the escapement mechanism.

16. SEGMENT FEED MECHANISM

It will be recalled that the segments 490 are released by depression of the various value keys 400, and assume an angular position (clockwise from the position shown in Fig. 10) representative of the value of the key depressed. The multiplying operation in the conventional machines is controlled by the differential positioning of these segments, as fully described in the patents to Friden, Nos. 2,371,752 and 2,399,917, previously mentioned. This is the mechanism with which my invention is associated, although I control the repeated cycling of the machine from this angular position of the segment in a new and different manner. The preferred means of accomplishing this purpose is to provide the segments 490 with a series of teeth 496 on the rearward peripheral edge thereof. It can be noted that in the form used in the patents above mentioned, ten teeth were necessary (one tooth for each value and an extra tooth for a check pawl), but that in my form six are sufficient (one for each digital value up to "5" and an extra one for the check pawl), although ten are shown in the drawing. A feed means is provided which feeds the segment 490 back a single step for each machine cycle. A control means is also provided, which, when the segment returns to its original position, disables the segment feed pawl and initiates operation of a single shift of the carriage 60 to the right.

The segment feeding means, preferably utilized with my invention, is the same as that shown in the two patents just mentioned. In this form, it comprises a feed pawl 590 (see Fig. 10) which is pivotally mounted on an arm 591 by any suitable means, such as pin 592. The feed pawl lies in the plane of the lowest order shown in the multiplier window 405 (Fig. 1), and is therefore one order to the left of the highest order of the multiplier carriage when it is in its home position. The feed pawl therefore cooperates with the segment of the lowest order in which a value has been inserted. The arm 591 is reciprocated by means of an eccentric crank 593 mounted on an eccentric (not shown) affixed to the drive shaft 122, the eccentric crank and arm 591 being connected by a suitable pin 594. Thus, the arm 591 oscillates with each cycle of machine operation. The pawl 590 is resiliently biased forwardly into engagement with the teeth 496 of segment 490 by means of a suitable spring 595 tensioned between the pin 594 and an ear 596 integral with the pawl 590—the ear also forming a stop to prevent overtravel of the pawl 590 as it is rocked by the force of spring 595. In multiplying operations the pawl 590 is permitted to engage the teeth 496 of segment 490, thereby feeding the segment (counter-clockwise in Fig. 10) a single tooth space for each cycle of machine operation. However, in other operations the pawl is rocked away from the segment by means of an arm 599 which is rigidly secured to a short shaft 597 extending through the left-hand control plate 57. Normally, the shaft 597 and consequently the arm 599 are rocked to the position shown in Fig. 10, but are rocked to enable engagement of the pawl 590 with segment 490 upon the initiation of the multiplication operation. The shaft is returned to the position shown in these figures at the end of each order of a multiplication operation, when the segment 490 returns to the full-cycle, or home, position shown, by a means which will be later described. Thereupon, the feed pawl 590 is held out of engagement with the segment for the cycle required for an ordinal shift of the carriage to the next ordinal position. After such a shifting cycle, the shaft is permitted to return to its operative position and the pawl 590 can again engage the segment 490 in its plane of operation—which is the segment to the left of the one previously returned to its "0" position.

It should also be noted that the arm 599 carries an ear 598 which operates as a check pawl, the ear 598 engaging the teeth 496, to hold the segments 490 in the position to which they are moved by the feed pawl 590. By this means the segments 490 are returned step-by-step to their full-cycle position.

The return of a segment 490 to its full-cycle position causes the upper and rearward end thereof to engage the ear 654 carried on the forward end of a shift control lever 651. The rocking of the shift control arm 651 is effective, by means which will be fully described hereafter, to disengage the computation control shaft 137 and gate 135 in order to permit the spool 132 to return to its neutral position; to rock the shaft 597 to disable the feed pawl 590; to enable the right shift clutch and thereby initiate a single shift of the register carriage 60 to the right; and to enable a mechanism for feeding the multiplier carriage 472 a single step to the right. The multiplier carriage shifting means will now be described.

17. MULTIPLIER CARRIAGE SHIFTING MECHANISM

It is conventional, in machines of the kind described, to provide means for shifting the multiplier carriage 472 an ordinal step to the right at the termination of each series of ordinal operations. In the preferred form of my invention, I utilize the carriage shifting mechanisms shown in the patents to Friden, Nos. 2,371,752 and 2,399,917, previously mentioned. Briefly, this mechanism comprises a rack 610 with ordinally spaced teeth (not shown) mounted on the lower and rearward side of the carriage 472, and a shift pawl 611 which is rendered operative at the termination of each series of ordinal operations. It will be noted in Figs. 13 and 14 that the nose 567 on the free end of arm 560 has a cam face on its left flank, so that as the carriage 472 and its escapement rack 554 are moved to the right (to the left in these figures) the arm 560 is cammed downwardly to permit such movement. The shift pawl 611 has a single feed tooth 612 adapted to cooperate with the rack 610, but normally the tooth lies in a plane below the rack, as shown in Fig. 10. This pawl 611 is pivoted on a long pin 613 affixed to a bracket 614 extending upwardly from the base plate 56. The forward end of the pawl 611 is formed as a closed cam follower which embraces an eccentric, not shown, formed on the hub 615. The hub is slidably but non-rotatably mounted on a shaft 616, the lower end of which is journalled in the bracket 614 and the upper end of which is journalled in a second bracket, not shown. The shaft 616 carries a miter gear 617 at its upper end which meshes with a similar miter gear 618 rigidly secured to the main drive shaft 122. Thus, the shaft 616 rotates in synchronism with the main drive shaft 122, with consequent rotation of the hub 615 and idle oscillation of the pawl 611. Means is provided, however, for shifting the hub 615 upwardly on the shaft 616, whereby the tooth 612 of the pawl will lie in the palne of the rack 610. This shifting is preferably secured by means of a shaft 620 on which is secured, in a plane adjacent the hub 615, an arm 621. The arm 621 is provided with a pin 622 which engages an annular groove 623 formed in the hub 615. Thus, the rocking of the shaft, which is also controlled by the rocking of the shift control arm 651, previously mentioned, is effective to lift the hub 615 and pawl 611 into operative position. In this position the tooth will engage the rack 610 and shift the carriage a single step to the right to return it toward its home, or inoperative, position.

18. MULTIPLIER CONTROL MECHANISM

It has been mentioned that automatic multiplication in most of the commercial machines now available, is repeated addition or subtraction. In the preferred form of machine illustrated by the patents above mentioned, the computation controls are power set in accordance with the multiplier control key 402, 403, or 404 (of Fig. 1) manipulated by the operator. The control mechanism preferred and shown in the drawings, for the most part, is substantially the same as that shown in the multiplier patents of Carl Friden, Nos. 2,371,752 and 2,399,-917, already mentioned. The mechanism for these controls is shown primarily in Figs. 11, 16 and 23.

The computation control gate 135, in multiplication operations, is power set by the machine at the proper time by means of a cam follower bellcrank, or gate setting arm, 630, which, as shown in Fig. 11, is pivotally mounted on a shaft 631 extending between the left side frame plate 51 and the auxiliary, or control, plate 57. It can be mentioned at this point that the gate setting arm 630, along with other parts of the multiplier mechanism, such as the segment feed pawl 590 (Fig. 10), is normally inoperative, even upon depression of a multiplier control key. In the preferred form of the machine, the depression of the control keys 402, 403 or 404, initiates a program including the shifting of the carriage 60 to the extreme left-hand position shown in Fig. 1, followed by the automatic tripping of the multiplication mechanism —so that all multiplication operations are initiated in this extreme carriage position. The operation of the multiplier mechanism, which includes the gate setting arm 630, is initiated by the operation of the override pawl 260 (Fig. 5), which occurs during the clearing cycle after the carriage 60 has reached the extreme left-hand position. The rocking of the override pawl and the consequent operation of bail 270 (Fig. 4) have been explained previously. The operation of bail 270, following depression of a multiplier control key, will be effective to trip, or trigger, the multiplication mechanism, as will be described shortly. It is important to note that the operation of a multiplier control key does not directly operate the multiplication mechanism, it only conditions it for operation by the override pawl. Obviously, the computation control gate must be held in its neutral position during the shifting operations, so that the first thing to be done when the multiplication operation is initiated is to set the gate to the proper position, and this is done by the gate setting arm 630, as will now be described. The gate setting arm 630, at its upper end, carries four arms, or interponents, pivotally mounted thereon by any suitable means, such as pin 632 (see especially Figs. 16 and 23). These arms are: the positive control arm 633; and the subtractive control arm 634 (which correspond to the control arms 362 and 374, respectively, of patent No. 2,399,917); an auxiliary positive control arm 635; and an auxiliary subtractive control arm 636.

The positive, or additive, control arm 633 extends rearwardly from the pivot pin 632 and at its rearward end is bent upwardly and rearwardly, as shown in Fig. 16, to provide an upper edge 640 and a notch 641. The shoulder of notch 641 is adapted to engage a pin 642 carried on the upper end of a two-armed lever 643 which is fixedly mounted on the computation control shaft 137. The arm is resiliently biased in an upward direction by a spring 644 tensioned between the arm and a long pin 645 extending to the left from an intermediate plate 899 shown in Fig. 23. Normally, the arm 633 is held in its depressed, or inoperative, position shown in Fig. 16, against the force of its spring 644, by means of a roller 650 carried on the rear end of the shift control lever 651.

This shift control lever 651 is pivotally mounted on a short transverse shaft 652, and is resiliently biased to an inoperative position (counter-clockwise in Fig. 16) by a spring 653 tensioned between a seat on the rear arm of the lever and a stud on the frame plate, not shown. It can be noted at this point that the forward end of the arm 651 is provided with a nose 654 adapted to engage the upper segment of the aligned multiplier control segment 490 when it returns to the "0" position; and that the arm 651 has been rocked (clockwise in Figs. 11 and 16) at the initiation of a multiplication operation by means which will hereinafter be described. For the moment, it will suffice to note that when the shift control lever 651 is in its normal position shown in Figs. 11 and 16, the roller 650 rocks the additive control arm 633 downwardly against the bias of its spring 644, thereby holding the shoulder 641 away from the pin 642. However, when the arm 651 is lifted, as it is during a multiplication operation, then the arm 633 is free to rise, if the operation in the particular order is addition (auxiliary control means being provided to determine additive or subtractive operation, as will shortly be described). If the machine is conditioned for additive operation, then the arm 633 can rise, whereupon the shoulder 641 engages pin 642 and the subsequent operation of the bellcrank 630 rocks the computation control gate 135 into its additive position. The bellcrank, or gate control arm, 630 is always latched when moved to its operative position, so the interponent 633 will hold the gate 135 in its additive position throughout the operation in the particular order. However, when the aligned segment 490 returns to the "0" position, it rocks the arm 651 (counter-clockwise in Figs. 11 and 16) against the bias of its resilient setting means, thereby disengaging the arm 633 and enabling the computation control gate 135 and its setting shaft 137 to return to their neutral positions for a shifting operation, and also releases the gate control arm, or bellcrank, 630 so that it can return to its inoperative position.

The negative, or subtractive, control arm 634 extends rearwardly for a short distance from the pin 632 and then divides at a point below the roller 650 into an upstanding projection 660 and a depending extension 661 (as is shown particularly in Figs. 16 and 22). The upstanding projection, or nose, 660 rises to a plane identical with that of the upper edge 640 of arm 633, and is likewise engaged by the roller 650. Consequently the arm 634, if free from the computation control mechanism hereinafter mentioned, will operate under the control of the arm 651 in the same manner as the additive, or positive, control arm 633. It should be mentioned here that in all multiplication operations not more than one of the control arms 633 or 634 will be operative—one or the other being rendered inoperative, and occasionally both, by the control means hereinafter to be described. The downwardly and rearwardly extending portion 661 of arm 634 is provided with a shoulder 662 adapted to engage a pin 663 on the lower end of the two-armed lever 643. The arm 634 is likewise resiliently biased in an upward direction by a spring 664 tensioned between the arm and the long pin 645. Thus, when this negative, or subtractive, control arm 634 is permitted to do so, it will rise under the force of its spring 664; whereupon the shoulder 662 engages a pin 663. Thereafter the operation of the gate control arm 630 rocks the shaft 137 and the computation control gate 135 mounted thereon, in a subtractive direction, and holds the shaft in that position until the shift control arm 651 is operated.

It has previously been mentioned that when the multiplication operation, as controlled by the segments 490, terminates upon an operation in the reverse direction (when under the control of the values "6" to "9," inclusive), it is necessary to take a single cycle of operation in the next higher order in the selected direction. When the multiplier carriage 472 has returned to its home position, the nose 654 of the shift control lever 651 will overlie a fixed stop 655 carried on the left frame plate 475 of the multiplier carriage (see Figs. 10 and 25), thereby holding the arm 651 in its inoperative position. Such positioning of the shift control arm 651 positions both arms 633 and 634 in their inoperative positions. It is therefore necessary to provide additional means for positively rocking the computation control gate and shaft 137 to enable a single cycle operation in the selected direction. This is secured by the auxiliary interponents 635 and 636. Both of these interponents 635 and 636 are free from the control of the arm 651 or its roller 650, but are mounted on the gate setting arm 630.

The auxiliary additive control interponent, or arm, 635 extends rearwardly from the pivot pin 632, as shown in Figs. 11 and 16, terminating in an arcuate face 670 adapted to engage the pin 642 when the arm is lifted. This arm is resiliently biased in a downward direction by a suitable spring 671 and is blocked from rotation thereby beyond the position shown by means of an upwardly extending projection 674 which has a nose adapted to engage the shaft 902. The additive interponent is lifted, when the operation requires, by means of a sliding cam 1196 which is moved forwardly when the highest order pin 486 has conditioned the machine for operation in the reverse direction. This cam member is provided with a cam nose 672 which engages a cooperating cam face 673 formed on the rear end of the interponent 635, as shown. The cam 1196 will be operated whenever the operation in the highest order of the multiplier has been in a reverse direction and the machine has been set for additive multiplication, to control a single cycle of operation in the additive direction.

The negative interponent, or subtractive control arm, 636 extends rearwardly from the pivot pin 632, as shown in Fig. 16, and terminates in a rearward cam face 675. The cam faces 675 of arm 636 and 673 of arm 635 normally lie in the same transverse plane and both are operated by the sliding cam member 1196, which can be shifted, by means hereinafter to be described, to engage either interponent 635 or 636. The subtractive control interponent 636 is provided with a downwardly extending projection 676 which terminates in a shoulder 677, likewise adapted to engage the pin 663 on the lower end of the two-armed lever 643. This interponent is normally biased downwardly (counter-clockwise in Fig. 16) by a spring, not shown, but similar to, and lying behind, spring 671 of arm 635. This subtractive control arm is provided with a stop 678 projecting forwardly from the depending portion 676, which, in the normal position of the parts, abuts against a collar on the shaft 893 in order to prevent overrotation of the arm 636. When this arm is lifted, which occurs upon operation of the sliding cam 1196 when the machine has been set for subtractive multiplication, the shoulder 677 engages the pin 663, whereupon the operation of the gate setting arm 630 rocks the lever 643, shaft 137 and computation control gate 135 in a subtractive direction.

The gate setting arm 630 is latched in its effective position in order to hold the operative interponent 633 to 636, inclusive, in its effective position throughout the operation in the particular order. The latch is shown Fig. 11 particularly, and comprises a latching arm 790 which is pivotally mounted on the frame plate by any suitable means, not shown. The lower end of the arm 790 is provided with a shoulder 792 which is adapted to engage a square stud 793 on a bellcrank extension of the gate setting arm 630. The latch arm 790 is resiliently biased into latching position (counter-clockwise in Fig. 11) by any suitable means, such as spring 794. Thus, when the control arm 630 is rocked rearwardly by its operating cam 780, it is latched in its operative position by the engagement of the shoulder 792 with the square stud 793 and remains in that position until the shift control lever 651 is operated at the termination of each ordinal operation. The latch arm 790 is moved to its inoperative position by the rocking of a control lever 865, which is controlled by the operation of the shift control arm 651, as will hereinafter be described, by means of the projection 795, which extends forwardly from the main portion of the latch arm 790. The forward end of this arm carries a stud 796, which underlies the arm 865 previously mentioned, whereby the latch will be rocked (clockwise in Fig. 11) to its unlatching position whenever the shift control lever 651 initiates operation of the shifting mechanism, as will hereinafter be described.

The assembly comprising the bellcrank 630 and the four computation control interponents 633, 634, 635 and 636 is biased into an inoperative position (clockwise in Figs. 11 and 16) by any suitable means, such as spring 637 tensioned between one of the computation control arms and a substantially vertical link 845. Normally, the bellcrank 630 is inoperative as its operating cam 780 is resiliently biased away from the plane of the bellcrank 630 and its follower roller 638. The cam, however, is shifted into its operative position upon the tripping of the multiplier initiating mechanism, as will next be described, and when so shifted it rocks the gate control arm (counter-clockwise in these figures), whereupon the operative interponent will engage its pin 642 or 663 and thus rock the computation control gate 135 in the proper direction.

A trigger, or latch arm, 690 (see Fig. 15), is pivotally mounted on the left-hand auxiliary, or control, plate 57 by any suitable means, such as large-headed stud 691. This lever 690 is strongly biased to its operative position (clockwise from that shown in Fig. 15) by means of a spring-powered arm 694 to which it is connected by means of pin 692 on the rear end of the lever 690 engaging a slot 693 in the forward end of the spring-powered lever 694. The lever 694 is pivotally mounted on the auxiliary frame plate by any suitable means, such as stud 695, and is biased rearwardly by the relatively strong spring 696.

The trigger, or latching lever, 690 is latched in its inoperative position by two latch means, one of which is controlled by the depression of the multiplier control keys 402, 403 and 404, and the other of which is controlled by the operation of the override pawl 260 and the mechanism controlled thereby.

The first of these latches is the bellcrank 700 which is pivotally mounted on the auxiliary frame plate 57 by any suitable means, such as pivot stud 701, and which is resiliently urged to a latching position (the counter-clockwise position shown in Fig. 15) by a spring 702 tensioned between the forward end of the arm and a cross shaft 705. In the normal position of the parts, the upper arm of the bellcrank 700 engages an ear 697 formed on the forward end of the latching lever 690. The latch 700 is released by depression of any of the multiplier control keys 402, 403, or 404 through the medium of a pin 703 riveted on the lower arm of a U-shaped lever 704. The lever 704 is rigidly secured to a short transverse shaft 705 which extends between the auxiliary frame plate 714 and the left side control plate 57. The shaft is rocked by depression of any of the control keys mentioned, the mechanism controlled by keys 403 and 404 being shown in Fig. 15 and that controlled by the key 402 being shown in Fig. 18. As shown in Fig. 15, the upper arm of the U-shaped lever 704 carries a pin 706 which underlies the control levers 742 and 745, respectively, connected to the control keys 403 and 404, as shown. The multiply key 402 on the right-hand side of the multiplier keyboard (see Fig. 18) rocks shaft 705 by means of the mechanism shown in Fig. 18. This mechanism comprises a pin 707 riveted on, or otherwise secured to, the key stem 402, which pin overlies an arm 708, which is pinned to, or otherwise rigidly mounted on, the shaft 705. Thus, the depression of any one of these three keys causes the rocking of the U-shaped lever 704 (counter-clockwise in Fig. 15), whereupon the pin 703 on the lower arm thereof rocks the latch 700 to its disengaging position.

The various multiplier control keys 403 and 404 are latched in their operative, or depressed, positions by latch arms, such as arm 800 for the key 402 (as shown in Fig. 18) and 801 for the accumulate multiply key 403 and negative multiply key 404 (see Fig. 10). Both of these latches are mounted on a shaft 802. The latch 801, as shown in Fig. 10, has a downwardly extending arm 803 which terminates adjacent the base plate 56. This lower arm 803 is engaged by an extension 804 of the carriage escapement lever 550, which has previously been mentioned. The latch arm 801 is therefore rocked (counter-clockwise to its unlatching position) whenever the multiplier carriage is attempted to be moved beyond its home position, thereby rocking not only the latch member 801, but the shaft 802 to which it is attached. Thus, any one of the three control keys is released from its latch upon the attempted shifting of the carriage beyond its home position.

The second latch comprises an arm 715 (Fig. 15) rigidly mounted on the left end of shaft 716. The shaft 716 extends from the left auxiliary, or control, plate 57 to an intermediate plate 714 (see Fig. 18) and at its right end carries an arm 718 rigidly secured thereto. The latch arm 715 is rocked upwardly (clockwise in Fig. 15) by means of a spring 717 tensioned between a stud on the control plate 57 and a stud on the rear end of the arm, as shown.

The latch arm 715 is provided with an upwardly extending notched arm 727, which normally engages the roller stud 726 mounted on the forward end of the latching lever 690. When the arm 715 is in its normal position, the stud 726 engages the shoulder, or notch, on the upper end of arm 727, and the latching arm is latched in its inoperative position. If the latch 700 has been rocked to its unlatching position (by one of the control keys) then the rocking of shaft 716 (by operation of the override pawl) causes the arm 727 to move away from stud 726 and the arm 690 is enabled to drop to its operative position.

The upper end of the arm 718 (Fig. 18) has pivotally mounted thereon, as by means of pin 719, a rearwardly extending arm 720. This arm is resiliently biased (clockwise in Fig. 18) to a latching position by means of a spring 721 tensioned between a projection on the arm 720 and a disabling arm 722. The disabling arm 722 is pivotally mounted on the transverse shaft 215 and at its rearward end is provided with a perpendicular ear 723, which underlies the pusher link 213 that controls the operation of the shift clutch rod 211. This arm, which is shaped as a bellcrank, as shown in Fig. 18, carries on its lower arm a pin 724 which engages a notch 725 in the arm 720. The left end 274 of the bail 270 (which is operated from the override pawl 260 through the medium of slide 265, bellcrank 268, and link 269, as previously mentioned), underlies the rear end of the disabling arm 722. Therefore the operation of the override pawl, among other things, lifts the rear end of this arm to disable the clear clutch, simultaneously pulling the link 720 rearwardly. This movement of the link 720 rocks the arm 718 and shaft 716 to which it is affixed (clockwise in Fig. 18 and counter-clockwise in Fig. 15), whereupon the latching arm 715 is rocked away from its engagement with the stud 726 mounted on the trigger arm 690. Thereupon the power lever 690 is permitted to rock from the force of spring 696, if the first latch 700 has also been moved to its releasing position.

It will be noted that the latch arm 715 will be operated upon any attempted shifting of the carriage 60 to the left beyond its extreme terminal position. However, such rocking of the latch 715 will not be effective unless one of the multiplier keys 402, 403 or 404 has been depressed to release the latch 700. Likewise, release of latch 700 by depression of any of the multiplier control keys will not release the trigger, or control arm, 690 until the override pawl has been operated. By this means the operation of the multiplication mechanism is programmed to follow the shifting and clearing operations.

19. PRELIMINARY SHIFTING AND CLEARING CONTROLS

The preliminary steps of shifting the carriage 60 to the extreme left-hand position and clearing of the register in conventional multiplication (initiated by depression of key 402) will now be described. This mechanism utilizes the light key touch mechanism shown in Fig. 6 and previously described. It is seen by reference to Fig. 18 that the multiplier key 402 carries a roller 730 on its lower end. This roller engages a slot 731 in a lever 732 which is pivotally mounted on the auxiliary frame plate 714 by any suitable means, such as stud 733. The arm 732 is provided with a projection upon which is mounted a roller 734, which roller engages the forward edge of arm 735 rigidly secured to the control shaft 290. Thus the depression of the key 402 rocks the arm 732 (counter-clockwise in Fig. 18), to rock arm 735 and shaft 290 (clockwise in Figs. 18 and 6). The rocking of the shaft 290, as previously explained in connection with Fig. 6, causes the engagement of the clutch, the operation of the motor, and, under the power thereby provided, causes the engagement of the left shift and clearing clutches. Thereupon the carriage is shifted to its extreme left-hand position and the registers are cleared.

The depression of the keys 403 and 404 are effective to initiate machine operation and to program it for the leftward shift of the carriage while disabling the clearing mechanism—key 403 causing additive operation of the machine while key 404 causes subtractive operation to provide the complement of the true product. Both keys are effective to rock shaft 290 and thus initiate a shifting operation, and also are effective to disable the clearing clutch so as to prevent erasure of values standing in the accumulator. The mechanism for securing these operations will now be described. It is seen in Fig. 15 that the accumulate multiply key 403 carries, on the lower end of its stem, a stud 740 which is embraced within a slot 741 formed in the forward end of a control lever 742. This lever is pivotally mounted on a shaft 743 at the upper rear portion of the machine. Similarly, the negative multiply key 404 is provided with a stud 748 that is embraced within a slot 744 formed in the forward end of a lever 745 lying immediately adjacent the lever 742 and likewise pivoted on the shaft 743. It can be mentioned at this point that the operation of this lever 745 will be effective to not only initiate machine operation, but to also reverse the direction of operation of the accumulator from that which would be initiated by depression of the keys 402 or 403, by means which will be described shortly.

Adjacent and immediately to the left of the two levers 742 and 745 is a free lever 746, likewise pivotally mounted on the shaft 743. This latter lever is provided with a roller stud 747 at its forward end, which stud extends to the right to underlie both levers 742 and 745. Thus, operation of either key 403 or 404 is effective to rock the arm 746. The lever 746, which is operated by both keys 403 and 404, has a downwardly extending projection 750, the lower end of which overlies a pin 751 carried by the rearwardly extending end of an arm 752. The arm 752 is rigidly mounted on the extreme left-hand end of shaft 290. The depression of either of these control keys, therefore, will be effective, through the rocking of arms 742 or 745 and arm 746, to rock shaft 290 and thereby initiate the operation of the power-operated mechanism described in connection with Fig. 6 to provide for an initial shift of the carriage 60 to its extreme right-hand position.

The operation of either of these two keys is also effective to disable the clearing mechanism, as just mentioned. It will be realized that negative multiplication is ordinarily desired only when the operator is subtracting one product from some value previously accumulated in the product register 62. Similarly, the accumulate multiply key 403 is used to accumulate one product to another additively, so that this key would not be used unless one desired to eliminate the clearing of the register. This operation of blocking, or disabling, the operation of the clear mechanism is readily secured by the rocking of the initiating lever 746, as will now be described. This is readily accomplished in the machine with which my invention is preferably associated by means of a flat-headed stud 760 riveted on, or otherwise rigidly secured to, the arm 746 at an intermediate point. This stud 760 is embraced within the slot, or bifurcation, 761 in the upper end of a connecting link 762. The link 762 is pivotally mounted on an arm 763 by any suitable means, such as pin 764. The arm 763 is rigidly secured to a short shaft 765 which extends from the control plate 57 (as shown in Fig. 15) to the intermediate plate 714, shown in Fig. 18. The right end of the shaft (as shown in Fig. 18) carries an arm 766 rigidly secured thereto. The arm 766 is provided with a stud 767 which engages the forward edge of a bellcrank extension 768 on the pusher link 213. Thus, the rocking of the arm 746 rocks shaft 765 and arm 766, which, in turn, rocks the pusher link 213 (counter-clockwise in Fig. 18) away from engagement with the clutch control rod 211. Thus, the subsequent rocking of shaft 215 by the power-operated control mechanism previously described will not effect a clearing operation. It will be recalled that the clearing operation occurs only when the carriage is in the extreme left-hand position, so there is no danger of a simultaneous operation of the clearing and the shifting mechanisms.

It will be recalled that the trigger mechanism by means of which the multiplication is initiated, that is, the control arm 690 shown in Fig. 15, is latched in its inoperative position by the two latches 700 and 715, the first of which is released by the depression of one of the three keys themselves and the latter is released by operation of the override pawl, as previously described. Thus, the depression of one of these three keys first initiates the leftward shifting of the carriage, and, when that position is reached, the override pawl releases the latch 715 to enable the spring-powered arm 690 to rock (clockwise in Fig. 15). The rocking of this arm is effective to: (a) shift the multiplier gate setting cam to its operative position (to thereby enable the operation of the gate setting arm 630 and the mechanism associated therewith); (b) enable the operation of the segment feed pawl 590; and (c) condition the multiplier carriage shifting mechanism for operation by its feed pawl 611, and the automatic register carriage shifting mechanism, both of which are initiated by rocking of shaft 620 (the operation of the shaft and consequently the shifting mechanism being under the control of the shift control arm 651, which, in turn, is operated by the various segments 490 returning to their "0" position). These operations will now be described.

*a. Shift the gate setting cam to its operative position*

It will be recalled in connection with Fig. 16 that the various gate setting arms 633, 634, 635 and 636 are mounted on the bellcrank follower 630. At the time of describing this mechanism it was mentioned that the cam which controls their operation was normally in the plane removed from the plane of the arm 630 of the follower roller 638 mounted thereon. The means for moving this gate setting cam 780 to its effective position will now be described. This cam is keyed to the main drive shaft 122, but is longitudinally movable therealong. Normally, the cam is resiliently biased to the left by a compression spring 781 (see Fig. 17) which surrounds the main drive shaft 122 and is seated upon the right side of the cam 780 and a second cam 782 which is not here pertinent. Thus, the cam, as shown in Fig. 17, normally lies to the left of the follower rollers 638 mounted on the upper end of the gate setting arm 630.

However, the rocking of the multiplier initiating arm, or trigger, 690, among other things, forces the cam to the right against the bias of its spring 781 to place it in operating position (shown in dotted lines in Fig. 17). The rear end of the arm 690 is formed with an integral bracket upon which is rotatably mounted a roller 783 (see also Fig. 15). This roller 783 engages the cam face 784 formed on the lower end of a lever 785. The lever 785 is pivotally mounted by any suitable means, such as pin 786, which is carried by a bracket 788 extending inwardly (to the right) from the left-hand control plate 57. The upper end of the lever 785 is provided with a roller 787 which engages the left face of the cam 780. The rocking of the initiating lever 690 from the force of its operating spring 696 (clockwise in Fig. 15), rocks the lever 785 (clockwise in Fig. 17) to force the cam 780 into the plane of the follower roller 638. Thereupon, at the beginning of the next cycle of operation, the high point of the cam 780 engages the roller 638, thereby rocking the gate setting arm 630 (counter-clockwise in Fig. 16). This operation, as previously described, rocks the computation control gate 135 in one direction or the other, as determined by the inter-ponents 633 to 636, inclusive, one of which will be in an operative position.

It can be mentioned that the trigger, or initiating arm, 690 remains in the rocked position until it is restored by the attempted shifting of the multiplier carriage beyond its home position, thus holding the cam in its operative position until the multiplication operation is terminated. The initiating arm 690 is returned to its latched position by the attempted shifting of the multiplier carriage 472 beyond its home position. It has previously been mentioned that this attempted shifting of the carriage beyond its home position is effective to rock the escapement lever 550, which carries arm 804 that engages the lower extension 803 of the latch arm 801, thereby rocking the arm and shaft 802 to which it is secured. The left end of shaft 802 (Fig. 15) carries an arm 810 which extends rearwardly to a point below, and slightly to the rear, of the roller 726 secured to the forward end of the power lever 690. When the parts are in their normal, inoperative, position, they lie in the relationship shown in Fig. 15. However, when the latches 700 and 715 are released and power lever 690 is permitted to drop, the roller 726 engages the upper edge of the arm 810. Then, when the carriage is moved beyond its home position, the rocking of the arm 801 (Figs. 10 and 18) rocks shaft 802 (clockwise in Fig. 15) whereupon the arm 810 lifts roller 726 and consequently the forward end of lever 690. At this time the control key is simultaneously released so that the U-shaped lever 704 has been permitted to rock to its normal position and latch 701 is ready to snap under the forward ear 697 of the lever 690. The latch 715 was operated once only by the override pawl so it was immediately released and is ready to snap under the roller 726 as soon as the lever 690 is lifted. Thus, the momentary lifting of arm 690 enables it to be relatched in its operative position. Immediately afterward the machine operation terminates with the arm 690 doubly latched in its inoperative position.

b. Enable segment feed pawl

It will be recalled that the segment feed pawl 590 (see particularly Fig. 10) is resiliently biased into engagement with the aligned segment, but normally is held in a disengaged position by means of arm 599 mounted on the transverse shaft 597. This shaft extends through the left control plate 57 (as shown in Fig. 15) and carries an arm 820 rigidly secured to its left end. This arm is biased upwardly (clockwise in Fig. 15) by means of a spring 822 tensioned between a stud on the frame plate and a pin 821 on the outer end of the arm (which biases the shaft 597 and its inner control arm 599 into the operative position—counter-clockwise in Fig. 10). Normally, the arm 820 is held in its lowered, or inoperative, position by means of a link 823, the lower end of which is pivotally mounted on the pin 692 that connects the initiating arm, or trigger, 690 with the power arm 694. This link is provided, at its upper end, with a slot 824 that embraces the pin 821. Thus, the latching of the trigger 690 in its inoperative position, by means of link 823, holds the arm 820, shaft 597 and arm 599 in their inoperative positions against the bias of spring 822. However, when the trigger is released and link 823 is permitted to rise, then the arms 820 and 599 rock forwardly (clockwise in Fig. 15 and counter-clockwise in Fig. 10) to enable the feed pawl 590. The link 823 remains in its raised position throughout the multiplication operation, but the feed pawl 590 must be disabled at the end of each ordinal series of operations, so there must be a yield between the link 823 and feed pawl 590. Such a yield is provided by the slot 824 which connects link 823 to arm 820.

c. Condition carriage shifting mechanisms

It is obvious that means must be provided to shift both the product carriage 60 and the multiplier carriage 472 one ordinal space at the termination of each ordinal series of operations, and then to initiate repeated accumulation in the next order. Such an operation necessarily involves the termination of the accumulation of values in the product register, i.e., temporarily release the computation control gate and return it to its neutral, or inoperative, position, during the shifting operations, and the re-enablement of the computation control mechanism in the next order with the computation control gate again in operative position. The means for accomplishing this purpose is under the control of the shift control lever 651 (see particularly Figs. 11, 15 and 16), which is controlled by the return of the operative multiplier segment 490 to its "0" position. This lever is pivoted on a transverse shaft 652 which extends from the left side control plate 57 to the intermediate bracket 899 (see Fig. 23). On its forward end the arm is provided with an ear adapted to abut the top portion of the multiplier segment 490 of the order immediately to the left of the inoperative position, i.e., the lowest of the orders in which a value has been inserted. The lever is biased to an inoperative position (counter-clockwise in Figs. 11 and 16) by means of a spring 653, which normally holds the tip 654 out of engagement with the aligned multiplier segments, even when they stand in their "0" positions.

The shift control arm 651 is rocked to an operative position (clockwise in Figs. 11 and 15) by the rocking of the trigger, or latching arm, 690 and the power-operated arm 694, previously mentioned. It will be seen by reference to Fig. 15 that the rear end of the power arm 694 carries a pin 830 which is embraced in a slot 831 formed in the forward end of a two-armed lever 832. The lever 832 is pivotally mounted on the auxiliary, or control plate, 57 by any suitable means, such as pivot stud 833. Lever 832 is provided with a pin, or rivet, 834 at its rear end, which is embraced within a slot 835 formed in the lower end of a link 836. The upper end of the link 836 is bifurcated as at 837 to engage a pin 838 formed on the rear end of the shift control lever 651. A tension spring 839 connects a pin on the rear end of the lever 832 with a pin on the lower end of the link 836, whereby the rocking of the lever 832 (clockwise in Fig. 15) resiliently biases the shift control arm 651 (likewise clockwise in these figures) so that the ear 654 on the forward end thereof lies slightly below the "0" position of the aligned segment 490, provided the segment is in a value position other than "0." However, the return of the segment to the "0" position will lift the forward end of the lever 651, thereby rocking it (counterclockwise in these figures) against the bias of the spring 839. Such rocking of the arm will disable the feed pawl 590 and enable shifting of the carriages 60 and 472.

The rear arm of the shift control lever 651 supports a depending link 845 (see Figs. 11 and 16) which connects shift control arm 651 to a hook link 846. Both connections of the link 845 are pivotal, the one with the control arm 651 being by a suitable pin, or stud, 848 and the connection with the reciprocable hook member 846 being by another suitable pin, such as 847. The forward end of the hook link 846 is pivotally mounted on an arm 849 pivotally mounted on the transverse shaft 620. The arm 849 normally lies to the right of a roller 789 mounted on the inner face of the plate cam 780 (see Fig. 17). Whenever the cam is shifted to its operative position, the pin 789 is moved sufficiently to the right to engage the upper end of the arm 849 with each cycle of operation, shortly before the full-cycle position is reached. It can be noted that this arm 849 and consequently the hook link 846 is reciprocated with each cycle of operation, the hook link 846 and arm 849 being resiliently biased rearwardly by any suitable means, such as the spring 637, which is tensioned between the control interponent 633, this spring serving to rock the follower arm 630 forwardly and the hook link 846 and arm 849 rearwardly.

The rear end of the hook link 846 is provided with a shoulder, or hook member, 850 which is adapted to engage a square stud 855 mounted on the lower end of a latch member 856. The latch 856 is pivotally mounted on the intermediate plate by any suitable means, such as screw stud 857 and is resiliently biased (in a clockwise direction in Figs. 11 and 16) by a suitable spring 858. The latch member is provided with a shoulder 859, which is adapted to engage a transverse section of a rearwardly extending arm 865. This last-mentioned arm 865 is rigidly secured to the shift control shaft 620, and thereby operates as a latch to control the rocking of the shaft 620.

When the shift control arm 651 is in its normal position for controlling multiplication, i.e., in its operative position after it has been raised by the link 836 (clockwise of that shown in Figs. 11 and 16), the hook 850 lies above the stud 855. In this position of the parts the hook link 846 and arm 849 are reciprocated idly shortly before the end of each cycle of operation. However, when the feeding of the alined segment 490 results in it reaching its "0" position, which occurs rather early in the cycle, the engagement of the upper end of the segment with the ear 654 rocks the shift control arm 651 (counter-clockwise in these figures). Such rocking of the arm 651 drops the hook 850 over the stud 855, whereupon the subsequent rocking of arm 849 pulls the latch 856 forwardly to release the arm 865.

The arm 865 and shaft 620 are biased in a counter-clockwise direction, when viewed from the left as in Fig. 11, by a relatively strong spring 866 tensioned between a stud on the frame plate and an arm 867 rigidly mounted on the shaft 620. The arm 867 is mounted on the shaft 620 immediately adjacent the arm 849 and likewise lies in the path of travel of the roller 789 on the plate cam 780. Normally, the arm 867 barely engages the roller 789 because the arm, its shaft 620 and the arm 865 are latched in the position shown in Fig. 11. However, when the hook link 846 operates latch 856 to release arm 865, the spring 866 pulls the assembly of arm 867, shaft 620 and arm 865 (counter-clockwise in Fig. 11). In that event the shaft 620 rocks to its shift-initiating position—the operation of shift control arm 651 having already moved the interponents 633 or 634 to their inoperative position. The arm 865 and shaft 620 are released at the end of one cycle of operation and are restored at the end of the next cycle, for the upper end of the arm 867 will be engaged by the roller 789 on the next cycle of operation, thereby rocking the parts back to the position shown. If it should happen that the next multiplier value is a "0," so that two shifts are necessary, the mechanism just described will be recocked by the arm 867, but the ear 654 on the forward end of the shift control arm 651 will be held elevated by the upper tip of the next segment 490, thereby holding arm 651 in its rocked position, thereby re-enabling hook line 846 to again release latch 856 to reinitiate the necessary shift cycle.

The rocking of the arm 867 from the release of latch 856 is effective, among other things, to disable the segment feed pawl 590. It will be seen in Fig. 11 (which is a view taken on a plane intermediate the intermediate plate 51 and the control plate 57), that the shaft 597, upon which the blocking arm 599 is mounted, has an arm 870 rigidly mounted thereon. This arm is connected by a link 871 to the arm 867 by means of a pin-and-slot connection, including the pin 872 on the arm which is embraced within a slot 873 in the rear end of the link. Thus, the rocking of the arm 867 pulls the link 871 rearwardly, thereby rocking the arm 870 and shaft 597 (counter-clockwise in Fig. 11 or clockwise in Fig. 10) to rotate the blocking arm 599 rearwardly and force the feed pawl 590 away from the ordinally aligned segment 490. Thus, the release of latch 856 is effective to terminate operation of the feed pawl for the carriage shifting cycle which follows the release of the latch.

The rocking of the shaft 620, which results from the release of arm 865 from the latch 856, is effective to initiate a shift of the multiplier carriage 472 and the register carriage 60. It will be recalled that the control arm 621 is mounted on the shaft 620 (see Fig. 10) and that the rocking of the shaft (clockwise in Fig. 10) lifts the shift pawl 611 into alignment with the carriage feed rack 610. This operation enables the feed pawl to engage the rack, thereby shifting the carriage one ordinal step to the rgiht in the single cycle between release of arm 865 and the restoration of the parts by the operation of cam 780 on arm 867.

The rocking of the shaft 620 is also effective to move the right shift clutch 231 to its operative position, thereby enabling a rightward shift of the register carriage 60. The mechanism therefor is shown particularly in Fig. 4, in which it is seen that the shaft 620 extends to the right frame plate 52. Adjacent the plane of the right shift clutch control rod 233, an arm 880 is slidably and non-rotatably mounted on the shaft. This arm is resiliently biased to the left by a suitable spring 881, which preferably is mounted around the shaft 620 and is seated between an arm mounted on the shaft, not here pertinent, and the collar of the arm 880. In most situations the arm 880 is held to the right against the bias of its spring by means of a leftwardly extending bar 882, the left end of which bears against the right side of the multiplier carriage 472. Thus, the arm 880 is translated to the right whenever the multiplier carriage is in its home position, but as soon as a value has been inserted into the multiplier mechanism and the carriage has been allowed to escape to the left, the force of spring 881 biases the arm 880 to the left to its operative position. The upper end of the arm 880 is adapted to cooperate with a pin 883 mounted on the upper end of an arm 884, the arm being rotatably mounted on the shaft 238. The pin 883 engages the forward end of the shift clutch control rod 233 in a manner similar to the engagement of this rod by the shoulder on the pusher link 240, previously described. Thus, the rocking of the arm 880, which occurs when the arm 865 on the left side of the machine is released, rocks the pin 883 and arm 884 to translate the clutch control rod 233 rearwardly and thus engage the right shift clutch (provided the multiplier carriage has been shifted to the left by the entry of values thereinto). The shaft 620 is held in its rocked position until near the end of the shifting cycle of operation, thereby holding the shift clutch engaged throughout that period. Prior to the end of the cycle the shaft 620 and arm 880 will have been returned to their cocked position by means of the rocking of arm 867 from cam roller 789. However, the shift clutch is held in its engaged position by a conventional full-cycle mechanism, not here shown, throughout the full shift cycle.

Thus, the rocking of the shift control lever 651, from the engagement of the ear 654 on the forward end thereof with the aligned multiplier segment 490, has caused the hook link 846 to rock the latch 856 to its disengaging position. The latch releases arm 865, which, from the bias of spring 866, rocks downwardly (counter-clockwise in Fig. 11), thereby rocking shaft 620 in the same direction. The rocking of shaft 620 rocks the restoring arm 867 into the path of travel of roller 789 on the cam 780 and simultaneously disables the segment feed pawl 590 through the movement of link 871 and arm 870, whereby the feed pawl is disabled for a cycle of operation. Simultaneously, the rocking of shaft 620 (counter-clockwise in Fig. 11 and clockwise in Fig. 10) has rocked the shift pawl control arm 621 to lift the feed pawl 611 into the plane of the feed rack 610. Thus, the multiplier carriage 472 will be fed a single step in the cycle of operation which follows the operation of the control lever 651. Simultaneously, the rocking of the shaft 620 has enabled the right shift clutch 231, just described, so that the register carriage is also shifted a single step to the right. At the end of this single cycle of operation, initiated by the release of latch 856, the roller 789 engages arm 867, thereby rocking it (clockwise in Fig. 11) to its cocked position in which the arm 865 is again latched over latch 856, and shift control arms 621 and 880 are returned to their inoperative positions, while link 871 and arm 870 are released to permit spring 822 to rock pawl shaft 597 to re-enable the segment feed pawl 590.

20. CENTRALIZING COMPUTATION CONTROLS DURING SHIFTING

Simultaneously with the lowering of hook link 846, the roller 650 on the rear end of the shift control arm 651 engages the upper edge of whichever interponent 633 or 634 is in operative position, thereby releasing the control lever 643 and shaft 137 (see Fig. 16). This shaft is normally biased to its neutral position by a spring centralizer, not shown, but lying on the right side of the machine. It is conventional, in the commercial machine with which my invention is preferably associated, to provide a full-cycle lock which holds the shaft in either adjusted position until the end of the tens-transfer operation, whereupon the computation control gate 135 and its shaft 137 are returned to their neutral, or inoperative, positions by the centralizer. The operative interponent is moved to its inoperative position by the operation of shift lever 651 early in the final cycle of an ordinal series of operations, but the gate setting arm 630 is held latched in its operative position until hook link 846 releases latch 856 shortly before the end of that cycle (at approximately the 300 degree position of the drive shaft and cam 780). The gate setting arm 630 is latched in its operative position by latch 790, as previously mentioned. The latch 790 has an arm 795 which underlies the transverse section of arm 865 so that the release of arm 865 also operates latch 790 to release gate setting arm 630.

The release of the gate setting arm 630, which occurs at about the 300 degree position, enables it to rock forwardly and move the various interponents away from engagement with their pins so that they may be reset for the next ordinal series of operations. While this arm will be rocked rearwardly immediately after the start of the next, or shift, cycle of operation, the latch arm 790 will be held out of latching position by its engagement with the arm 865, so that the cam 780 merely rocks the follower arm 630 and its interponents idly, for they return to their normal, or forward, position immediately. This enables the interponents to be set to operative position, as will hereinafter be described, during the latter part of the shifting cycle. Then, at the very start of the second cycle of operation, the high point of the cam 780 engages roller 638 and rocks follower arm 630 rearwardly a second time. This second rocking occurs after the arm 865 has been relatched in its triggered position, so that the follower arm 630 will be latched in its operative position. At this time, however, one of the interponents will have been set, and the mechanism will again be operative to control the direction of the computation.

It is preferable, in this connection, to provide means for positively centralizing the computation control gate 135 as the conventional spring centralizer, not shown, might not operate fast enough. It is, therefore, conventional to provide a power-operated centralizer, such as shown in Fig. 16, which is operated by the rocking of the arm 865. The centralizer, in its preferred form, comprises a rocker arm 890 pivotally mounted on a stub shaft 893. An upwardly turned arcuate slot 891 is formed in the rear end of the rocker, which slot is adapted to engage the pin 663 on the lower end of the two-armed lever 643 when the rocker 890 is rocked upwardly and the lever is in its neutral position. The upper end of this slot is provided with opposed cam faces 892 directed toward the slot, so that the rotation of the rocker 890 will engage the pin 663 and effectively cam it, and consequently lever 643 and shaft 137, to the neutral position. Preferably, the forward end of the rocker 890 is connected to the arm 865 by a short link 894, as shown in Figs. 11 and 16. Thus, the operation of the arm 865 will positively and immediately centralize the computation control gate 135, as soon as the conventional full-cycle lock, not shown, reaches the full-cycle position.

21. OPERATION CONTROLS—GENERAL

In order to more readily understand the mechanism of the present invention and to understand why the various controls are provided, it is probably worthwhile to pause briefly for a consideration of the conditions which must be met. In this connection it must be remembered that the present invention is designed to operate by the short-cut method in either additive or subtractive multiplication, and is therefore more complicated than those former machines which operated for additive multiplication only. It would also be well to remember that the present invention is primarily an improvement over the mechanisms shown in the patents to Friden, Nos. 2,371,752 and 2,399,917, and that the present invention can be most easily understood if considered on the basis of the machine of those patents, with particular emphasis on those mechanisms which differ therefrom. The mechanism of the present invention must meet the following situations:

A. Computation in normal shortcut multiplication involves two situations, both of which are straight forward operations:

(1) When the multiplier values are from "1" to "5," operation is normal, i.e., operation is in the selected direction in that it is repetitive addition for normal multiplication and repetitive subtraction for negative multiplication.

(2) When the multiplier value is "6" to "9," inclusive, operation is in the reverse direction for a number of cycles equal to the tens-complement of the multiplier value, that is, in normal multiplication, operation is subtractive; and in negative multiplication it is additive. Incidentally, this reverse direction of operation is determined by the projection of the pin 486 in the aligned order, which is the pin corresponding to the "6" pin of the conventional machine made in accordance with the teachings of the patents just mentioned.

B. When operation is in the reverse direction in one order (subtraction in normal multiplication or addition in negative multiplication) and operation in the next higher order is in the selected direction, there must be an additional cycle of operation in the higher order. That is, if the multiplier factor is "19," in normal additive multiplication, the operation in the first order will be a single subtraction operation followed by a shift of the carriage and two additive cycles in the higher order—the equivalent of multiplication by "20"—"1."

This result can be secured by providing a mechanism which disables the feed of the multiplier segment during the first cycle of operation in the higher order when going from operation in the reverse direction to operation in the selected direction. By this means the multiplier segment is not moved from its adjusted position until the second cycle of operation in the higher order, thereby providing an additional cycle of operation in the higher order. It should be noted in this connection that a "0" must be considered as a positive factor, so that when operation is in the reverse direction in the lower order and a "0" appears in the higher order, then one cycle of operation must be given in the "0" order, such operation to be in the selected direction.

C. When operation is in the reverse direction in two successive orders, the number of cycles of operation in the higher of those two orders will be one less than the tens-complement of that number. Thus, if the multiplier factor is "189," the operation in the lowest order will be a single subtractive cycle for conventional (additive) multiplication, a single subtractive cycle in the second, or tens, order (one less than the tens-complement of "8," which is "2"), followed by two cycles of operation in the third, or hundreds, order. It will be understood that if the negative multiplication key had been depressed for this operation, then the operation would have been additive in the first two orders, one cycle of operation in each; and subtractive in the third order in which two cycles were taken. This result is secured by taking one count, or one step of movement of the multiplier segment 490, during the shifting of the multiplier carriage.

This result can most easily be secured by providing an auxiliary mechanism which feeds the segment 490 of the adjacent higher order one step during the shifting cycle. Thus, in the higher order, when operation is in the reversed direction in both orders, the multiplier segment will have been rotated one step before operation in the higher order begins, thereby automatically providing one less cycle of operation than that determined by the value key.

D. When the multiplying operation terminates with an operation in the reverse direction (subtraction in normal multiplication or addition in negative multiplication) in the highest order of the multiplier factor, means must be provided for automatically shifting the carriage an additional step and multiplying a single time in the selected direction. That is, if the multiplier value is "89," then in an additive multiplication there will be a single cycle of subtraction in the lowest order, a single cycle of subtraction in the higher order, then an automatic shifting, and finally, a single addition in the order above the highest order of the multiplier; and if the machine is operated negatively, then there will be positive operation in the two lower orders and a single subtractive operation in the third order.

This result can be accomplished readily by providing an automatic means for throwing the computation control gate 135 into the position for operation in the selected direction at the end of the multiplication operation. In the conventional machine above-mentioned, the carriage is normally shifted one order to the right following termination of operation in the highest order to return the carriage to its home position, and then shifted an additional step to the right to restore the setting pins to their inoperative position, and then released to return to the left to its home position as the operation terminates. In the present invention, I utilize the cycle in which the additional shift occurs to provide a single entry of the keyboard value into the accumulator register, in the selected direction.

E. It will be noted that the appearance of zeros in the multiplier factor creates several problems. A "0" is treated normally when it appears in an order immediately above one in which operation is in the selected direction, i.e., for the values "1" to "5," inclusive, but when the operation in the next lower order is in the reverse direction, i.e., for values "6" to "9," inclusive, the "0" must be treated as a positive value and requires a corrective cycle in the selected direction. For example, if the multiplier factor is "809," there will be a single subtractive cycle in the lowest order (in additive multiplication), a single additive cycle in the second order, two subtractive cycles in the third order, and a single additive cycle in the fourth order.

This result can be accomplished by providing means for setting the "1" pin 481 in the selected order with the depression of the "0" key, while holding the "0" latch 520 in its operative position to hold the segment in its normal "0" position. Thus, when the machine comes to operation in that order, the segment 490 will be in the "0" position, but the "1" pin 481 will be set. Means is then provided for tripping the "0" latch 520 during the shifting of the carriage after every operation in the reverse direction. This automatically drops the segment away from the shift control arm 651 and enables a cycle of operation in the "0" order. In such an operation, the feed pawl 590 is not disabled during the first cycle of operation in the second order, as would be the case if the multiplier value had been "1" instead of "0."

However, when the operation in multiplication is in the reverse direction in one order, and the next two higher orders of the multiplier factor are "0," it is necessary to take the extra cycle on the lower of the two zeros, but not on the higher. Thus, if the multiplier factor is "9008," the operation in the first, or lowest, order will be two cycles in the reverse direction (i.e., subtractive in normal multiplication or additive in subtractive multiplication), followed by a single cycle in the selected direction in the second order, which, in turn, is followed by a shifting of the carriage over the third order without a registration in that order, a single operation in the reverse direction in the fourth order, and finally, by a single cycle of operation in the selected direction in the fifth order.

In connection with the setting of the "1" pin 481 by the "0" key, it will be obvious that this setting is operative to provide a count of "1" when the operation in the adjacent lower order was in a like direction and a count of "2" when the operation in the preceding order was in the reverse direction; and that the setting of this same pin 481 by the "0" key will not be operative at all when the operation in the preceding order was in the selected direction and will be operative to provide a count of "1" when the operation in the preceding order was in the reverse direction. In other words, the setting of the "1" pin sometimes calls for a count of "1" and sometimes for a count of "2" and sometimes it is not operative at all. In the last condition the "0" latch 520 is not released so that in reality the "1" pin 481 is not used, although it has been set. In the other situation mentioned, whether the setting of the "1" pin initiates a count of "1" or a count of "2" depends upon whether or not the auxiliary mechanism was operated to provide an extra count in the next cycle of operation, as is true in all ordinal operations. That is, if the operation is in the reverse direction in the preceding order, an extra count is added in the next higher order. Again, however, a "0" is treated as a positive value so that if the preceding operation was in the selected direction, the "0" does not cause the additional count in the higher order of operation.

The various means for conditioning the machine for the various operations noted will now be described, with attention directed first to the means for setting the additive or subtractive interponent 633 or 634 to its operative position required under item "A" above.

A. *Normal operation controls*

It will be recalled that the positioning of the computation control gate 135 is normally under the control of the additive interponent 633 or the subtractive interponent 634. It will also be recalled that it was mentioned earlier that operation from the lower values ("1" to "5," inclusive) will be additive in positive (or additive) multiplication for the accumulation of true products, or negative in subtractive multiplication for the accumulation of the complements of products: and that operation from the higher values of "6" to "9," inclusive, are the reverse—subtractive in additive multiplication or additive in negative multiplication. Thus, the control interponents 633 and 634 must be controlled automatically to take care of four operative situations, in addition to neutral in which neither interponent is operative, which operative situations are determined by the two factors: operation controlled by a small value ("1" to "5," inclusive) or by a large value ("6" to "9," inclusive); and the selected direction of operation (additive or subtractive). Specifically, in normal multiplication (initiated by depression of the multiply key 402 or the accumulate multiply key 403) operation is additive for values "1" to "5," and will be subtractive for values "6" to "9"; and, conversely, in complemental multiplication (initiated by depression of the negative multiply key 404), then the operation is subtractive for values "1" to "5" and will be additive for values "6" to "9." In addition, both interponents must be held in a neutral position during the shifting cycle. The actual selection is secured by operating either the additive interponent 633 or the subtractive interponent 634, or blocking operation of each, but the selection is made automatically by a conditioning mechanism which has five positions to correspond to the five situations above-mentioned. This mechanism, which incidentally must be set at the start of each ordinal series of operations, is shown particularly in Figs. 19 to 23, inclusive.

The mechanism just referred to comprises a pair of triple-pointed cams 900 and 901 (see Fig. 22) associated with the additive interponent 633 and the subtractive interponent 634, respectively. These cams are rigidly mounted on a common shaft 902, which is journalled in the left-hand control plate 57 and an intermediate bracket 899 lying between that plate and the side frame 51. The cams are located on the shaft 902 in the planes of their respective interponent, i.e., the cam 900 lies in the plane of the additive interponent 633 and the cam 901 lies in the plane of an offset portion of the subtractive interponent 634, as shown in Fig. 23. The assembly comprising the shaft 902 and the cams 900 and 901 can be rocked to any one of five positions, corresponding to the five operating conditions just mentioned, to control the positioning of these interponents 633 and 634. It will be recalled that both interponents are resiliently lifted by their respective springs to bias them into an operative position with respect to their associated pins 642 and 663, respectively. The means for controlling the angular positioning of this assembly will be described shortly, but for the moment it can be noted that the assembly has five operative positions:

(1) A neutral position (shown in Figs. 11 and 22) in which point 903 on cam 900 and point 904 on cam 901 are aligned and both engage their respective interponents 633 and 634 to depress both of them to an inoperative position. Thus, when the shaft 902 is in its neutral position, both cam points engage their respective interponents, thereby holding them in their inoperative positions.

(2) When the shaft 902 is given a single increment of clockwise rotation, when viewed from the left (as in Figs. 11 or 22), a high point 905 on cam 900 engages the additive control arm 633, thereby holding it in a depressed, or inoperative, position. In this angular position of the cam 901 there is a low point which permits the interponent 634 to rise under the bias of its spring. Thus, a single increment of clockwise rotation of the shaft 902 enables the subtractive interponent 634 to rise to its operative position while holding the additive interponent in an inoperative position, whereby the subsequent rocking of the follower arm 630 will set the machine for a subtractive operation.

(3) A double increment of clockwise rotation of the shaft 902 from its neutral position brings a high point 906 on cam 901 into engagement with the subtractive interponent 634, thereby rocking that interponent away from engagement with its associated pin 663. At this angular position of the parts the cam 900 has a low point which enables the additive control interponent 633 to rise to its operative position in which it engages the pin 642. Thus, the subsequent operating of gate setting arm, or cam follower, 630, is effective to set the machine for additive operation.

Figure 22:
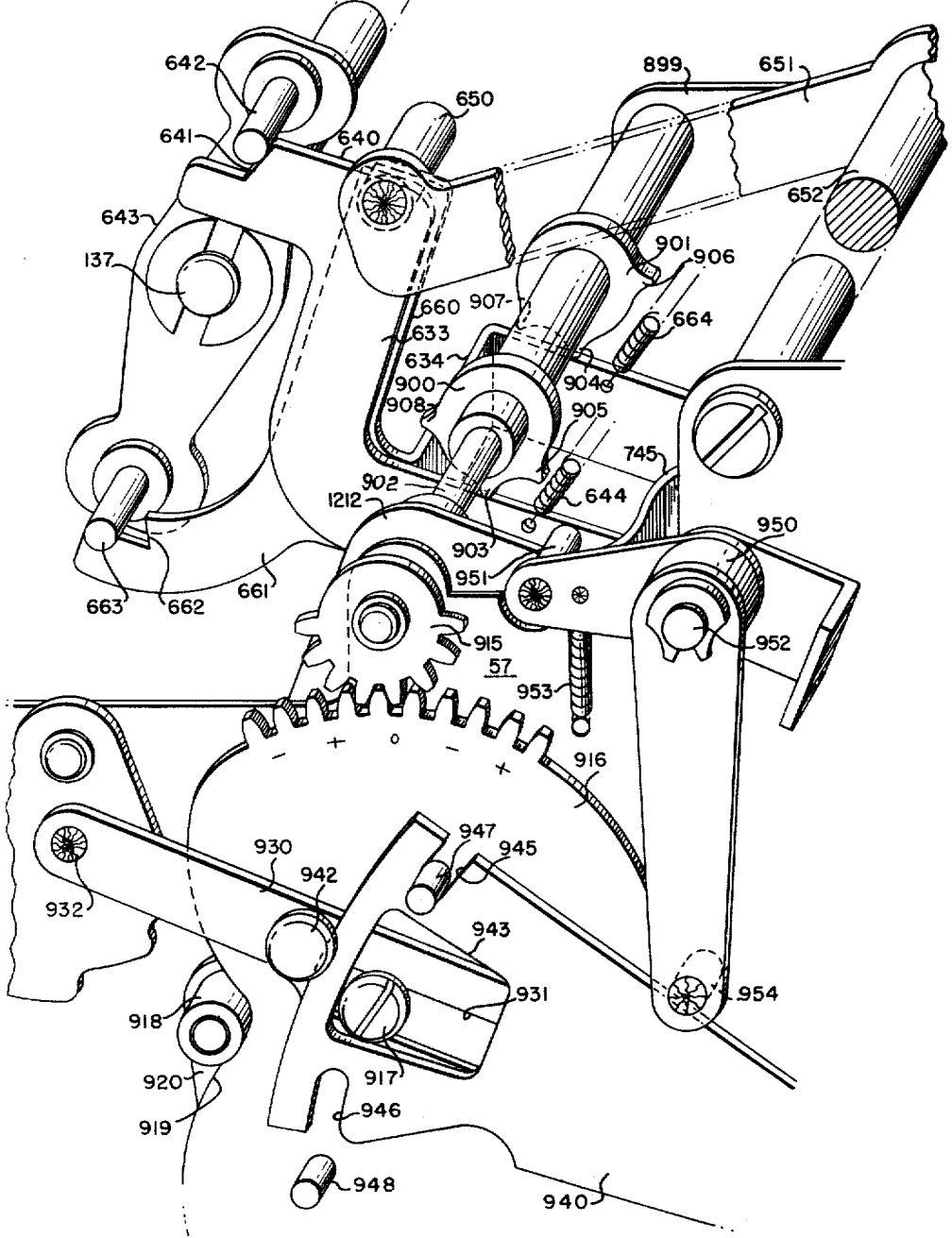
Fig. 22 is a perspective view of the control mechanisms shown in elevation in Figs. 19, 20 and 21.
Figure 23:
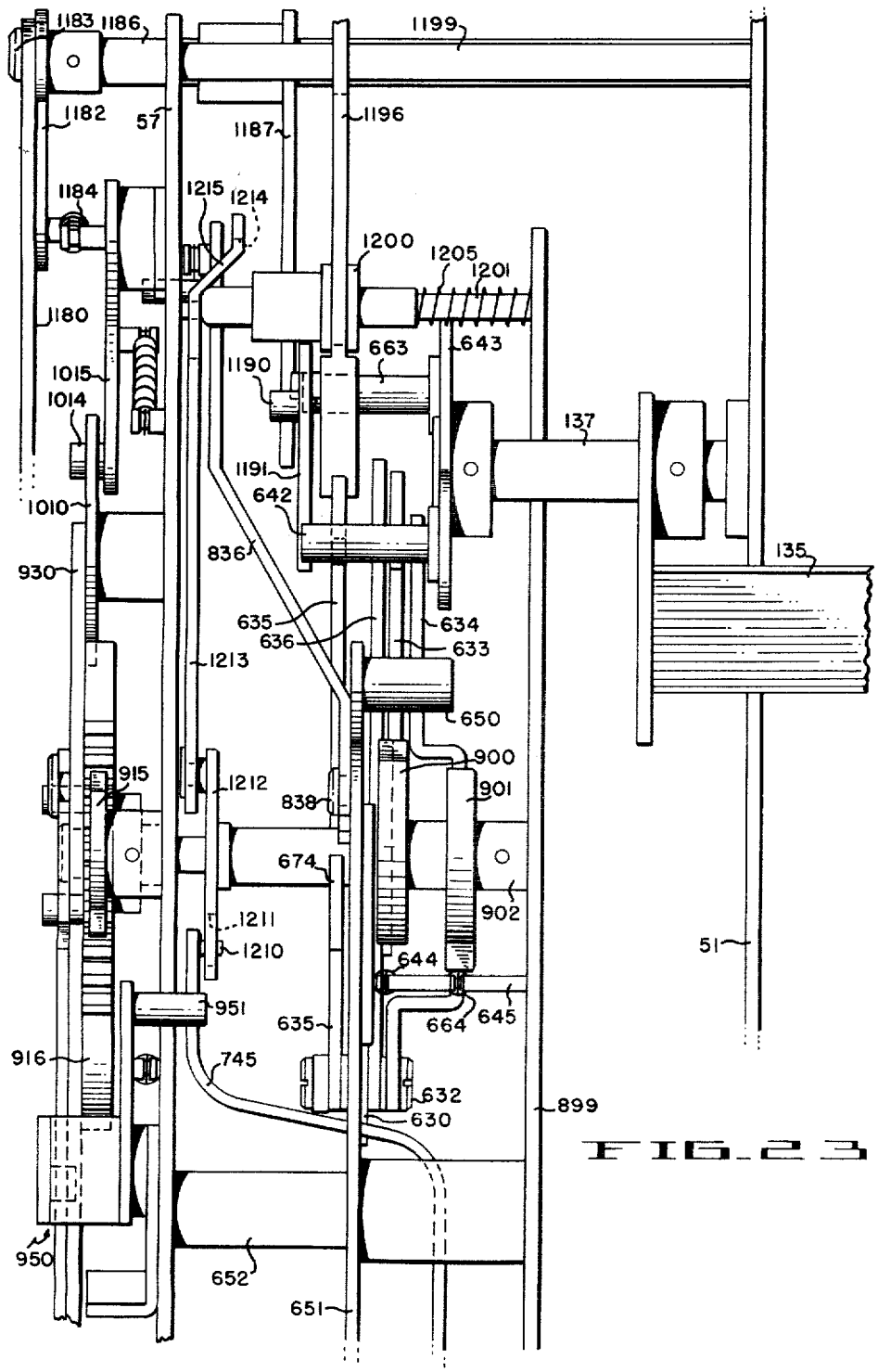
Fig. 23 is a plan view of the mechanisms shown in Figs. 20 to 22, inclusive.

(4) A single incremental counter-clockwise rotation of the shaft 902, when viewed from the left as in Fig. 22, is likewise effective to bring a high point 907 on cam 901 into engagement with the subtractive interponent 634, thereby rendering the latter inoperative. This point 907 is angularly aligned with a low point on cam 900, thereby permitting the additive interponent 633 to rise to its operative position.

(5) A double step, or increment, of angular rotation (counter-clockwise from the neutral position) brings a high point 908 on cam 900 into engagement with the additive control arm 633, thereby depressing it from engagement with the associated pin 642; while an angularly aligned low point on the cam 900 enables the subtractive control arm 634 to rise to its operative position.

Thus, the angular position of the shaft 902 and the cams 900 and 901 affixed thereto controls the selection of the interponents 633 and 634 to control computation. In the neutral position shown in Figs. 11 and 22, both interponents are rendered inoperative. A single incremental angular movement to the right (clockwise) sets the machine for subtractive operation, while a double step sets it for additive operation; and a single angular step counter-clockwise sets it for additive operation, while a double increment sets it for subtractive operation. The angular setting of the shaft from its neutral position disables either the additive or the subtractive interponents 633 or 634 while enabling the other to be raised to its operative position under the bias of its spring. It should be further noted, that the operative interponent is also disabled by the roller 650 on the rear end of the shift control lever 651. This lever is rocked (counterclockwise in these figures) by the return of the aligned segment 490 to its "0" position so as to disable the interponent slightly ahead of the unlatching of the follower arm 630. The means for so setting the shaft 902 will now be described.

The cam shaft 902 and the two cams 900 and 901 mounted thereon are positioned in one of the five-mentioned positions by means of a mutilated gear segment 915 mounted on the left end of the shaft 902. This gear, or pinion, is constantly in mesh with a large gear segment 916 rotatably mounted on the auxiliary frame plate by any suitable means, such as screw stud 917. The large gear segment 916 is positionable in any one of five positions: the centralized position shown in Figs. 19 and 22, a single step in a counter-clockwise direction, a double step in a counter-clockwise direction, a single step in a clockwise direction, or a double step in a clockwise direction. These positions correspond to a "0" position in which the computation control gate 135 and shaft 137 stand in their disengaged position and no value is entered, a positive operation, a subtractive operation, a subtraction operation or a positive operation, respectively.

Figure 20:
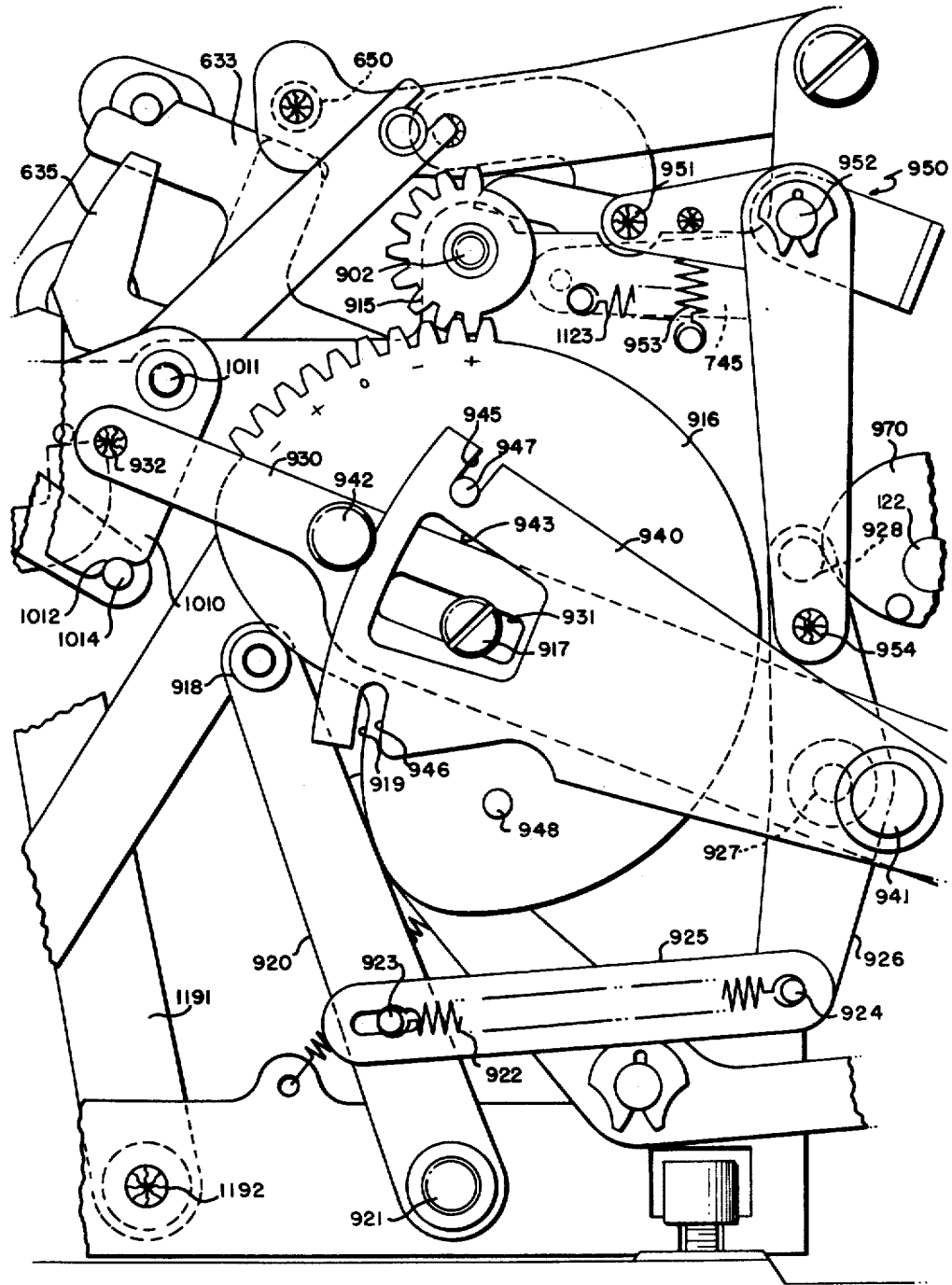
Fig. 20 is an enlarged detail view of mechanisms shown to the left of the central portion of Fig. 19, showing particularly the means for setting the computation control mechanism in the position which it assumes for the multiplication of values "1" to "5" in an additive direction.
Figure 21:
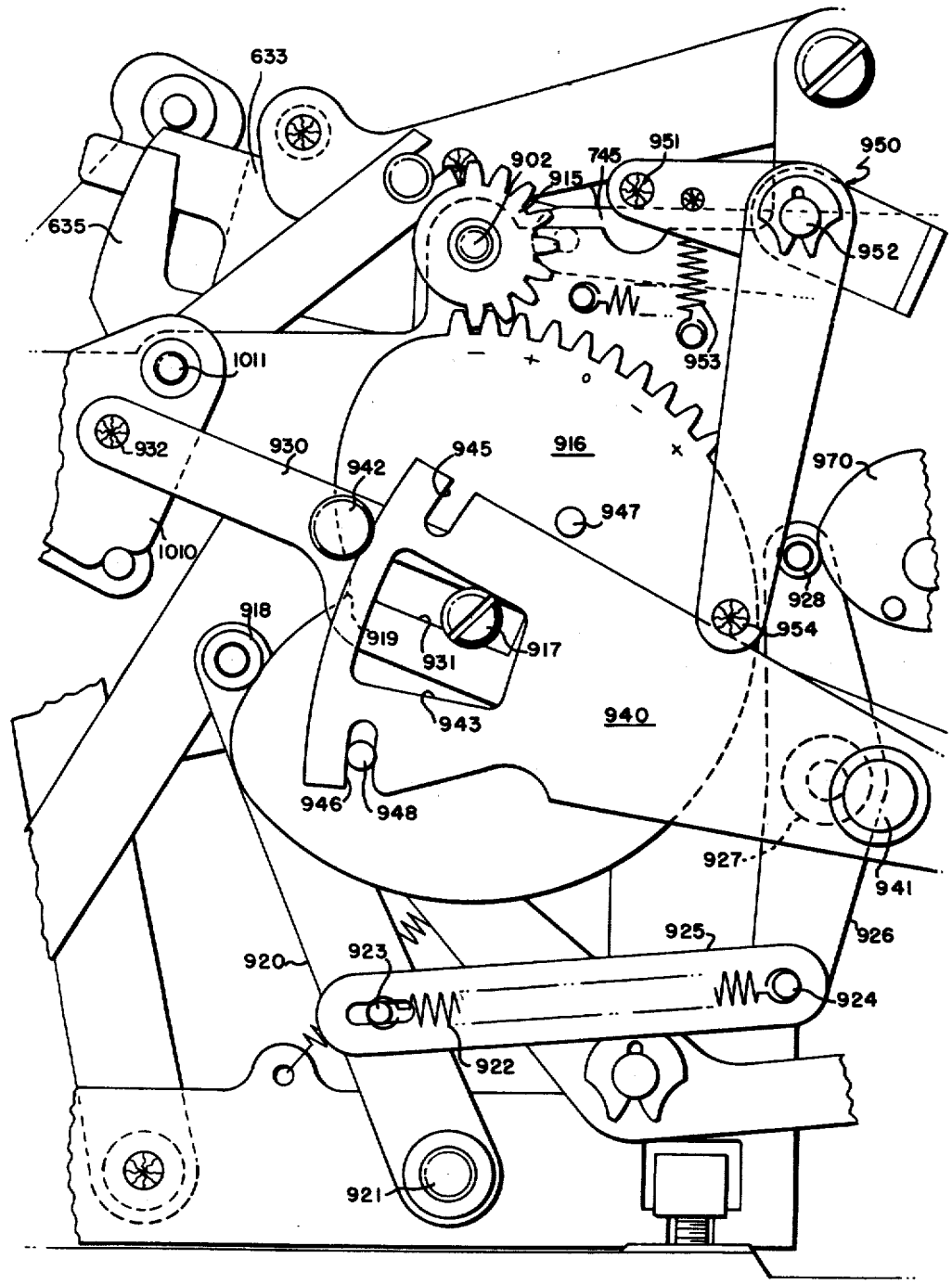
Fig. 21 is another view of the elements shown in Fig. 20, showing the parts in the position they assume when the mechanism is set for multiplication by a value of "1" to "5" in a negative direction.

Figs. 20 and 21 show the relative location of the gear segment 916 and the pinion 915 in the two extreme positions—Fig. 20 showing the position of the parts when the machine is operating additively on multiplier values of "1" to "5," and Fig. 21 showing the position of the parts when the machine is operative subtractively on values of "1" to "5." In Fig. 20 the control interponent 940 is in its normal position (machine is set for additive operation) and the segment 916 has been given two increments of movement; while in Fig. 21 the interponent has been rocked (counter-clockwise) by depression of the negative multiply key and the segment 916 has been given two full increments of motion. The neutral, or inoperative, position is halfway between the extreme position shown in these two figures (corresponding to the position shown in Figs. 19 and 22). The positions for operation in the reverse direction (under the control of the "6" to "9" value keys) are halfway between the extreme position shown and the "0" position. In the last-mentioned intermediate positions (one step to the left of the position shown in Fig. 20 or one step to the right of that shown in Fig. 21, respectively), the machine is set for subtraction in an additive operation or for addition in a negative operation. These various positions are indicated on the segment 916 in these two figures by the symbols "—," "+," and "0."

Normally, the large segment 916 is held in the "0," or centralized, position (in which the cams hold both interponents 633 and 634 in their inoperative positions, by means of a centralizer, such as that shown in Figs. 19, 20 and 21. Any suitable centralizer can be used, but for purposes of exemplification, I prefer to use the simple form which comprises a roller 918 engaging the periphery of the segment 916 and normally lying within a cam depression 919, as shown. The roller is mounted on the upper end of an arm 920, which is mounted on the controll plate by any suitable means, such as stud 921. The arm is resiliently biased into engagement with the periphery of the cam by a strong spring 922, one end of which is seated on a pin, or stud, 923 riveted on, or otherwise rigidly secured to, the arm 920. The other end of the spring 922 is seated on a stud 924, which joins a link 925 to the lower end of a lever 926.

A slide, or link, 930 is associated with the large gear segment 916, it preferably being provided with a slot 931 which embraces the stud 917 on which the segment is rotatably mounted. The rear end of the slide is pivotally connected to a latch member 1010 by any suitable means, such as rivet stud 932 (see particularly Fig. 21 or 22). The forward end of the link 930 is pivotally connected to a bellcrank 934 (see Fig. 19) by any suitable means, such as stud 933. The translation of the link 930, by means which will shortly be described, is effective to rotate the gear segment 916 through the medium of an interponent 940, which is pivotally mounted on the link 930 by any suitable means, such as large-headed stud 941. The interponent 940 is held against lateral displacement with respect to the link by means of the large-headed stud 942 shown particularly in Figs. 21 and 22, and is enabled to rock with respect to the link by means of an aperture 943, which encompasses the screw stud 917—the sides of the apertures providing stop means for preventing overrotation of the interponent in either direction. Normally, the interponent is biased to its upper position (clockwise position shown in these figures) by means of a spring 944 (shown in Figs. 19 and 24) tensioned between a stud on the forward end of the interponent and a stud on the frame plate, as shown. The rear end of the interponent 940 is provided with a pair of opposed slots 945 and 946 formed in the longitudinal edges of the interponent. These slots are adapted to engage pins 947 or 948, respectively, rigidly riveted to, or otherwise rigidly mounted on, the large gear segment 916. When the interponent is in its normal, or raised, position, the slot 945 engages the pin 947 (as shown in Fig. 20), so that rearward translation of the link 930 will rock the gear segment 916 (counter-clockwise when viewed from the left as in these figures). However, when the interponent 940 is rocked counter-clockwise against the bias of its spring 944, then slot 946 engages a pin 948 (as shown in Fig. 21), so that the rearward translation of the link 930 rocks the gear segment 916 clockwise, when viewed from the left as in these figures.

It can be noted that when the interponent 940 is in its raised position, thereby causing the pin 947 to be engaged in the slot 945, the machine is set for additive operation and conversely, if the interponent is depressed to its lower position in which pin 948 engages slot 946, the machine is set for subtractive operation. Normally, of course, the machine is set for an additive operation so that it is unnecessary to change the setting of the interponent from depression of either of the additive multiplying keys 402 or 403. However, when the key 404 is depressed, it is necessary to rock the interponent 940 to its counter-clockwise position shown in Fig. 21. This is readily accomplished by the rocking of the lever 745 associated with the negative multiply key 404 (Fig. 15). It can be noted that the accumulate multiply lever 742 and the initiating lever 746 terminate at the shaft 743, but that the subtractive control arm 745 extends rearwardly therefrom. Thus, the depression of the negative multiply key 404 rocks the rear end of the lever 745 upwardly (clockwise in Figs. 11 and 16). A bellcrank member 950 (see Figs. 20, 21 and 22) is rocked by the lifting of the rear end of the negative control lever 745. This bellcrank is provided with a suitable stud 951 which lies immediately adjacent the upper edge of the arm 745 and immediately adjacent the rear end of the latter. The bellcrank 950 is pivotally mounted on any suitable stud 952 affixed to the control plate and is biased into engagement with the negative multiply lever 745 (in a counter-clockwise direction in these figures) by a suitable spring 953. The lower arm of the bellcrank carries a stud 954 which engages the upper edge of the interponent 940. Thus, whenever the negative multiply arm 745 is rocked from the depression of the key 404, the arm 745, among other things, rocks the bellcrank 950 (clockwise in these figures). Such rocking of the bellcrank is effective, from the engagement of stud 954 with the upper edge of the interponent 940, to rock the interponent downwardly to cause engagement of the slot 946 with pin 948. This position of the interponent 940 is determinative of whether the translation of the link 930 will rock the gear segment 916 clockwise or counter-clockwise, and thus determines the selected direction of operation of the machine.

The amount of translation of link 930 is determinative of whether one or two increments of rotation will be given to the gear segment 916. This control is determined by the rocking of the bellcrank arm 934 to which the forward end of the link 930 is attached. It can be noted at this point that the link is always resiliently biased to the rear for two steps of movement in multiplication operations at the beginning of each ordinal series of operations, and that if the rocking of the bellcrank 934 is not blocked, two increments of rotation will be given to the gear segment 916 (see Fig. 19). However, if the bellcrank 934 is permitted to rock only halfway through its path of travel, then the link is permitted to take only one increment of movement, thereby rocking the gear segment 916 a single increment of rotation. The positioning of the cam points on cams 900 and 901 to operate the computation control interponents 933 and 934 is determined by whether the interponent 940 is in its normal raised or in its lower position, and by whether the link 930 is given a single or double step of movement. The means for determining the amount of rotation of the bellcrank 934, which determines the extent of the translation of link 930, will now be described.

It will be recalled, in connection with the description of the multiplier keyboard, that the depression of the "6," "7," "8" and "9" value keys, in addition to operating the value arms 454 to 451 corresponding to the tens-complement of the value key depressed, was also operative to rock the setting arm 456. The rocking of this arm 456, through its nose 466 (see Figs. 10 and 11), elevated the corresponding pin 486 in the aligned order of the multiplier pin box. The position of this pin 486 is utilized to determine the amount of rocking permitted the control bellcrank 934 by means of the mechanism shown particularly in Figs. 7, 10 or 11, and 19.

It is seen in these figures that a sensing arm 960 (Fig. 7) is pivotally mounted on the bracket 471 by any suitable means, such as screw stud 961. This arm extends to the left through an aperture 962 (see also Fig. 19) in the left control plate. At its left end the arm is bent downwardly to form an ear 963 to provide a convenient means for attaching the arm to a lever 1020 pivotally mounted on the left frame plate (see Fig. 19), the arm 960 being connected thereto by any suitable means, such as stud 964. This lever 1020 is pivotally mounted on the left side control plate 57 by any suitable means, such as stud 1021, and the arm is biased (in a clockwise direction in these figures) by a spring 1023 tensioned between a spring seat in the arm and the pivot stud 935 upon which bellcrank 934 is mounted. The arm 1020 is provided with a forwardly projecting nose 1024 which overlies a pin 698 on the forward end of the trigger 690. Thus, the latching of the trigger in its inoperative position simultaneously latches the arm 1020 in its inoperative position. In this position the sensing arm 960 is lifted away from engagement with the pins 486 previously mentioned, and will not interfere with their setting by the depression of the multiplier value keys.

The arm 960 carries a roller 965 in the plane adjacent the operative order of the pin box, i.e., the plane aligned with the segment feed pawl 590, the roller being so located as to engage the aligned pin 486 if it is in its lowered position and thereby rock the arm 960 forwardly (downwardly in Fig. 7 or to the right in Figs. 11 and 19). If a value key "1" to "5" has been depressed, the pin 486 of that order will remain in its lower position and is therefore effective to rock the arm 960 forwardly, as described. If, on the other hand, a "6" to "9" value key has been depressed, then the aligned pin 486 has been lifted upwardly so that the roller 965 will not engage the pin, whereupon the arm 960 is rocked rearwardly by the force of a spring 1023 (Fig. 19) tensioned between the stud 935 and the lever 1020.

Thus, when the trigger 690 is unlatched to initiate the multiplication operation, the arm 1020 is simultaneously unlatched and is thereafter biased rearwardly by its spring 1023, which enables the roller 965 on arm 960 to move into engagement with an aligned pin 486 (if the pin is in its lowered position). If the aligned pin 486 has been left in its lowered position (shown in Fig. 10) the arm 960 is held forwardly (shown in Fig. 7), thereby limiting the rocking of arm 960 to a slight and immaterial amount (which permits the bellcrank 934 to rock through its full stroke). If, on the other hand, the pin was projected upwardly, the arm 960 is thereby permitted to rock rearwardly to its extreme position (thereby blocking the bellcrank 934 in its single step position). The position and subsequent movement of this arm 1020 is also utilized to determine whether there will be an extra count in the next ordinal operation, one less count, or no change in counts, as required by the conditions of the operation.

As shown in Fig. 19, the aperture 962, through which the arm 960 projects, lies in the path of travel of the upper arm of the bellcrank 934. This bellcrank, which is pivoted on stud 935, is connected to link 930 and acts as a block to the attempted movement of the link. If the arm 960 is held in its forward position by the aligned pin 486, then the forward arm of the bellcrank 934 is enabled to rock through its full path of travel, which is equivalent to a double step, or full increment, of translation of link 930. If, on the other hand, the aligned pin 486 has been projected upwardly, out of the way of roller 965, then the force of spring 1023 pulls the arm 960 rearwardly and it lies in the path of travel of the upper and forwardly extending arm of the bellcrank 934, whereupon the bellcrank and consequently the link 930 are permitted only a single step, or partial increment, of movement. This sensing of a single or double step of movement of link 930 takes place as the multiplier carriage is shifted between each ordinal series of operations. By this means the pinboard setting determines, in each order, whether the link 930 is permitted a single or double step of movement, and consequently whether the segment 916, gear 915, shaft 902 and cams 900 and 901 are rotated one or two angular increments— and this determines whether the operation is to proceed in the selected direction (for the values "1" to "5") or in the reverse direction (for the values "6" to "9").

The mechanism for resiliently operating the link 930 and consequently the gear member 916 is shown particularly in Fig. 24 and to a lesser extent in Figs. 19 and 26. A plate cam 970 is rigidly mounted on the left end of the drive shaft 122. The shaft and cam rotate in a counter-clockwise direction, when viewed from the left, as in Figs. 19 and 26, so it is obvious that for approximately half a cycle the radius remains at a constant low value, then rises to a high point 971, and then abruptly falls off to the initial radius immediately before the end of the cycle. This cam plate 970 is given a full cycle of rotation with each machine operation.

A cam follower 980 is associated with the cam 970, the follower having the general shape of the bellcrank and being pivotally mounted on a relatively long screw stud 981. One arm of the follower 980 carries a roller 986 engaging the periphery of the cam 970. The follower is resiliently biased into engagement with the cam by any suitable means, such as a spring 983, tensioned between a stud 984 on the follower and a stud 992 on a two-armed lever 990, likewise mounted on the stud 981. The follower likewise has a stop pin 982 which abuts against the rearward edge of the two-armed lever 990, the follower and the lever tending to operate as a unit because of the force of spring 983, but the assembly can yield when movement of lever 990 is blocked. The lever is provided with a slot 991 at its lower end, which slot embraces a pin 936 riveted on, or otherwise rigidly secured to, the long link 930. The long link is normally held in the position shown in Figs. 19 and 24 by means of the centralizer spring 922, previously mentioned, and consequently it, through the medium of spring 983, holds the cam follower 980 in engagement with the periphery of the cam 970. On the other hand, at a predetermined point in the machine cycle, the rotation of the cam 970 and cam follower 980 through the force of spring 983, strongly rocks the arm 990 as it tends to follow the follower arm 980. The resilient rocking of lever 990 forces the link 930 rearwardly (the spring 983 being stronger than the spring 922) either one or two steps, as determined by the position of sensing arm 960, to block, or not to block, the rotation of bellcrank 934.

I prefer to provide a means which reduces the load on the centralizer arm 920 during movement of the link 930 and its interponent 940 rearwardly to rock the gear segment 916. As seen in Figs. 19, 20, and 21, the forward end of the spring 922 is seated over a stud 924 riveted on the lower end of a lever 926. This lever is rotatably mounted on the left side control plate by any suitable means, such as pivot stud 927, and at its upper end carries a roller 928. The roller lies in the plane of the cam 970 and engages the periphery of that cam. This cam rotates in a counter-clockwise direction in these figures, so that after approximately one-quarter of the way through a machine cycle the roller 928 reaches the low point on the periphery of the cam, thereby enabling the lever 926 to rock clockwise and relieve the tension of the spring 922. The mechanism is so timed that the link 930 is shifted rearwardly shortly thereafter, so that when it does rotate the segment 916, the tension of spring 922 is less than normal. The roller 928 engages the low point of the cam 970 for approximately half a cycle so that the link 930 will have been moved to its extreme rearward position (as determined by the engagement of the bellcrank 934 with the sensing arm 960) and latched in the adjusted position while the spring tension is at its lowest value. Thereafter the cam 970 will rock the lever 926 (counter-clockwise in these figures) again placing the maximum tension on the spring 922. Similarly, when the last cycle of an ordinal series of operation is reached, and the operative segment 490 rocks the shift control lever 651 to disengage latch members 1015 and 1010, to be hereinafter described, the maximum force of the spring 922 will greatly assist in rocking the segment 916 to its "0" position and thereby assist in translating the link 930 forwardly to its inoperative position. Thus, the machine is conditioned for operation in the next cycle quickly and easily.

The cam follower bellcrank 980 and its associated arm 990 are resiliently biased toward the right by a compression spring 985 (see Fig. 24) seated between the arm 990 and the flanged head of the stud 981. Normally, however, the two members are forced to the left against the bias of the spring by means of a cam link 1000 (see Fig. 26), the lower end of which is pivotally mounted on the stud 692 that connects the trigger 690 and the power-operated arm 694, previously described. The cam link 1000 has a slot 1001 formed in its upper end, which slot embraces the pin 981 on which the cam follower 980 and lever 990 are rotatably mounted. Immediately above the slot the link is formed to provide a cam face 1002 which engages the face of the hub of the cam follower 980, thereby forcing the follower 980 and the rocker 990 outwardly, or to the left (when viewed from the front of the machine). In this position the follower roller 986 lies to the left of the cam 970, so that during other machine operations the follower is not rocked and consequently the multiplier mechanism here described is at rest. However, when the trigger 690 is released, to rock clockwise in this figure, the cam link 1000 is shifted upwardly, whereupon the cam face 1002 on the upper end thereof moves away from the hub of the follower 980, permitting it and its associated rocker 990 to move to the right on stud 981. In that position the roller 986 lies in the plane of the cam 970, whereupon the follower and rocker are rocked with the first cycle of machine operation thereafter. This rocking of the rocker 990, through the pin-and-slot connections 936, 991, translate the link 930 rearwardly one or two steps, depending upon whether such translation is blocked by engagement of the rocker 934 with the sensing arm 960, as previously described.

When the link 930 is so translated rearwardly, it is latched in the adjusted position by means of the latch arm 1010 (see particularly Fig. 19) upon which the rear end of the link is pivotally mounted. This latch arm is pivotally mounted on a stud 1011 secured to the control plate and is provided with two shoulders 1012 and 1013 adapted to latch against a pin 1014 carried on the lower end of a latch arm 1015. The latch arm is rotatably mounted on a stud 1018, and is resiliently rotated in a latching direction (counter-clockwise when viewed from the left) by a spring 1016 tensioned between the arm and a stud on the control plate. Whenever the link 930 is given a single increment of movement, the shoulder 1013 engages the pin 1014 and latches the link and gear segment 916 in the adjusted position, consequently rocking the shaft 902 a single step. If, on the other hand, the link 930 is free to move two increments, then the shoulder 1012 engages the pin 1014 and latches the link, the gear segment and cam shaft in the extreme position.

Thus, the cam 970 is effective, in the first cycle of operation in any order, to move the link 930 rearwardly (either one or two steps depending upon the position of the sensing arm 960), thereby rocking the cams 900 and 901 in either the one or two-step position, either clockwise or counter-clockwise. The parts are then latched in that position throughout that ordinal series of operations by means of the latch plate 1010 and latch arm 1015.

The latch arm 1015 is rocked to its releasing position, against the tension of its spring 1016, during the cycle in which the operative multiplier segment 490 returns to its "0" position. It will be recalled that the shift control arm 651 is engaged by the multiplier segment as it returns to its "0" position,, consequently rocking this arm (counter-clockwise in Figs. 15, 16 and 19). It will also be recalled that the shift control arm 651 was rocked to its operative position by link 836, which was resiliently lifted by the operation of the trigger 690 and power-operated arm 694 by means of the mechanism shown in Fig. 15. This link 836 will, of course, be depressed against the force of its spring 839 whenever the shift control arm 651 is rocked by the return of the aligned multiplier segment to its "0" position (which occurs shortly before the end of the last cycle of operation of the ordinal series). Such movement of the link is used to unlatch the members 1015 and 1010 through the medium of a pin 840 mounted on the lower end of the link. This pin engages an arm 1017 which is rigidly secured to the hub of the latching arm 1015, whereby the movement of link 836 (to the left in Fig. 19) rocks the arms 1017 and 1015 (clockwise in this figure) to release the latch member 1010. The link 930 and gear segment 916, however, cannot return to their full-cycle position until the end of that cycle of operation, for the cam follower lever 980 at that time will engage the high point 971 of the cam 970. Therefore, the parts cannot return to the full-cycle position shown in these figures until the shaft 122 returns to its full-cycle position, at the end of the cycle in which the ordinal series of operations terminates.

During the shifting cycle which immediately follows, the cam follower rocker 980 and lever 990 will again be rocked by cam 970, but such rocking does not take place until after the cycle is half completed, i.e., during the latter half of the shifting cycle. At this point, the multiplier carriage will have been shifted sufficiently to the right to release the shift control arm 651, permitting it to rock to its inoperative position (clockwise in Fig. 19). Up until this point of the shifting cycle, the arm 651 has held both computation control interponents 633 and 634 in their inoperative position, and the follower 630 on which they are mounted is in its forward, or inoperative, position shown in Fig. 16. Shortly after the mid-point of this shifting cycle, the cam 970 again engages the follower roller and rocks the positioning mechanism controlled thereby one or two steps, as determined by the sensing arm 960, and latches the parts in that position. This occurs in the latter half of the shifting cycle, so the machine is again ready for a new series of ordinal operation as soon as the shifting is terminated. Simultaneously with the start of the rocking of levers 980 and 990 by cam 970, shift control lever 651 has permitted the interponent 633 or 634 to rise to its operative position, but the follower arm 630 is not rocked rearwardly by its cam 780 (to set computation control shaft 137 and gate 135 in their effective positions) until immediately after the start of the next cycle (the first of the computing cycles in the next series of ordinal operations). This is possible as it is conventional in this machine to delay computation for about 30 degrees in order to permit setting of controls, such as the rocking of the computation control shaft.

B. Extra cycle mechanism

It has already been pointed out that when the machine is operating in the selected direction, in two or more consecutive orders, no change of operation is required in the cycles in the higher order, or in any way changing the programming during the ordinal series of operation, or in the shifting thereafter. That is, when operation in any order is in the selected direction, the termination of operation in that order causes the accumulator carriage 60 and the multiplier carriage 472 to shift to the next ordinal position, and the machine is operated in the new ordinal position the exact number of times determined by the control mechanism. However, when the machine has been operating in the reverse direction, it is sometimes necessary to provide an additional count, or cycle of operation, in the next higher order. This situation occurs when operation in the reverse direction in any order is followed by operation in the selected direction in the next higher order, or when the multiplier digit in the next higher order stands at "0." In such circumstances it is essential to provide means for securing an extra cycle of computation in the higher order, in addition to the cycles determined by the value pins 481 to 485, in order to correct the product resulting from the reverse operation in the adjacent lower order. The mechanism for securing this additional cycle will now be described.

This extra cycle mechanism is under the control of the arm 1020 previously mentioned (see Figs. 19 and 24). This arm is pivoted on the left side control plate 57 by any suitable means, such as the stud 1021, and is biased in a rearward direction by means of spring 1023. This arm, as shown in these figures, has an integral rearwardly extending arm, or projection, 1025, on the extremity of which is a pin 1026 (see also Fig. 26). The forward end of a link 1030 is supported upon the pin 1026, and the rear end of the link is pivotally mounted on a latch member 1031 (Fig. 26) by any suitable means, such as the pivot pin 1032. The latch arm 1031 is pivotally mounted on the control plate 57 by any suitable means, such as the screw stud 1033, and is provided with an arcuate face 1034 adapted to engage the pin 821 which connects the arm 820 to the link 823 (see particularly Fig. 15). It will be recalled that the arm 820 is rigidly secured to the shaft 597, the angular position of which controls the operation of the segment feed pawl 590. Thus, if the latch arm 1031 is rocked forwardly (clockwise in Fig. 26), it engages the pin 821 and holds the arm 820 and shaft 597 in an inoperative position and thereby blocks operation of the segment feed pawl 590. The forward end of the link 1030 is biased downwardly into engagement with the pin 1026 by a spring 1035 and is provided at its forward end with a concavity 1036 adapted to engage the pin 1026. The concavity 1036 is so placed as to engage the pin 1026 when the arm 1020 is rocked rearwardly (clockwise in Fig. 26) to the reverse position. When so engaged, the force of the spring 1035 causes sufficient friction to enable the arm 1020 in its return to its normal, or selected direction, position to pull the link 1030 and consequently arm 1031 forwardly, whereupon the latter engages the pin 821 and latches the feed pawl against operation. However, the concavity 1036 is such that the parts will cam themselves to a disengaged position upon force being applied to do so, as by the positive release of the latch 1031, as will now be described.

The latch 1031 is held in its operative or latching position for only about a half of cycle of operation, which is sufficient to initiate operation of the machine in the selected direction, for the interponent 633 or 634, previously described, will have returned to its operative position by the rocking of gate setting arm 630 at the start of the cycle and the entry of the keyboard value into the accumulator dials commences immediately. At the halfway point of the cycle the eccentric which operates the feed pawl 590 will have passed the feeding portion of its stroke. Thus, while the arm 1031 is engaging stud 821, the feed pawl 590 is held inoperative, although the computation control gate had returned to its effective position at the start of the cycle and the keyboard value is consequently being entered into the accumulator register 62 in the selected direction. Thereafter the release of pin 821 by latch 1031 enables the conventional segment feed mechanism to operate a number of times determined by the positioning of the segment.

The means for positively moving the latch arm 1031 to its unlatching position is also shown in Fig. 26 and comprises a follower arm 1040 pivotally mounted on a screw stud 1041. The arm is provided with a slot 1042 which engages a pin 1037 on the latch arm 1031. The rocking of the latch arm 1031 (clockwise in this figure) therefore rocks the follower arm 1040 counterclockwise, in which position its terminal end lies in the path of travel of a pin 972 on the cam 970. As shown in Fig. 26, this pin is located approximately 60 degrees from the position in which it will engage the upper end of the arm 1040 so that the latch 1031 will be moved to a releasing position approximately one-quarter of the way through the machine cycle. This is too late to effect a segment feed in that cycle but does enable the feed pawl for the next cycle of operation.

It is sometimes necessary to block the operation of the latch 1031 even though the arm 1020 has been in the reverse direction position. It will be recalled, in connection with the depression of the multiplier keyboard, that the depression of the "0" key was effective to operate the "1" arm 451 and thereby project the "1" pin 481, but that it did not release the "0" latch 520. Thus, the "1" key had been set to operative position but the multiplier segment remained in its "0" position. Means is provided, as will be described in section E hereafter, for releasing the "0" latch 520 whenever the arm 1020 is rocked from the reverse direction position counter-clockwise to its selected direction position. Thus, the pin is set for a value of "1" and the segment released to move the shift control lever 651 to its inoperative position, as is necessary when operation is shifted from the reverse direction to a "0" multiplier value. In the situation just mentioned, one cycle of operation, often referred to as a "1" count, is necessary to correct the reverse operation in the preceding ordinal position, but the normal setting of "1" in like circumstances normally gives a count of "2," i.e., two cycles of operation through the operation of latch 1031. It is therefore obvious that it is essential to block operation of the latch 1031 whenever a "0" value stands in the multiplier segment 490, in spite of the fact that the segment is released to its "1" position in the latter part of the shifting operation. This is readily secured by means of the blocking mechanism shown in Figs. 19, 24, and 26.

A blocking arm 1050 is pivotally mounted on the control plate 57 by any suitable means, such as screw stud 1051, and lies in the plane of latch arm 1031. This arm is provided with a nose 1052 adapted to engage a shoulder 1038 formed in the forward end of the latch arm 1031. Thus, when the arm 1050 is in the lowered position shown in Fig. 26, the initial movement of link 1030 and latch arm 1031 causes the shoulder 1038 to abut against the nose 1052 of the blocking arm 1050—which holds the latch arm 1031 in an inoperative position and allows the cam face 1036 on link 1030 to cam itself out of engagement with the pin 1026. On the other hand, when the arm 1050 is lifted above the position shown in this figure, the latch arm 1031 is free to move to its latching position. The blocking arm 1050 is positioned, by means of a link 1053 to which it is pivotally connected, such as by pin 1054. The upper end of the link is connected to an ear 1055 on the left end of a sending lever 1056 (see also Fig. 25), as by means of a pin 1057. The link, and consequently the arm 1050 is biased to a raised position by any suitable means, such as spring 1058 tensioned between a stud on the link and the control plate, as shown. The lever 1056 is pivotally mounted on a bracket 1059, such as by means of stud 1060, the bracket extending to the right from the control plate 57. The right-hand end of the lever 1056 is provided with a sensing nose 1061 which lies immediately adjacent the sensing nose 654 of the shift control arm 651, but slightly to the left thereof in order to sense the position of the control segment 490 to the left of the order operating upon the nose 654. If a value is set in the segment to the left of the operative order (the operative order being the one in line with the ear 654), the bias of spring 1058 will lift link 1053 and rock the lever 1056 (clockwise in Fig. 25), thereby lifting the arm 1050 out of blocking position. However, if the segment to the left of the operative order stands at "0," the nose of that segment holds the lever 1056 in its rocked position (counter-clockwise in Fig. 25) against the force of spring 1058, and thereby holds the arm 1050 in blocking position. The lever 1056 may be enabled to rock, as the shifting of the carriage progresses, but if so, it is too late in the cycle to enable operation of the latch 1031, for the notch 1036 and pin 1026 will have become disengaged by the time the multiplier carriage has shifted sufficiently to release arm 1056. That is, when operation in the effective order (i.e., the order in line with ear 654) is in the reverse direction and the segment in the next higher order (i.e., the order in line with the nose 1061 of lever 1056) stands at "0," the segment 490 is held in the "0" position until the multiplier carriage 472 has shifted one order to the right. Thereupon the "0" latch of the segment 490 in the higher order is released, thereby permitting shift control lever 651 to rock (clockwise in these figures) to enable the segment feed mechanism. However, in this instance, only one cycle of operation can be taken because the latch 1031, having been held out of engagement with pin 821 during the shifting operation, enables the feed pawl 590 immediately and it is operable in, and only in, the first cycle of operation. On the other hand, if the value originally stood at "1," then the lever 1056 is enabled to rock (clockwise in Fig. 25) before the shifting begins, thereby lifting blocking lever 1050 out of blocking position, whereby the latching lever 1031 is effective and provides an additional cycle of operation in the higher order.

In normal machine operation, the blocking arm 1050 is held in its lower, or operative, position by means of an arm 1063 pivotally mounted on the frame plate 57 by any suitable means, such as screw stud 1064. The forward end of the arm 1063 overlies a stud 1065 on the link 1053 and is normally held in its lowered position by a bracket 1066 formed at the upper end of the link 1000. Thus, the blocking arm 1050 can only rise to its ineffective position after the trigger 690 has operated to initiate a multiplication operation.

C. Cycle-reducing mechanism

It will be remembered that when operation in two consecutive orders is in the reverse direction (i.e., multiplier values in both orders are from "6" to "9," inclusive), the number of cycles in the second, or higher, order must be reduced by "1." For example, if a multiplier value is "189," we have a single cycle of operation in the reverse direction in the lowest order, a single cycle of operation in the reverse direction in the second order, and two cycles of operation in the selected direction in the third order. This is equivalent to multiplying by "200" and multiplying by "11" in the reverse direction as 189=200—11. We therefore have the rule that whenever the multiplier value in two successive orders calls for reverse operation, it is necessary to reduce the number of cycles of operation in the second of those orders by "1." This is readily secured by the mechanism shown particularly in Figs. 19, 24, and 25.

Preferably, the mechanism for this purpose will be operated by the resilient rocking of arm 990, which is pivoted on the left side control plate, as by screw 981, and is also effective to operate link 930 and segment 916, previously described. The upper end of this arm is provided with a slot 1100 which embraces a pin 1101 riveted, or otherwise rigidly secured, to a slide 1102. The slide 1102 is supported by a pair of slots 1103 which embrace a stud 1104 and a shaft 1105, respectively. A feed pawl 1106 is pivotally mounted on the rear end of the slide 1102, such as by means of pin 1107. The forward end of the feed pawl is provided with a stud, or pin, 1108 rigidly mounted thereon, as by riveting. The pawl 1106 is biased in a downward direction (clockwise in these figures) by a suitable spring 1109 tensioned between studs on the slide and the feed pawl 1106.

Normally, the feed pawl 1106 is rocked to its inoperative (counter-clockwise) position shown by means of a link 1115, the forward end of which is mounted on the pin 1026 carried by the control arm 1020. The rear end of the link 1015 is slidably mounted on the shaft 1105, as by means of slot 1116. At its extreme rear end the link 1115 is provided with a nose 1117 which engages a shoulder 1110 of the feed pawl 1106. When, however, the control arm 1020 is rocked rearwardly (clockwise in these figures), the link 1115 is translated rearwardly, so that the nose 1117 disengages the shoulder 1110, thereby permitting the feed pawl 1106 to rock into operative position under the bias of its spring 1109. This occurs only when the machine is operating in the reverse direction in a multiplication operation—at all other times the nose 1117 of the link holding the feed pawl 1106 in its inoperative position.

A setting slide 1120 is associated with the feed pawl 1106, likewise being provided with slots normally registering with the slots 1103 in the slide 1102 and embracing stud 1104 and shaft 1105. The rear end of the slide 1120 is provided with a pair of notches 1121 and 1122, both of which are adapted to be engaged by the pin 1108 of the feed pawl 1106. The slide 1120 is resiliently biased to the rear (to the left in Figs. 19, 24 and 25) by means of a spring 1123 which is tensioned between a stud on the control plate and a stud on a downwardly projecting arm 1124 of the slide 1120. The arm, or shoulder, 1124 is provided with a substantially vertical slot 1125 which embraces a pin 1130 mounted on the lower end of an arm 1131 rigidly secured to the shaft 1105. The shaft 1105 (as shown in Fig. 25) extends to the right through a bracket member 1132 intermediate the left side control plate 57 and the left side frame 51. The right hand end of the shaft 1105 carries an arm 1133 (see Fig. 10) rigidly mounted thereon. A link 1134 connects the arm 1133 to a feed pawl 1135 which is rotatably and slidably mounted on the bracket, as by means of the slot 1136 embracing pin 1137. This pawl lies in the plane of the operative multiplier segment 490 and at its forward end is provided with a tooth 1138 adapted to engage the teeth 496 of the aligned multiplier segment 490. The pawl 1135 is biased to its forward position so as to engage the teeth 496 by any suitable means, such as spring 1139 tensioned between the upper end of the link 1134 and a stud on the bracket, as shown in Fig. 10.

The rocking of the feed arm 990, which occurs during the latter portion of the overstroke or the shifting cycles (i.e., at the end of the cycle preceding each ordinal series of operations) is effective to reciprocate the slide 1102. If the control arm 1020 has been rocked (clockwise in Fig. 19) to shift the link 1115 rearwardly, such movement enables the feed pawl 1106 to engage the notch 1121 in the slide 1120. Thereafter the rocking of feed lever 990 will rock both slides 1102 and 1120, the latter slide being moved forwardly one increment of movement (which corresponds to the amount of reciprocation of the slide 1102). The slide 1120 is then latched in that position by means of a shoulder 1145 (Figs. 24 and 25) which is engaged by a pin 1146 mounted on the rear end of a latch lever 1147. The latch lever 1147 is rocked upwardly into engagement with slide 1120 by any suitable means, such as spring 1148. Preferably, the latch 1147 is shaped as a rocker pivoted on the stud 1021, with a forwardly extending arm which carries an ear 1149 (Fig. 19) that is adapted to engage the forward edge of the control arm 1020. It follows that the forward rocking of the arm 1020 will release the latch comprising the shoulder 1145 and pin 1146. However, when the feed pawl 1106 is in operative position, which occurs only when the control arm 1020 is in its rearward, or reverse operation, position, the slide 1120 will be latched in a position one incremental step forwardly of that shown in these figures. If, at this point, the operation in the next order is shifted to the selected direction, that is, the control arm 1020 rocks forwardly, or counter-clockwise, the latch arm 1147 is rocked to disengaging position by means of ear 1149 and simultaneously the translation of link 1115 disables the feed pawl 1106. On the other hand, if the control arm 1020 remains in its rearward, or reverse direction, position, the rocking of the feed lever 990 back to its normal position by the release of latch members 1010 and 1015, causes the pin 1108 on the feed pawl 1106 to cam backwardly into the second notch 1122. Thereupon, the second operation of the feed arm 990 is effective to rock the slide 1120 forwardly a second incremental step. In this position the arm 1131 has been rocked (by means of the engagement of pin 1130 in slot 1125) two full steps, which rocks the shaft 1105 the same angular increment. The first step of such rocking of the shaft 1105 is sufficient to lift the link 1134 (Fig. 10) sufficiently to cause the tooth 1138 on the forward end of arm 1135 (see Fig. 10) to almost engage the teeth 496 of the aligned segment 490. The second incremental rocking of the shaft 1105 lifts the feed pawl 1135 an amount corresponding to the interdental spacing of teeth 496, thereby rocking the aligned segment 490 an amount equivalent to one value space. This rocking of the segment occurs as the segment is lifted into operative position, and occurs during the shifting cycle of machine operation. That is, during the shifting operation betwen successive ordinal operations of the normal feed pawl 590, the higher order segment has been returned one step toward its "0" position, thereby reducing the cycles in the higher order by "1." The feed arm 990, and consequently the feed pawl 1135, remain in the adjusted position after such double rotation, holding the aligned multiplier segment 490 in the adjusted position until operation of the feed pawl 590 and the check pawl 598. Thereafter, the conventional operation of segment feed pawl 590 moves the segment in the usual way, the pin-and-slot connection 1136, 1137 permitting the arm 1135 to be cammed out of the way. The means just described effectively moves the higher order segment to reduce the value standing therein by "1," as required by the conditions of the problem.

If the third order of operation is in the selected direction, then the rocking of the control arm 1020 and the forward translation of link 1115 disables the feed pawl 1106, and the slide 1120 and consequently shaft 1105 return to their original positions because of the force of spring 1123. However, if the two cycles of reverse operation are followed by a third in the same direction, the mechanism again is effective to reduce the value standing in the third segment by "1" in the same manner as before. It will be recalled that at the end of the second cycle of operation, the feed arm 990 will be rocked (counter-clockwise in these figures) as the operation in the second order comes to a close. There being no latch for the second incremental position of the slide 1120, the slide will, under the force of its spring 1123, return with the shifting movement of the slide 1102. This reciprocation returns the feed pawl 1135 to the first step position (i.e., it has dropped back one tooth space), so that the rocking of the parts thereafter will again lift the pawl 1135 to shift the third order segment one tooth space towards "0."

D. *Final corrective cycle mechanism*

It will be recalled that when the last ordinal operation is in the reverse direction, which occurs when the values in the highest order of the multiplier factor run from "6" to "9," it is necessary to follow this last cycle of set operation by a single cycle in the selected direction. It will also be recalled that the multiplier carriage normally lies to the right of the operative position and is shifted to the operative position by the entry of a value into the multiplier unit. It is conventional, in the machine with which my invention is associated, to not only shift the carriage from the last operative position one step to the right to its normal inoperative position (which restores the multiplier carriage to its original position), but to attempt a further shift an additional step to the right. This final step is an idle one in that there is no escapement latch in this position of the carriage, so that the carriage returns to the left to the normal inoperative position at the end of the idle shifting cycle. The idle cycle is utilized to restore the setting pins 481 to 486 to their normal, inoperative positions, as is described in the Friden multiplier patents above-mentioned. This cycle is also utilized to release the control key latches 800 or 801, as the shifting of the carriage rocks the bellcrank 550 to rock the arm 803 to force the multiplier latches to their inoperative position. When the carriage is shifted to its normal, inoperative position in the first of the above-mentioned shift cycles, the highest order of the multiplier factor lies to the right of the ear 654 on the forward end of the shift control lever 651. It is conventional in the machine mentioned for this ear 654 to be engaged by an ear 655 (see Fig. 25) formed on the upper edge of the left frameplate, thereby rocking the shift control arm 651 to its shift position (counter-clockwise in the figure). In the rocked position of the lever 651, both the accumulator control interponents 633 and 634, which are conventional in this machine, are rendered inoperative by engagement of the roller 650 with the upper edges thereof. It is therefore necessary, in order to avoid greater and complicated changes in the conventional multiplication mechanism, to provide an auxiliary means for providing a single cycle of operation in the selected direction, whether that be additive or subtractive, when the value set in the multiplier unit requires operation in the reverse direction. This mechanism can only be operative when the highest ordinal operation is in a reverse direction—i.e., when the multiplier carriage 472 is returned to its home position and the operation in the preceding order has been in a reverse direction. This requires that this mechanism be under the control of two mechanisms: (1) means for sensing the direction of operation in the last ordinal operation, and specifically under the control of the slide 1120; and (2) a means for sensing the return of the multiplier carriage 472 to its home position. These controls will now be described.

The forward end of the slide 1120 (as seen in Figs. 24 and 25) carries a projection 1155 on which is riveted, or otherwise rigidly secured, a stud, or pin, 1156. This pin is so located that when the slide is given a single step of forward movement, it will be in a position to engage the rear edge of an arm 1160. The arm 1160 is rotatably but nonslidably mounted on a shaft, or bar, 1161, which is slidably journalled in the left frame plate 51 and the control plate 57. The shaft 1161 is resiliently biased to the left by a suitable compression spring, such as 1162, surrounding the shaft and seated at its right end against the frame plate 51 and at its left end against an arm 1163, the lower end of which is slotted to encompass the carriage rail 476, as shown in Fig. 10. The arm 1163, which is rigidly secured to the shaft 1161, lies inside the left frame plate 475 of the multiplier carriage 472, and is so positioned that the return of the multiplier carriage to its home position shifts the arm 1163 and consequently shaft 1161 to the right against the force of spring 1162. However, as soon as a single value is entered into the multiplier mechanism, and the carriage 472 is allowed to escape a single step to the left, then the arm 1163 shifts to the left with the carriage 472, from the force of spring 1162. Such shifting of arm 1163 and shaft 1161 to the left moves the arm 1160 out of the plane of pin 1156, so that movement of arm 1160 from operation of slide 1120 can occur when, and only when, the multiplier carriage is in its home, or normal, position. The shaft and the parts mounted thereon are blocked against shifting more than a single step by means of a collar 1164 mounted on the shaft and which engages the control plate 57 after the shaft has shifted a single step. Thus, when the carriage is returned to its home position, the arm 1160 is shifted to the right so as to lie in the plane of the pin 1156 and to be engaged by it, but will not be operated when the multiplier carriage is in any other position.

It can be noted that a single step of forward translation of the slide 1120 will bring the pin 1156 to a position where it will engage the arm 1160, if that arm is in its right-most position. Normally, during the progress of a multiplication operation, the slide 1120 will be fed forwardly and rearwardly without engaging the arm 1160 as the arm is to the left of the pin 1156. However, in the final cycle, the pin can engage the arm 1160, provided that the slide 1120 has already been moved forwardly a single step (which occurs when the machine is operating in a reverse direction). As the operation in that order is terminated, the feed arm 990 returns to its central position, which enables the pin 1108 on the feed pawl to engage in the second slot 1122. At the same time the pin 1156 is retracted slightly so that the arm 1160 can shift to the right into the plane of action of the pin. Thereafter, the arm 990 is operated at the end of the shift cycle to feed the slide 1120 forwardly again and thereby rock the arm 1160.

The rocking of the arm 1160 is effective to unlatch a mechanism which causes a final cycle of operation of the accumulator drive mechanism in the selected direction, thereby entering a value into the accumulator to correct the reverse operation in the terminal order. This mechanism is controlled by a link 1180, the forward end of which is pivotally mounted on the lower end of the arm 1160, as by means of pin 1181, while the rearward end is pivotally mounted on a bellcrank 1182, as by means of pin 1183 (see Figs. 19 and 23). The bellcrank 1182 is rigidly mounted on a short shaft 1186 journalled in the left side frame plate 51 and control plate 57 and biased to an inoperative position (counter-clockwise in Fig. 19) by a spring 1184 tensioned between a stud on the horizontal arm thereof and the pivot stud 1018 previously mentioned. The spring is sufficiently strong to pull the link 1180 to the rear and the arm 1160 to the clockwise position shown in Figs. 24 and 25. A hook latch member 1187 (see Figs. 11, 16 and 23) is rigidly mounted on the shaft 1186 in a plane adjacent to the slide cam 1196, previously mentioned briefly. When the hook arm is in its normal, or counter-clockwise, position shown in Fig. 11, the hook of this arm engages a pin 1190 riveted to, or otherwise rigidly secured on, an arm 1191. This arm is pivotally mounted in the machine, as upon stud 1192, extending inwardly, or to the right, from the control plate 57; and the arm is biased toward the front of the machine (clockwise in this figure) by a strong spring 1193. As shown in Figs. 11 and 16, the upper end of the arm 1191 is provided with a slot 1194 which embraces a pin 1195 on the cam slide 1196. This cam member is slidably mounted in the machine, as by means of slots 1197 and 1198 which respectively embrace a shaft 1199 and a guide collar 1200 which is slidably mounted on a shaft 1201 rigidly mounted in the intermediate bracket 899 and control plate 57 (see Fig. 23). The forward nose of the cam slide 1196 is provided with a cam face 672 (see Fig. 16), which is complementary to the cam face 673 of auxiliary interponent 635 and cam face 675 of auxiliary interponent 636, previously described. When the hook arm 1187 releases the arm 1191, the spring 1193 operates with sufficient force to rock the arm 1191 forwardly (clockwise in Fig. 11) and translate slide cam 1196 forwardly (to the right) and thereby cam either interponent 635 or 636 upwardly to its operative position.

Normally, the guide collar 1200 and cam slide 1196 are resiliently biased to the left, as by means of a spring 1205 (see Fig. 23), which encompasses the shaft 1201 and is seated between the intermediate bracket 899 and the hub of collar 1200. In this location of the collar 1200, the cam slide lies in a position behind the interponent 635, which, it will be recalled (see Fig. 16), is provided with an arcuate face 670 adapted to engage the pin 642 on the lever 643, but normally lying below the pin. When the interponent is lifted, as it is by slide cam 1196, it will be in a position to rock the computation control gate 135 to the rear, or positive operation, position, upon operation of the cam follower arm 630, previously described. However, the collar 1200, and with it the slide cam 1196, can be shifted to the right to lie behind the subtractive interponent 636. This interponent, as previously mentioned, is adapted to engage pin 663 on the lever 643 and is then effective to rock the computation control gate 135 forwardly upon operation of cam follower 630, thus setting it to its subtractive position. The collar 1200 and slide 1196 are shifted to the right upon depression of the subtractive multiply key 404.

It will be recalled that the depression of the negative multiply key 404 rocks the control lever 745 (clockwise in Figs. 11, 15 and 16). The rear end of this lever is provided with a pin 1210 which is embraced within slot 1211 in the forward arm of a bellcrank 1212. This bellcrank is pivotally mounted on the cam shaft 902 and its downwardly projecting arm pivotally supports a link 1213. The rear end of the link 1213 is slotted, as at 1214, and is provided with a cam bend 1215 (see Fig. 23) which bears against the left end of the guide collar 1200. When the negative multiply key 404 is depressed, the rear end of the lever 745 is rocked upwardly (clockwise in Figs. 11, 15 and 16), thereby rocking the bellcrank 1212 (counter-clockwise) and pulling link 1213 forwardly. When this is done, the cam face 1215 on the rear end of the link cams the guide collar 1200 to the right, against the compression of its spring 1205, and places the cam 1196 in line with the subtractive interponent 636. Then, when the latch arm 1187 is rocked to release arm 1191, the slide moves forwardly under the force of spring 1193, rocking the subtractive interponent 636 upwardly and moving the computation control gate 135 to its subtractive position.

Whenever the arm 1160 is rocked by the pins 1156, under the conditions previously described, thereby rocking the latch arm 1187 (clockwise in Fig. 11) to release arm 1191, the force of spring 1193 snaps the cam 1196 forwardly. This movement of the cam will rock either the positive interponent 635 or the negative interponent 636 upwardly to an operative position, thereby setting the computation control gate 135 to either the additive or subtractive position, depending upon the position of the cam 1196. This cam normally is in alignment with the positive arm 935 but is cammed to the right into alignment with the subtractive interponent 636 upon operation of the negative multiply key 404.

Normally, the machine with which my mechanism is preferably associated, operates for a single cycle following the shift of the mulitplier carriage 472 to its normal inoperative, or home, position for the purpose of restoring certain elements not here pertinent. That is, it is conventional in the Friden calculating machine to have a single cycle of machine operation following the shift of the carriage to its home position. The shift of the carriage to its home position will have shifted arm 1160 into alignment with the pin 1156. If the machine is operating in the selected direction in the last, or highest, order of multiplication (that is, additively in normal multiplication or subtractively in negative multiplication), the slide 1120 is disabled and the latch 1187 is not released. In that event the final cycle is an idle one for the cam 1196 is inoperative. However, if the machine is operating in the reverse direction in its highest, or final, order (subtractively in normal multiplication or additively in negative multiplication), then the slide 1120 has been fed forwardly one step and the pin 1108 of the feed pawl 1106 engages the notch 1122. In that event the latch 1187 is operated during the shift of the multiplier carriage 472 to its home position, which is effective to operate the slide cam 1196. The movement of the slide cam, in turn, will operate either interponent 635 or 636, and the rocking of the gate setting arm 630 at the start of the next, or final, cycle, will be effective to set the computation control gate 135 to an operative position and thereby enter the final necessary value during the final cycle of machine operation.

Preferably, the arm 1191 is provided with a notch 1220 (see Fig. 11) adapted to engage a pin 1221 on the centralizer arm 890, previously described. If the centralizer arm 890 is in its operative, or raised, position, the forward edge of the arm 1191 will engage the pin 1221, thereby holding the arm 1191 and consequently cam 1196 against operation until the centralizer 890 has returned to its inoperative position. On the other hand, the centralizer 890 cannot be operated after the arm 1191 has moved forwardly (clockwise in Fig. 11) as the pin engages the upper edge of notch 1220, thereby latching the centralizer against operation. Thus, the cooperating notch and pin form an interlock against operation of these components simultaneously.

The arm 1191, and consequently the cam 1196, are returned to their latched, or inoperative, position during the final cycle of operation, preferably as the machine approaches the mid-point of a cycle. It can be noted that the resetting of these elements at this time does not enable the centralization of the computation control gate 135, because a conventional interlock in the machine holds this gate in its adjusted position, once the machine has started to cycle, until the cycle is complete and the value set in the keyboard entered into the accumulator and any tens-transfers necessitated are completed. This means is shown particularly in Figs. 11 and 16 and comprises a forwardly extending link 1230, the rear end of which is pinned to the arm 1191 by any suitable means, such as pin 1231. The forward end of the link is supported by an arm 1232, to which it is pivotally mounted by any suitable means, such as pin 1233. The arm 1232 is pinned, or otherwise rigidly mounted on a shaft 1234 (see also Fig. 16), which is journalled in the left side control plate 57 and the intermediate bracket 899. The shaft 1234 carries a second arm 1235, also rigidly secured thereto, which arm lies in the plane of the roller 789 mounted on the right side of the cam plate 780. Normally, when the parts are in the latched position, this arm 1235 is radially removed from the shaft a sufficient distance to avoid engagement by the roller 789. However, when the arm 1191 moves forwardly under the force of its spring 1193, the arms 1232 and 1235 are rocked (counter-clockwise in these figures). This release of power arm 1191 occurs after the machine has passed the mid-point in its shifting cycle following operation in the highest order of the multiplier, and as described above, sets the machine for a final cycle of operation in the selected direction. Then, in the final, or terminal, cycle of machine operation, the roller 789 engages the arm 1235, thereby rocking the arm 1235, shaft 1234, and arm 1232 (clockwise in these figures). This rocking of the arm 1232 resets the arm 1191, which is immediately relatched by arm 1187, for that arm was rocked only momentarily by the operation of the feed arm 990. Thus, the parts are latched in their normal inoperative position at the end of the multiplication operation.

E. *Tripping "0" latch*

It is necessary to have a single cycle of computing operation in the selected direction whenever the machine shifts from operation in a reverse direction to a "0" multiplier value. This can be secured most conveniently by setting the "1" pin 481 upon depression of "0" key 401, then tripping the "0" latch 520 as the multiplier carriage is shifted into operative position for the "0" value, and simultaneously setting the blocking mechanism to prevent the additional count of "1" normally required when shifting from operation in the reverse direction.

In this connection, it will be recalled that the depression of a "0" key was effective to set the "1" pin 481 to its operative position and to cause the escapement of the multiplier carriage one step to the left, but that it did not release the "0" latch 520 (Fig. 10). The means for tripping the "0" latch as the multiplier carriage is shifted into the operative position for a "0" value, is shown particularly in Figs. 7, 15 and 19. It will be noted that the arm 1020 extends downwardly beyond the pivot pin 964 which connects that arm to the sensing arm 960 (see Fig. 15). A hook latch 1070 is mounted on the lower end of the arm 1020, by any suitable means, such as stud 1071. This arm is provided with a hook, or shoulder, 1072 on its rearward end, and is resiliently biased to an operative position (counter-clockwise in these figures) by means of a spring 1073 tensioned between a stud on the forward end of the arm 1070 and a stud on the arm 1020, as shown. The arm 1070 is also provided with an abutment, or extension, 1074 which engages a bracket 1075 mounted on the base plate 56 when the control arm 1020 is in the selected direction position, thereby rocking the hook arm 1070 (clockwise in Figs. 15 and 19) against the bias of its spring 1073.

Whenever the control arm 1020 is rocked to its reverse position (to the left, or clockwise, in these figures), the abutment 1074 moves away from bracket 1075, thereby permitting the hook arm 1070 to rock (counter-clockwise in these figures) from the tension of its spring 1073. When so rocked, the shoulder 1072 engages a pin 1080 (see also Figs. 24 and 26) mounted at the upper end of a plate, or arm, 1081. This arm, or lever, is pivotally mounted on the left end of shaft 290 by any suitable means, such as by screw 1082. The arm 1081 is biased (counter-clockwise in these figures) by means of spring 1083, which spring is tensioned between a stud on a latch arm 1087 (not here pertinent) and a stud on a stop abutment 1084 which engages the base plate and prevents overthrow of the lever 1081. The return of the control arm 1020 from the reverse direction position, in which the shoulder 1072 engages pin 1080, to its normal, or selected direction, position will rock the arm 1081 against the tension of its spring 1083.

The plate, or arm, 1081 is provided with an aperture, not identified, in which is inserted a pin, or stud, 1085 extending to the left from a gate 1090 (see Fig. 7) and through an aperture 1086 in the left side control plate 57 (see also Fig. 24). The gate 1090 is rotatably mounted on the shaft 290, immediately to the right of the control plate 57 (see Figs. 7 and 10). This gate is mounted on a pair of arms 1091, the left-hand arm carrying the pin 1085 above-mentioned. By means of the connecting pin 1085, the gate 1090 rocks in synchronism with the lever 1081 on the outside of the frame plate. The right-hand end of the gate extends to the right to a point one ordinal spacing of the setting pins 481 to 486 to the left of the "0" latch arm 530. The bail, or gate, 1090 terminates in a forwardly extending nose 1092 (see Fig. 7), which, when the gate is rocked, will engage the aligned "0" latch 520 and rock it to its releasing position. Incidentally this nose 1092, which is one ordinal step to the left of the "0" latch arm 530 and the aligned noses 461 to 466, inclusive, of the pin setting arms, is aligned with the ear 654 on the shift control lever 651 and the segment feed pawl 590, and is, therefore, in the plane of the control components of the multiplier mechanism. It will be recalled that when values are being inserted in the multiplier mechanism, the "0" latch release arm 520 or the aligned operating arms 461 to 466, inclusive, are aligned with the highest unadjusted order of the multiplier carriage. As a key is depressed, the value is inserted in the pins 481 to 486 of the carriage, and the carriage then escapes one ordinal position to the left in order to come into alignment with the operative mechanism comprising the segment feed pawl 590, the ear 654 and the nose 1092. Then, during the multiplication operation, these parts are in the plane of the lowest order segment in which a value is inserted, so that these operating parts are enable to operate on the lowest ordinal multiplier value, the carriage 472 being stepped one order to the right at the termination of each series of ordinal operations.

It will be obvious that the rocking of the control arm 1020 (Figs. 19 and 24) from the rearward, or reverse direction, position, to the forward, or selected direction, position, will rock the arm 1081 and consequently the gate 1090, thereby releasing the "0" latch 520 in the operative order of the multiplier carriage. If a value has been set into the pins of that order, this rocking of the "0" release latch is an idle one. If, on the other hand, its stands at "0," the "1" pin will have been set but the "0" latch 520 will not have been operated, and in that event, the rocking of the gate 1090 releases the "0" latch and permits the segment of that order to move from the "0" to the "1" position. Thus, the conventional control mechanism will be operated to cause a single cycle of operation in that cycle, in that order, and thus afford the necessary one-cycle of operation in the selected direction when the segment stood at "0" and the operation in the next lower order was in the reverse direction.

Normally, the change from operation in the reverse direction to operation in the selected direction is effective to require an additional cycle of operation in the selected direction in the new order. The mechanism for adding the additional cycle of operation is shown in Fig. 26, and has been described previously. However, it is obvious that when the value in the multiplier is "0," there must be only one cycle of operation in the "0" order, even though the pin of that order shows a value of "1." This operation is controlled by blocking the mechanism which provides the extra cycle, by the means previously described. It will be recalled that the blocking arm 1050, when in its lowered position, engages the hook 1031 and, therefore, prevents the latching of the mechanism shown in Fig. 26 in its operative position. The blocking arm 1050, in turn, is controlled by the sensing arm 1056 (Fig. 25) which senses the multiplier segment standing in the first order to the left of ear 654. Thus, at the termination of the ordinal series of operations in the reversed direction, the nose 1061 of the sensing arm 1056 engages the segment 490 and holds the blocking arm 1050 in blocking position. As the shift cycle progresses, the blocking arm 1050 is held in blocking position until the segment 490 standing at "0," has been shifted more than halfway to the right. By this time the connecting link 1030 has been cammed out of connection position, i.e., the pin 1026 on the arm 1020 has been disengaged from the notch 1036 on link 1030. Thereafter the latch-releasing gate 1090 is operated by the control arm 1020, so that the segment will be released to the "1" position after the feed pawl 590 is rendered effective by the disablement of the blocking mechanism shown in Fig. 26. Therefore, the mechanism for inserting an additional cycle of operation is rendered inoperative because of the fact that the next higher segment stands at "0," and the segment is not released until after the shifting cycle has progressed so far that the extra cycle mechanism cannot become operative.

It should be noted, also, that in the event there are two consecutive zeros in the multiplier value, the operation in the higher of those two orders will not be affected, even though the operation in the order next below the lowest of those two zeros was in the reverse direction. Obviously, the operation in the lowest of the two orders in which the "0" multiplier stood will have a single cycle of operation, or count, as a result of the shift from the operation in the reverse direction. However, in the shift from the order below the lowest of the two zeros to the lowest order in which the "0" appeared, the arm 1020 has shifted from the reverse direction position to the selected direction position. Such movement of arm 1020 rocks arm 1070 out of engagement with pin 1080, because of the engagement of its abutment 1074 with the bracket 1075 (as shown in Figs. 15 and 19). Thus, as the operation is terminated in the order in which the lowest of the two zeros appeared, the gate 1090 will remain inoperative, thereby leaving the higher of the two segments at its "0" position. In that event, the shifting of the multiplier carriage causes the segment of the higher of those orders to engage the ear 654 on the shift control lever 651, thereby holding it in its rocked (counter-clockwise in Fig. 19) position to initiate another shift of the carriage. By this means, a plurality of zeros appearing in the multiplier value ordinally above a value causing a reverse operation, will cause a count, or cycle of operation, in the order of the lowest of those zeros, but will not affect the setting of the other segments nor add extra counts in those orders.

22. OPERATION

It is believed that the operation of the mechanism of my invention will be understandable from the preceding description. However, a brief review of a few problems will perhaps clarify the operation of the machine.

Let us assume, by way of example, that the factor "745" has been set in the multiplier keys 400, and that the main keyboard keys 80 are set for a multiplicand value of "123." The depression of these keys in order (beginning with the highest order) will have set the pins 481 to 486 as follows: Both the "3" pin 483 and the control pin 486 in the highest order (in the extreme left-hand order of the multiplier carriage 472; the "4" pin 484 in the tens order and the "5" pin 485 in the units order. These three orders are in the three highest orders of the carriage 472 and the lowest of the three stands one order to the left of the home position of the carriage and in alignment with the nose 654 of the shift control arm 651, the feed pawl 590, and the zero latch release nose 1092.

Now let us assume that either the multiply key 402 or the accumulate multiply key 403 has been depressed to initiate a multiplication operation. It will be recalled that both of these keys are operative to accumulate values additively into the accumulator, the only difference being that the multiply key results in a clearing of the register while the accumulate multiply key 403 does not. The depression of either of these keys initiates the operations of shifting the carriage to the extreme left-hand position and, if the multiply key 402 has been depressed, in clearing the register in that terminal carriage position. In either event, the attempted shifting beyond the extreme end position results in the operation of the override pawl 260 (Fig. 5) which releases the trigger 690 (Fig. 15) on the left-hand side of the machine and initiates the actual multiplication operation. At this point the operation of the feed pawl 590 (Fig. 10) is enabled and being operation in the order aligned therewith—which, in this example, is a value of "5." Simultaneously, the rocking of the trigger 690 has operated lever 785 to move cam 780 (Fig. 17) into its operative position, set the shift control arm to its operative position, and has released the control arm 1020 so that it drops under the force of its spring 1073.

As the value in this order is "5," the pin 486 remains in its retracted position, so that it engages the roller 965 on the arm 960 (Fig. 7), thereby holding the sensing arm 960 and control arm 1020 in their forward positions. During the overstroke cycle, immediately after the release of trigger 690, the cam 970 (see Fig. 19) rocks the follower arm 980, and hence the feed arm 990 which is resiliently connected thereto by strong spring 983. Thus, the arm 990 resiliently translates the link 930 rearwardly. In view of the fact that the arms 960 and 1020 are held in their forward position by the pin 486 of the operative order of the multiplier carriage, the bellcrank 934 is permitted to rock to its extreme position, thereby rocking the segment 916 to the position shown in Fig. 20. In this position of the segment, the cam 900 permits the positive interponent 633 to rise to its operative position while holding the subtractive interponent 634 depressed, or inoperative. Immediately thereafter, in the first of the registering cycles in the operative order, the cam 780 (Fig. 11) rocks gate setting arm 630, thereby translating the interponent 633 rearwardly against pin 642 of gate setting lever 643 (thereby setting the computation control gate to the additive position). The gate 135 is set in the first few degrees of the cycle, prior to the registering, or computing, phase of the cycle. Simultaneously with the start of the registering phase, the feed pawl 590 becomes operative to feed the aligned segment a single step. The segment 916 and gate setting arm 630 are latched in position, so with each cycle of machine operation the operative segment 490 is fed backwardly toward its "0" position, and the multiplicand value set in the keyboard keys 80 is entered into the register 62 additively. At the end of the first ordinal operation, the value standing in the counter dials 65 will be "5" and the value standing in the accumulator dials 62 will be five times the multiplicand factor set in the keyboard (or "615" in the example given).

When this first segment reaches its "0" position, it engages the ear 654 on shift control arm 651. The rocking of this arm causes the roller on the rear end thereof to engage the upper end of the interponent 633, thereby rocking it to its inoperative position; disengages the latch members 1010 and 1015, thereby permitting the link 930 to move forwardly under the force of spring 983; and, through the operation of hook 846, arm 865, arm 867, link 871, arm 870, and shaft 597 (Fig. 11) to disable the feed pawl 590. The operation of the shift control arm 651 has also enabled the operation of shift pawl 612 by rocking shaft 620 to lift the pawl into the plane of the rack 610. This initiates a shift of the multiplier carriage one ordinal space to the right, and simultaneously shifts the carriage 60 to the right a single step, by the means previously described. This shifting brings the segment with the value "4" into the operative position. During the latter half of this shifting cycle, the feed arm 990 has again been operated, again shifting the link 930 to the extreme rearward position where it is again latched. In this second order, the machine cycles four times, again adding the multiplicand value into the accumulator register during each cycle. At the end of the fourth cycle, the upper end of the segment 490 again engages the ear 654, again initiating a shift of both carriages, a disablement of the feed pawl 590 and enablement of the shift pawl 612. At the end of the second ordinal series of operations, the value standing in the keyboard, i.e., the multiplicand factor, will have been entered four times additively into the accumulator register with the carriage in the second ordinal position, giving an accumulation in the register dials 62 forty-five times the multiplicand value (or "5535" in this example) and showing a value in the counter dials 65 of "45."

During the shift from the second to the highest order of the multiplier value, the arm 1020 is enabled to rock to its extreme position under the force of spring 1073, as in this order the pin 486 has been projected out of the plane of the roller 965, thereby permitting both arm 960 and arm 1020 to move to their extreme rearward positions. In this situation, the arm 934 is permitted to rock only half as far as previously, thereby limiting the translation of the link 930 to a single increment. This permits rotation of the segment 916 (counter-clockwise from that shown in Fig. 19) to a position intermediate that shown in Fig. 19 and that shown in Fig. 20. In this position of the segment, the nose 905 on the cam 900 (Fig. 22) depresses the positive interponent 633, while a low on the cam 901 permits the negative, or subtractive, interponent 934 to rise under the force of its spring. Thus, in this order of operation, the machine is set for subtraction rather than addition and the counter actuator 162 (Fig. 2) is likewise set for subtraction, for it normally operates in the same direction as the accumulator dials. As soon as the shift is completed, the feed pawl 590 is aligned with the highest order segment 490 and is enabled to operate upon that segment. This highest order segment is in the "3" position, as in that order the "3" pin 483 had been set, so the machine will operate in this order for the three cycles it takes to feed the segment 490 to its "0" position. Such operation is, of course, subtractive as the multiplicand value is subtracted three times in this order.

When the control arm 1020 was rocked to this extreme position, the link 1115 was moved rearwardly so that the nose 1117 on the rear end thereof moves rearwardly beyond the shoulder 1110 of the feed pawl 1106, permitting the latter to rock into engagement with the slide 1120. The subsequent rocking of the feed arm 990 is then operative to move the slide 1120 a single step forwardly, in which position it is latched by the action of pin 1146 carried by latching arm 1147. At the end of the third subtraction, the upper end of the segment 490 engages the ear 654 of shift control lever 651, and initiates another shifting cycle. At the end of these three cycles of operation, the multiplicand value will have been subtracted three times in the hundreds position, which creates an overdraft in the accumulator, the dials at the extreme left standing at "9." Specifically, the accumulator dials will read "68635" preceded by "9's" to the left of the register. Simultaneously, the operation has reduced the value of "0" in the third order counter dial 65 to "7" by subtraction, all of the orders to the left thereof standing at "9" to show the overdraft. The shifting of the multiplier carriage 472 to the right carries the arm 1160 (Fig. 19) in front of pin 1156. Immediately thereafter the arm 990 is again rocked, which enables the slide 1120 to move forward to rock arm 1160. The rocking of arm 1160, through link 1180, bellcrank 1182, shaft 1186 and latch arm 1187 releases the setting arm 1191 (see Fig. 11). The arm rocks forwardly (clockwise in this figure), thereby moving the slide cam 1196 to its operative position. As the machine was set for positive multiplication, the cam 1196 is aligned with the additive interponent 635, which it rocks upwardly to engage pin 642. At the end of the shift cycle, the cam follower 630 is again operated, thereby setting the computation control gate 135 for an additive operation, which follows during the resetting, or final cycle, of machine operation. It should be noted that the accumulator carriage 60, also, is shifted during this final cycle, for at the end of operation in the highest order the multiplier carriage is still one order to the left of its home position and bar 882 has consequently not disabled the right shift clutch controls.

At the end of this final cycle of operation, the multiplicand value has been entered in the fourth order, or thousands position, once, which removes all of the "9's" standing to the left of the multiplicand value in the counter and corrects the overdraft standing in the accumulator register. At this point the counter dials register the true multiplier value "745" and the accumulator register will show the true reading for that multiplication, or "91635" for the assumed multiplicand value of "123."

If the same multiplier and multiplicand values are used but the negative multiply key 404 is depressed, the operation will be similar in that the same machine steps and mechanisms are utilized but the computation control gate 135 will be reversed and the entry of values into the accumulator will be in the reverse direction. Specifically, the depression of the negative multiply key 404 causes a shifting of the register carriage to the extreme left-hand position without clearing a value from the accumulator register. The depression of this key will have rocked the arm 745 (Fig. 11) to rock the bellcrank 950 (Fig. 19) and set the interponent 940 to the negative position shown in Fig. 21. The operation of the sensing arm 960 and the control arm 1020 are the same as in the corresponding orders of the previous problem. That is, in the first ordinal operation the sensing arm 960 is cammed forwardly, thereby permitting the link 930 to move to the extreme rearward position. This sets the segment 916 to the extreme position shown in Fig. 21. This rocks the cam shaft 902, and consequently the cams 900 and 901 thereon, to the extreme counter-clockwise position. In this position, the point 908 on cam 900 (Fig. 22) depresses the positive interponent 633, and a low on cam 901 enables the subtractive interponent 634 to rise to its operative position. Thus, the machine operates in subtraction, the first cycle causing an overdraft throughout the length of the register and the counter, if both registers stood at "0" before the operation. Thus, at the end of five cycles of operation, the machine will have subtracted the multiplicand five times from the value previously in the register, or if the register was at "0" previously, then the value would stand "9..9385."

Following the five cycles of operation in the first order, both of the carriages 472 and 60 are shifted in the same manner as previously explained. As the machine is set for subtraction by the bellcrank 950 and the arm 960 is still held forwardly, the gate 135 remains in the subtractive position, for the second ordinal series of operations, and the link 1115 still disables the feed pawl 1106. The machine will, therefore, operate the true number of cycles determined by the setting of the aligned multiplier segment, or four times, in a subtractive direction. At the end of this ordinal operation, the accumulator register will read "9..4465" and the counter will read "9..955," which shows that the multiplicand value has been entered four times subtractively. The return of the segment to its "0" position again operates the shift control arm 951, and both carriages are shifted one order to the right.

In the final order, the arm 960 is permitted to drop to its extreme rearward position, as the aligned pin 486 has been projected to indicate a reverse operation by the setting of the value "7" in the keyboard. The bellcrank 934 can rock only one increment of rotation in this situation, and the link 930 can move rearwardly only one increment. This movement sets the control segment 916 in a position intermediate the settings shown in Figs. 19, 21 and 22. In this position, the point 907 on the cam 901 depresses the subtraction interponent 634 and a low on cam 900 enables additive interponent 933 to rise to its effective position. Thus, the machine is set for additive operation, i.e., in a direction the reverse of that determined by the multiplier control key, and the machine operates accordingly for three cycles of operation. The first of these cycles will add "123" to the accumulator register dials and "1" to the counter dials, thereby returning the overdraft "9's" of both the accumulator and the counter to "0." At the end of this ordinal series of operations, the accumulator reading will be "31365," which is the complement of the true product at this stage, and the counter dials will read "255."

The operation in this order will have rocked the control arm 1020 to its extreme rearward position, thereby enabling the feed pawl 1106 so that the operation of the feed arm 990 translates the slide 1120 forwardly, in which position it is latched by pin 1146. At the termination of the series of operation in the highest order, the feed arm 990 returns to its neutral position, enabling pin 1108 to engage notch 1122. Then, in the shifting cycle, the operation of feed arm 990 rocks arm 1160, link 1180 and bellcrank 1182 (Fig. 19) to release latch arm 1187 (Fig. 16). The cam 1196 is, therefore, operated to set the auxiliary subtractive interponent 636 to its operative position. It will be recalled that the depression of the negative multiply key has rocked arm 745 (Fig. 16) to rock the bellcrank 1212 (counterclockwise), thereby pulling the link 1213 forwardly and camming the cam slide 1196 to the left so that its nose 672 will engage the cam 675 on the interponent 636. Thus, the machine is set for a final cycle of operation in the selected direction, which occurs as the multiplier carriage is shifted beyond its home position. The final reading of the registers will then be: "9..908365" in the accumulator, and "9..9255" in the counter—both of which values are the complements of the true product, i.e., values resulting from normal, or additive, multiplication.

It will be noted that the operation from the assumed multiplier value has been the same in both instances: Five cycles of operation in the selected direction in the lowest order; four cycles of operation in the selected direction in the second order; three cycles of operation in the reverse direction in the highest order; and a single cycle of operation in the selected direction when the multiplier carriage 472 is in its extreme position, i.e., is one position beyond its operative position. This final cycle is an automatic one and is jointly controlled by the return of the carriage to its home position and the operation of the slide 1120, as described. The operation of these two means together release the latch arm 1187, thereby enabling the slide cam 1196 to move the auxiliary interponents 635 or 636 into their operative position.

The second problem will exemplify the operation of my invention when two consecutive orders of the multiplier are the higher values ("6" to "9", inclusive), and the terminal, or highest, order is a lower value ("1" to "5"). For example, let us assume a multiplier value of "278," using the same multiplicand factor of "123" as previously. The entry of the first digit "2" into the multiplier sets the "2" pin 482 of the highest order and steps the carriage 472 one order to the left; the depression of the "7" key sets the "3" pin 483 ("3" being the tens-complement of "7") and also the control pin 486 of that order, and steps the carriage 472 another space to the left; and the depression of the "8" key for the final digit sets both the "2" key 282 and the control pin 486 of that order. Then if either of the additive multiplier keys 402 or 403 are depressed, the machine will operate as follows, following the conventional shifting and/or clearing of the register, and the release of the multiplying trigger 690:

In the lowest order, or first ordinal operation, which is controlled by the value "8," the sensing arm 960 will be enabled to rock rearwardly, thereby setting the control arm 1020 in its most rearward position. In this setting, the bellcrank 934, and consequently link 930, will be enabled to move only one increment of motion, thereby setting the segment 916 to a position intermediate that shown in Figs. 19 and 20. In this position, it will be recalled, the nose 905 on the cam 900 (Fig. 22) depresses the additive interponent 933 while a low on cam 901 enables the subtractive interponent 934 to rise to its operative position. In this manner, the machine is set for a subtractive operation, and the multiplicand value will therefore be entered subtractively into the accumulator. At the end of the first ordinal series of operations, the counter reading will be "9..98" (to indicate two subtractions from a "0" value) and the accumulator value will be "9..9754."

The setting of the control arm 1020, in its rearward position, has pushed the link 1115 to its rearward position, thereby enabling the feed pawl 1106 (see Figure 25). Thus, the operation of the feed arm 990 has moved the slide 1120 forward one step and it has been latched in that position. When the segment 490 has been returned to "0," the shift control arm 651 will disengage the latch members 1015 and 1010, the feed arm 990 will return to its neutral position, whereby the pin 1108 engages the second notch 1122. As the multiplier carriage is shifted to its next ordinal position, the operation of the feed arm 990 again rocks the segment 916 to the intermediate, or subtractive, position just mentioned. The second step of operation of the slide 1120 has been operative, through the effect of slot 1125, pin 1130 and arm 1131, to rock the shaft 1105 (counter-clockwise in Fig. 25 and clockwise in Fig. 10). The rocking of this shaft, through the medium of arm 1133 and link 1134, has lifted the feed pawl 1135 a second step, so that it has returned the aligned segment a single step at the end of the shifting operation, as the shift pawl 612 is returning to its home position. This operation of pawl 1135 upon the aligned segment has reduced the count, or cycles of operation, in the second order by "1." It follows that because the multiplier value was originally "7," there will be only two cycles of operation in the second order; and these cycles will be subtractive because of the conditions determined by the fact that the value is larger than "5". Thus, there are two subtractive cycles in the second order of operation which changes the counter reading to "9..978" and the accumulator to "9..97294." At this point the second segment 490 rocks the shift control lever 651 to initiate a shift of the carriage and to return the feed arm 990 to its neutral position.

The shift of the multiplier carriage 472 to the right causes the roller 965 on sensing arm 960 to engage the control pin 486 of the highest order, thereby rocking the sensing arm and the control arm 1020 forwardly to the selected direction position. The setting of the sensing arm 960 in this position enables the feed arm 990 to translate the link 930 to its extreme rearward position, thereby setting the segment 916, shaft 902, and the cams 900 and 901 to the additive position shown in Fig. 20. In this position, a low on the cam 900 enables the additive interponent to rise to its operative position, while the point 906 on the cam 901 depresses the subtractive interponent 634. The machine is thus set for an additive operation.

In this situation it is necessary to have an additional count, or cycle of operation, in order to correct for the fact that the machine has operated in the reverse direction in the preceding cycle. This extra cycle is secured by means of the mechanism shown in Fig. 26, for the rocking of the control arm 1020 to its forward, or selected direction, position has pulled the link 1030 forwardly, thereby causing the hook latch 1031 to engage the pin 821 on the feed pawl control arm 820. The computation control gate 135 has been set for additive operation at the end of the carriage shift, so that in the first cycle of operation in the third order the multiplicand value will be set into the register. However, the segment feed pawl 590 has been disabled in this cycle of operation by the latch 1031 engaging pin 821, so that while the value is entered into the accumulator, and there is a corresponding change in the counter of "1" to show a reading of "0078," there has been no change in the setting of the final, or highest order, segment 490. The latch is released after approximately a quarter of a cycle of operation, which is too late to enable the operation of the feed pawl in that cycle. In the succeeding cycles the segment 490 is returned step-by-step for a count of "2" to show a true reading of "278" in the counter and a product of "34194" in the accumulator.

If the negative multiply key 404 had been depressed, using the same multiplicand and multiplier factors, the result would be to give the complement of the product just mentioned. The only difference between the two operations is that the segment control interponent 940 is set to the negative position shown in Fig. 21. In this situation, the single step of movement allowed to the bellcrank 934 and the link 930 will set the segment 916, and consequently shaft 902 and cams 900 and 901, to the positive position which lies intermediate the position shown in Figs. 19 and 21. Thus, the first two ordinal series of operations will be to add the multiplicand value into the register twice in each order; while it will be subtracted three times in the third order. This gives a product which is the complement of the true product and thus subtracts the true product from whatever value previously stood in the accumulator register. It is believed unnecessary to explain the steps caused by the depression of the negative multiply key in detail, for the control mechanisms operate in exactly the same way as explained in connection with the depression of the additive multiply keys 402 or 403, the only difference being that, in this instance, the selected direction is subtractive and the reverse direction is additive.

Let us assume another multiplier factor of "100201." The depression of either of the additive multiply keys 402 or 403 will cause the shifting and/or clearing of the registers, as previously explained. The setting of the first multiplier digit "1" sets the "1" pin 481, releases the "0" latch 520, thereby permitting the segment 490 to rotate to the "1" position. The entry of the next two zeros likewise sets the aligned "1" pins 481, but in these two orders the "0" latch 520 is not operated so the dials stand at the "0" position. The entry of the "2," through the depression of the "2" key, sets the "2" pin 482 in the fourth order from the left, releases the "0" latch and permits the carriage to escape one order to the left. The entry of the next "0" sets the "1" pin 481 in the next order and permits the carriage to escape to the left, but does not release the "0" latch. Finally, the entry of the final "1" sets a "1" pin 481 in that order, releases the latch and lets the multiplier carriage escape one order to the left.

In the lowest ordinal position, the multiplicand value will be entered once, which returns the aligned segment to its "0" position. The return of the segment to the "0" position rocks the shift control arm 651 and thereby initiates a shifting operation. During this first ordinal operation, the arm 1020 has been released to the urgency of its spring 1073, but the engagement of the roller 965 with the aligned pin 486 holds it in its forward position. The gear segment 916, of course, is in its additive position, as previously explained. In this position of the arm 1020, the hook member 1070 on the lower end thereof is held in its clockwise position and is therefore inoperative. Therefore the shift from the lowest to the next order is conventional. In the second order, the nose 654 of the sensing arm 651 engages the upper end of the newly aligned segment 490, during the shift, thereby holding the control arm 651 in its rocked position. This initiates a second shift of the carriages and the machine shifts into the third ordinal position. The control pin 486 of this order is also in its normal position so the sensing arm 960 is held forwardly, again setting the machine for an additive operation. In this third position, the multiplicand value will be entered twice and the carriage again shifted. The sensing arm 960 is still held forwardly in the next two shift cycles so that the hook 1070 still remains inoperative. Thus, there are a series of two shifts without the entry of values into the accumulator register. Finally, in the final cycle, the multiplicand value is entered once and the machine terminates its operation in the conventional manner.

If the negative multiply key 404 were depressed instead of one of the additive ones, the operation would be in the reverse direction, but the same steps would be taken: A single subtractive cycle in the lowest order, a shift without entry of values in the tens order, a shift and the entry of a multiplicand factor twice in the hundreds order, followed by shifts without entry of value in the thousands and tens of thousands order, and an entry of the multiplicand value once in the final, or highest, order. If the negative multiply key had been depressed, there would be a single subtraction in the lowest order, two subtractions in the hundreds order and a single subtraction in the highest order. However, regardless of the direction of operation, the control mechanisms operate in exactly the same manner, so that this problem need not be described in detail.

Finally, let us assume a multiplier factor of "900809." It will be noted that the entry of this factor into the multiplier unit causes setting of the valve pins exactly the same as in the preceding problem in which the multiplier value is "100201," and that, in addition, the control pins 486 have also been projected to control an operation in the reverse direction in the lowest, or units, order; in the third, or hundreds, order; and in the highest order. Then if an additive multiplier key 402 or 403 is depressed, the machine will operate in the conventional manner to shift the carriage 60 to the extreme left-hand position and/or clear the registers according to the key depressed. When the multiplying control trigger 690 is released by the override pawl, the sensing arm 960 moves to its extreme rearward position, thereby setting the control segment 916 for reverse (in this case, subtractive) operation to a position intermediate that shown in Figs. 19 and 20. Simultaneously, the "0" latch release hook arm 1070 is rocked rearwardly and away from its disabling bracket 1075, thus enabling the hook to drop over the pin 1080. The depression of the "9" key has set the "1" pin in that order so that there is a single cycle of operation before the rocking of the shift control arm 651. At this point the value in the accumulator reads "9..9877" and the counter value reads "9..99." At the end of the first cycle of subtractive operation, the return of the lowest order operative segment to "0" rocks the shift control arm 651, thereby disabling the multiplier feed pawl, initiating a shift of both carriages, and returning the feed arm 990 to its neutral position.

As the multiplier carriage shifts from the lowest to the next ordinal position, the roller 965 engages the pin 486 of the second order, thereby rocking the sensing arm 960 forwardly, and with it, the control arm 1020. Such rocking of the control arm disables the feed pawl 1106 and pulls the hook member 1070 forwardly. Such movement of the hook member, through its engagement with pin 1080, rocks the bail 1090 to trip "0" latch 520 in that order. Thus, as the carriage shift is completed, the "0" latch is released and the segment drops one step. This enables the shift control arm 651 to rock (clockwise in Fig. 11) and thereby enables an entry operation in the second order. As the sensing arm 960 is in its forward position, the bellcrank 934, and consequently the link 930, rock to their extreme positions to set the control segment 916 in the positive position shown in Fig. 20. There is, therefore, a single corrective cycle (additive, in this case), which brings the second order segment to "0" and initiates a new shifting cycle and simultaneous operation of feed arm 990. At the end of the second ordinal operation, the register value would read "1107" and the counter stands at "0..09."

As the multiplier carriage shifts to the third ordinal position, the roller 965 is released from the second ordinal pin 486, so that the sensing arm 960 can rock rearwardly and with it the control arm 1020. This enables the feed pawl 1106 and permits the hook 1070 to drop over the pin 1080 again. In view of the fact that the mechanism operated in the selected direction in the preceding cycle, there is no extra cycle of operation in this order, and no change in the setting of the segments. However, the position of the control arm 1020 and sensing arm 960 permits only a single step of movement of the bellcrank 934 and the link 930, so that again the segment 916, and consequently cam shaft 902 stand in the negative position, which is intermediate the positions shown in Fig. 19 and Fig. 20. Thus, in the third ordinal operation, the multiplicand value will be entered twice in a subtractive direction. The registers, at the end of this ordinal series of operations, will read: accumulator, "9..976507" and the counter, "9..9809."

The carriage shifts from the third ordinal series of operations into the fourth ordinal position following the two subtractive cycles just mentioned, and, during the shift, the sensing arm 960 will again be rocked forwardly, pulling arm 1020 and hook member 1070 with it. The hook member 1070 rocks the bail 1090, thereby releasing the "0" latch. As the "1" pin 481 had been set in this order, by the depression of the "0" key, there will be a single additive cycle of operation in this order to correct for the subtractive cycles in the preceding order, thereby giving a reading in the accumulator register of "99507" and in the counter of "0809."

After the single corrective (additive) operation is finished in the fourth order, the carriages are again shifted. During the shift of the multiplier carriage, the "0" latch 520 of the fifth order is not released because the arm 1020 had been in the additive, or selected direction, position in the preceding order. Thus, the hook 1070 does not engage pin 1080 and the bail 1090 is not operated. The segment 490 in the fifth order, therefore, remains in the "0" position, which holds the shift control lever 651 in its operative position to continue an uninterrupted shift from the fourth to the sixth ordinal position. Thus, it is apparent that when consecutive zeros follow an operation in the reverse direction, the corrective cycle in the selected direction occurs in the lowest of those "0" orders, but not in the higher.

In the sixth, or highest, ordinal position, the sensing arm 960 is again permitted to drop rearwardly, for the aligned control pin 486 had been projected by the depression of the "9" key. The arm 960, in this situation, is in the path of travel of the bellcrank 934, limiting it, and consequently link 930, to a single increment of motion. This sets the segment 916 in the negative position intermediate that shown in Figs. 19 and 20, for a single subtractive cycle in this position. At the end of this single subtractive cycle the accumulator register will read "9..987799507" and the counter will read "9..900809," and the shifting mechanism will be operated in the usual manner.

The setting of the sensing lever 960, and consequently control arm 1020, for the highest ordinal operation, by means of link 1115, will have enabled the feed pawl 1106, so the slide 1120 will have been fed forwardly one step and latched in the forward position. In this position, the pin 1156 will be adapted to engage the arm 1160 when that arm is permitted to shift to the right, which occurs as the multiplier carriage 472 is shifted to the right to its home position after the termination of operation in the highest order. Then, as the feed arm 990 is rocked in the latter portion of the shifting cycle, the consequent movement of slide 1120 will rock arm 1160 and consequently unlatch the arm 1191, as previously described. This causes the slide cam 1196 to be moved forwardly, thereby engaging the additive interponent 635 to rock it upwardly and set the machine for additive operation in the final cycle. In this final cycle, the gate setting arm 630 is rocked by cam 780, thereby positively setting the computation control gate 135 to the additive position and the multiplicand value is entered once in this order, which, incidentally, is one order to the left of the position determined by the highest order of the multiplier segments. This gives a final value of "110799507" in the accumulator register and a reading of "900809" in the counter.

If the negative multiplier key 404 had been depressed instead of one of the additive ones, the sequence of operations would have been the same. The only difference would have been that instead of subtracting in the first, third and highest orders, the values would have been added into the register; and instead of single additive cycles in the second and fourth orders, there would have been single subtractive cycles of the machine; and instead of a single additive cycle in the seventh ordinal position of the carriage 60, there would have been a single subtractive cycle. In each of the second and fourth orders, the hook member 1070 would have been effective to rock the bail 1090 and thereby initiate an additional operation in the selected direction, but the hook would not have been effective in the fifth order. The only other change in operation would have been that the depression of the negative multiply key 404 would have shifted the cam 1196 one step to the right so that it would engage the negative interponent 636 instead of the positive interponent 635 in the seventh ordinal position. Thus, the final corrective cycle would have been subtractive rather than additive.

It is believed that the foregoing has been sufficient to clearly explain the construction and operation of my machine. It will be noted that the mechanism, which I have provided, automatically determines operation in the selected direction for values of "1" to "5" and operation in the reverse direction for values of "6" to "9." The mechanism of my invention also provides means for automatically adding a corrective cycle in the selected direction in the order above an operation in the reverse direction—in the intermediate orders of the multiplier through the disabling of the feed pawl 590 for the first cycle of operation and in the terminal position by means of the cam 1196 and its operation from the shifting of the multiplier carriage to its home position. Thus, in all positions, it is possible to automatically add a corrective cycle in the order above operation in a reverse direction. It is further apparent that the means of my invention provides an automatic mechanism which drops a cycle of operation whenever operation in the particular order is in the reverse direction and the operation in the preceding order was likewise in the reverse direction. This is readily secured by the operation of the slide 1120 and its second step of movement moving the operative multiplier segment one step towards its "0" position as the shifting operation comes to a close. The mechanism of my machine further provides for the extra count necessary in an order having a "0" multiplier value, following operation in the reverse direction in the immediately adjacent lower order. This is accomplished by means of the mechanism which sets the "1" pin in the pinboard upon depression of a "0" key without releasing the "0" latch, and the release of the "0" latch when the segment shifts to the operative position following operation in the reverse direction. This enables the segment to drop to a "1" position during the shifting operation so as to enable a single count in the selected direction in the higher order. The mechanism of my invention also provides means which automatically prevents an additional count on a "0" setting when the operation in the preceding direction was in the selected direction, either through a value of "1" to "5" being inserted therein, or of a value of "0" standing therein and being corrected through the single additive count above-mentioned. Thus, the mechanism of my invention provides for all the contingencies which arise in the automatic operation of a multiplier mechanism of the type described in the Friden Patents Nos. 2,371,752 and 2,399,917 in shortcut multiplication, thus providing for fully automatic operation in either additive or subtractive operation at increased speeds of operation.

I claim:

1. In a calculating machine for performing shortcut multiplication and having an accumulator, actuating mechanism including a reversing means for reversibly operating said accumulator, means for shifting said accumulator relative to said actuating mechanism, sign character control means for adjusting the reversing means to operate said accumulator in a selected sign character direction or in a reverse sign character direction, and power driven means for cyclically operating said actuating means and said shifting means; the combination which comprises a multiplier storage mechanism having a plurality of differentially settable elements shiftable ordinally as a unit for controlling multiplying operations, means for restoring the settable element of an operative order progressively to "0" position, mechanism for shifting said differentially settable elements to bring successive elements into operative position, means responsive to restoration of a settable element to "0" position to control operation of said shifting means and said shifting mechanism, positionable means for setting said sign character control means, power driven means for operating said setting means, control means for controlling the positioning of the setting means to a selected direction position whenever the operative settable element is positioned to represent one set of values and to a reverse direction position when positioned to represent another set of values, manual means for controlling the operation of the control means for positioning said setting means and thereby select the selected direction of operation, and power controlled means jointly operated by said manual means and said control means for positioning said setting means, and a means for enabling said power driven operating means for said setting means and for enabling said restoring means.

2. The apparatus of claim 1 comprising also means operated by said control means when said control means is operated to control said setting means for operation in a reverse direction position in one order and in a selected direction position in the adjacent higher order for modifying the operation of the restoring means and the operative order settable element in a manner to include a single additional cycle of operation in the higher order.

3. The apparatus of claim 1 comprising also means operated by said control means when said control means is operated to control said setting means for operation in a reverse direction position in two adjacent orders for adjusting the operative order settable element in the higher of the two orders to the next lower value position.

4. The apparatus of claim 1 comprising also means operated by said control means when said control means is operated to control said setting means for operation in a reverse direction position in cooperation with the highest order element for providing a single cycle of operation in the selected direction in the adjacent higher order.

5. In a calculating machine having an accumulator, actuating means therefor, means for controlling the sign character of registrations on said accumulator by said actuating means, means for shifting said accumulator relative to said actuating means, and normally inactive settable means for controlling operation of said sign character controlling means; a shiftable plural order multiplication mechanism for controlling successive registering and shifting operations during a multiplying operation comprising ordinally arranged multiplier value elements individually positionable to represent values of "0" and "1" to "9," said elements being settable to directly represent one group of such values and to represent the tens-complement of the remaining values, positionable control means associated with said elements having one position indicative of a value in said one group and a second position representative of the remaining values, a shifting mechanism for shifting said multiplication mechanism, manipulable means for selecting the sign character of a multiplication operation, and means controlled by said manipulable means and said positionable control means for moving said settable means into operative position relative to said sign character controlling means, power driven means rendered effective by operation of said manipulable means for operating said settable means to adjust said sign character controlling means at the beginning of each ordinal multiplying operation, latch means cooperating with said settable means for maintaining said settable means and said sign character controlling means in actuated position, means for enabling said shifting means and said shifting mechanism at the end of each ordinal multiplying operation, means controlled by said enabling means for moving said latch means and said settable means to inactive position during operation of said shifting means, and means activated during the operation of said shifting means for again setting said settable means by said manipulable means and said positionable control means.

6. In a cyclically operable calculating machine having an accumulator, actuating means for said accumulator, means for controlling the sign character of registrations on said accumulator, and means for shifting the relative ordinal positions of said accumulator and said actuating means, a multiplier mechanism operable to control the number of cycles of operation in each order comprising a keyboard having keys for the values of "0" and "1" to "9," inclusive, a shiftable carriage, a plurality of differentially settable control members mounted in said carriage, means for latching said members in their "0" position, means operated by each of said keys for shifting said carriage in one direction, means operated by each of said keys except the "0" key for releasing said latching means associated with a selected member, ordinally arranged series of stop elements mounted in said carriage, each series associated with one of said control members and operable to control the differential positioning of the associated control member, an operation control element associated with each of said control members and operable to control the operation of the machine in a selected or in the reverse direction, means operated by the "1" to "5" keys for setting the corresponding stop element in its operative position and for conditioning the ordinally associated control element for operation in the selected direction, means operated by the "6" to "9" keys for setting the stop element corresponding to the tens-complement of the key operated to its operative position and to condition the ordinally related control element for operation in the reverse direction, manual means for selecting the sign character of a multiplication operation, setting means jointly controlled by the said element in a predetermined ordinal position and said manual means for selectively setting said sign character controlling means, means for restoring the control member in the predetermined ordinal position to "0," means for sensing the "0" position of the member in the predetermined ordinal position, and means operated by said sensing means for shifting the carriage in the other direction to bring another control member into the predetermined ordinal position.

7. In a cyclically operable calculating machine having an accumulator, actuating means for said accumulator, means for controlling the sign character of registrations on said accumulator, and means for shifting the relative ordinal positions of said accumulator and said actuating means, a multiplier mechanism operable to control the number of cycles of operation in each order comprising a keyboard having keys for the values of "0" and "1" to "9," inclusive, a shiftable carriage, a plurality of differentially settable control members mounted in said carriage, means individually latching said members in their "0" position, means operated by each of said keys for shifting said carriage in one direction, means operated by each of said keys except the "0" key for releasing the latching means associated with a predetermined member, ordinally arranged series of stops mounted in said carriage, each series associated with one of said control members and the stops thereof operable when moved to an operative position to control the differential positioning of the associated control member, an operation control element associated with each of said control members and operable to control the operation of the machine in a selected or in the reverse direction, means operated by the "1" to "5" keys for setting the corresponding stop in its operative position and for conditioning the ordinally associated control element for operation in the selected direction, means operated by the "6" to "9" keys for setting the stop corresponding to the tens-complement of the key operated to its operative position and to condition the ordinally related control element for operation in the reverse direction, means operated by the "0" key for setting the stop corresponding to a value of "1" without releasing the latch for the ordinally related control member, a manually operated means for selecting the sign character of a multiplication operation, setting means jointly controlled by the said element in a predetermined ordinal position and said manually operated means for selectively setting said sign character controlling means, means for restoring the control member in the predetermined ordinal position to "0," means for sensing the "0" position of the member in the predetermined ordinal position, means operated by said sensing means for shifting the multiplier carriage in the other direction to bring another control member into the predetermined ordinal position, and means activated during the shifting of said carriage and controlled by the control element in the order being shifted out of the predetermined ordinal position for releasing the latch in the order being shifted into the predetermined ordinal position.

8. In a cyclically operable calculating machine having an accumulator, actuating means for said accumulator, means for controlling the sign character of registrations on said accumulator, and means for shifting the relative ordinal positions of said accumulator and said actuating means, a multiplier mechanism operable to control the number of cycles of operation in each order comprising a keyboard having keys for the values of "0" and "1" to "9," inclusive, a shiftable carriage, a plurality of differentially settable control members mounted in said carriage, means individually latching said members in their "0" position, means operated by each of said keys for shifting said carriage in one direction, means operated by each of said keys except the "0" key for releasing the latching means associated with a predetermined member, ordinally arranged series of stops mounted in said carriage, each series associated with one of said control members and operable when moved to an operative position to control the differential positioning of the associated control member, an operation control element associated with each of said control members and operable to control the operation of the machine in a selected or in the reverse direction, means operated by the "1" to "5" keys for setting the corresponding stop in its operative position and for conditioning the ordinally associated control element for operation in the selected direction, means operated by the "6" to "9" keys for setting the stop corresponding to the tens-complement of the key operated to its operative position and to condition the ordinally related control element for operation in the reverse direction, manual means for selecting the sign character of a multiplication operation, setting means jointly controlled by said manual means and the control element in a predetermined ordinal position for selectively setting said sign character controlling means, a restoring means operable to return the control member in the predetermined ordinal position a single differential step towards its "0" position with each cycle of machine operation, means for sensing the "0" position of the control member in the predetermined ordinal position, means operated by said sensing means for disabling the restoring means and for shifting said carriage one ordinal position in the other direction to bring the adjacent control member into the predetermined ordinal position, means controlled by the control element for disabling the restoring means in the first cycle of operation in the predetermined ordinal position whenever operation in that order is in a selected direction and operation in the preceding order was in the reverse direction, and means for moving the aligned operative member one step towards its "0" position prior to the operation of the restoring means whenever operation in that order is in the reverse direction and operation in the preceding order was in the reverse direction.

9. In a cyclically operable calculating machine for performing multiplication operations, the combination comprising an ordinally arranged accumulator, actuating means therefor, means for shifting the accumulator with respect to said actuating means, means for controlling the sign character of registrations on said accumulator by said actuating means, manual means for selecting the sign character of a multiplication operation, positionable multiplier value elements for registering a multiplier value, means for restoring an operative one of said elements toward "0" with each cycle of an ordinal series of operations, means operated by restoration of the operative one of said elements to its "0" position for operating the shifting means and initiating operations under the control of an adjacent element, setting means for setting said sign character controlling means for operation with a selected sign character when the operative one of said elements registers one set of values and with the reverse sign character when the operative one of said elements registers another set of values, a power-driven operating means for operating said setting means, means for disabling operation of said restoring means for a single cycle of operation whenever the setting means is operated to change the sign character controlling means from operation with the reverse sign character to operation with the selected sign character, and means for operating the restoring means during operation of the shifting means whenever the setting means is operated to change the sign character controlling means after completion of an ordinal series of operations with the reverse sign character.

10. In a calculating machine having an accumulator, a reversible computing means for entering values additively or subtractively into said accumulator, means for selecting the sign character of operation of said computing means, cyclically operable drive means, shifting means for said accumulator having a normally ineffective drive connection with said drive means, a multiplier carriage having ordinal differentially settable members for controlling a plural order multiplying operation, a ten-key keyboard for differentially setting said settable members in succession, normally ineffective shifting mechanism for said multiplier carriage operated by said drive means, means for restoring said differentially settable members sequentially and in step-by-step fashion from their differentially adjusted positions, a normally inoperative drive connection for connecting said restoring means to said drive means, control means for said shifting means and said shifting mechanism, said control means being associated with said multiplier carriage for successive operation by each of said differentially settable members during operation thereof by said restoring means, and manually operable means for enabling the drive connection for said restoring means, for rendering said control means effective with respect to said accumulator shifting means and said shifting mechanism, and for initiating continuous cycles of operation of said drive means, the combination which comprises ordinally arranged control members in said multiplier carriage positionable in one controlling position by one group of value keys and in a second controlling position by another group of value keys, means operated by a control member in said one position for setting said sign character selecting means for operating said computing means with a selected sign character and by the control member in said second position for setting said sign character selection means for operating said computing means with the reverse sign character.

11. In a calculating machine having an accumulator, a reversible computing means for entering values additively or subtractively into said accumulator, means for selecting the sign character of operation of said computing means, cyclically operable drive means, shifting means for said accumulator having a normally ineffective drive connection with said drive means, a multiplier carriage having ordinally arranged settable members for controlling a plural order multiplying operation, a ten-key keyboard for positioning said settable members in succession, normally ineffective shifting mechanism for said multiplier carriage operated by said drive means, means for restoring the settable member of an operative order in step-by-step fashion from its adjusted position, a normally inoperative drive connection for connecting said restoring means to said drive means, control means for said shifting means and said shifting mechanism, said control means being associated with said multiplier carriage for successive operation by each of said settable members during operation thereof by said restoring means, and manually operable means for enabling the drive connection for said restoring means, for rendering said control means effective with respect to said accumulator shifting means and said shifting mechanism, and for initiating continuous cycles of operation of said drive means, the combination which comprises ordinally arranged positionable control members mounted in said carriage, means operated by one group of keys for controlling the position of the control members to one operative position and by another group of keys to another operative position, means for sensing the position of the control member of the operative order, and means operated by said sensing means for operating the sign character selecting means to determine the sign character of operation in the operative order.

12. In a calculating machine having an accumulator, computing means for entering values additively or subtractively into said accumulator, means for selecting the sign character of operation of said computing means, cyclically operable drive means, shifting means for said accumulator having a normally ineffective drive connection with said drive means, a multiplier carriage having ordinally arranged settable value members for controlling a plural order multiplying operation, a ten-key keyboard for setting said settable members in succession, normally ineffective shifting mechanism for said multiplier carriage operated by said drive means, means for restoring the settable value member of an operative order in step-by-step fashion from its adjusted position, a normally inoperative drive connection for connecting said restoring means to said drive means, control means for said shifting means and said shifting mechanism, said control means being associated with said multiplier carriage for successive operation by each of said settable value members during operation thereof by said restoring means, and manually operable means for enabling the drive connection for said restoring means, for rendering said control means effective with respect to said accumulator shifting means and said shifting mechanism, and for initiating continuous cycles of operation of said drive means, the combination which comprises ordinally arranged positionable control members mounted in said carriage, means operated by the control member of the operative order for setting the sign character selecting means to determine the sign character of multiplication operation to a selected sign character or alternatively to the reverse sign character, and means operated by one group of keys for controlling the position of the control members to a selected sign character position and by another group of keys for controlling the position of the control members to a reverse sign character position.

13. In a calculating machine having an accumulator, computing means for entering values additively or subtractively into said accumulator, means for selecting the sign character of operation of said computing means, cyclically operable drive means, shifting means for said accumulator having a normally ineffective drive connection with said drive means, a multiplier carriage having ordinally arranged settable value members for controlling a plural order multiplying operation, a ten-key keyboard for serially positioning said settable members, normally ineffective shifting mechanism for said multiplier carriage operated by said drive means, means for restoring the settable member of an operative order in step-by-step fashion from its adjusted position, a normally inoperative drive connection for connecting said restoring means to said drive means, control means for said shifting means and said shifting mechanism, said control means being associated with said multiplier carriage for successive operation by each of said settable members during operation thereof by said restoring means, and manually operable means for enabling the drive connection for said restoring means, for rendering said control means effective with respect to said accumulator shifting means and said shifting mechanism, and for initiating continuous cycles of operation of said drive means, the combination which comprises ordinally arranged positionable control members mounted in said carriage, means operated by one group of keys for controlling the position of the control members to one operative position and by another group of keys to another operative position, means for sensing the position of the control member of the operative order, means operated by said sensing means for operating said sign character selecting means to control the computing means for a selected sign character operation or for the reverse sign character operation, and means operated by the sensing means for disabling the restoring means for a single cycle of machine operation whenever the sensing means is operated to change from a reverse sign character operation to a selected sign character operation and to adjust the higher order settable member to eliminate a single cycle of machine operation whenever the sensing means is operated to cause a reverse sign character operation in two adjacent orders.

14. In a calculating machine for performing shortcut multiplication and having an accumulator, actuating mechanism including a reversing means for reversibly operating said accumulator and positionable sign character control means for operating said reversing means, means for shifting said accumulator relative to said actuating means, and power-driven means for cyclically operating said actuating means and said shifting means; the combination which comprises a shiftable multiplier storage mechanism having a plurality of ordinally arranged and differentially settable elements for controlling multiplying operations, means for restoring the settable element of an operative order progressively to "0" position, mechanism for shifting said multiplier storage mechanism, means responsive to the restoration of the settable element in the operative order to "0" position to control operation of said shifting means and said shifting mechanism, means for setting said sign character control means in either sign character controlling position, power-driven means for operating said setting means, a positive multiplication key and a negative multiplication key for selecting the sign character of a multiplication operation, sensing means for sensing a lower set of values position or a higher set of values position of the settable element of the operative order, and power-operated means jointly controlled by said keys and said sensing means for operating said setting means, and a means operated by said keys for enabling said power-driven operating means for said setting means and for enabling said restoring means.

15. In a calculating machine for performing shortcut multiplication and having an accumulator, actuating mechanism including a reversing means for reversibly operating said accumulator, means for shifting said accumulator relative to said actuating mechanism, sign character control means for adjusting the reversing means to operate said accumulator additively or substractively, and power-driven means for cyclically operating said actuating means and said shifting means; the combination which comprises a shiftable multiplier storage mechanism having a plurality of ordinally arranged and differentially settable elements for controlling multiplying operations, a ten-key keyboard for positioning said settable elements differentially for values of one magnitude and to the tens-complement of values of another magnitude, means for restoring the settable element of an operative order progressively to "0" position, mechanism for shifting said multiplier storage mechanism, means responsive to restoration of a settable element to "0" position for operating said shifting means and said shifting mechanism, a plurality of ordinally arranged positionable members associated with said settable elements, means operated by the value keys of said one magnitude for positioning the positionable members in one controlling position and by the value keys of the said other magnitude in a second controlling position, means for sensing the position of the positionable member in the operative order, means controlled by said sensing means for setting said sign character control means for operation with a selected sign character or with a reverse sign character, power-driven means for operating said setting means, manual means for selecting the sign character of a multiplication operation, and a means for enabling said power-driven operating means for said setting means and for enabling said restoring means.

16. A calculating machine comprising an accumulator, computing means for entering values additively or subtractively into said accumulator, means for selecting the sign character of operation of said computing means, cyclically operable drive means, shifting means for said accumulator having a normally ineffective drive connection with said drive means, a multiplier carriage having ordinally arranged settable members for controlling a plural order multiplying operation, a ten-key keyboard for positioning said members differentially for values of one magnitude and to the tens-complement of values of another magnitude, a plurality of ordinally arranged settable control elements in said multiplier carriage, means operated by the keys for positioning said control elements in one position upon operation of the ordinally cooperative settable member to represent values of said one magnitude and in another position upon operation of the ordinally cooperative member to represent values of said other magnitude, normally ineffective shifting mechanism for said multiplier carriage operated by said drive means, means for restoring said settable members sequentially and in step-by-step fashion from their adjusted positions, a normally inoperative drive connection for connecting said restoring means to said drive means, control means operated by the return of a settable member to its original position for operating said shifting means and said shifting mechanism and manually operable means for selecting the sign character of a multiplication operation, setting means jointly controlled by said control elements and said manual means for selectively setting said sign character selecting means, and means for initiating a multiplying operation, for activating said setting means, and for enabling said cyclically operable drive means.

17. In a calculating machine for performing multiplication operations having an accumulator, reversible actuating means therefor, means for controlling the sign character of registrations on said accumulator by said actuating means, mechanism for shifting said accumulator relative to said actuating means, normally inactive means for setting said sign character controlling means, operating means for moving said inactive setting means into operative position relative to said sign character controlling means, power-driven means for cyclically operating said actuating means and for operating said operating means, a shiftable multiplier storage mechanism having ordinally arranged multiplier value elements for registering a plural digit multiplier value, a ten-key keyboard for setting the elements to a value position, means for shifting said storage mechanism to bring successive elements into operative position, means driven by said power means for incrementally restoring the element in the operative position from its adjusted value position toward its "0" value position during the cyclic operation of said actuating means, means controlled by the restoration of the element in the operative position to its "0" value position for controlling the operation of the actuating means, said shifting mechanism and said shifting means, and manual means including a positive multiply key and a negative multiply key for selecting the sign character of a multiplication operation, the combination which comprises means operated by the keys of said keyboard for sequentially setting said elements differentially for a multiplier value of "1" to "5" and the tens-complement of a multiplier value of "6" to "9," positionable control means associated with said elements and operated by the keys of said keyboard having one position indicative of a value of "1" to "5" and a second position indicative of a value of "6" to "9," and means controlled by said positionable control means for controlling the operation of the setting means by said operating means in accordance with the sign character determined by said positive or negative multiply keys whenever the said positionable control means is in said one position and for controlling the operation of the setting means by said operating means in the opposite sign character whenever said control means is in said second position.

18. In a calculating machine for performing multiplication operations having an accumulator, reversible actuating means therefor, means for controlling the sign character of registrations on said accumulator by said actuating means, mechanism for shifting said accumulator relative to said actuating means, normally inactive means for setting said sign character controlling means, operating means for moving said inactive setting means into operative position relative to said sign character controlling means, power-driven means for cyclically operating the actuating means and the operating means, a shiftable multiplier storage mechanism including ordinally arranged multiplier value elements for registering a plural digit multiplier value, means for shifting said storage mechanism to bring successive elements into an operative ordinal position, means driven by said power means for incrementally restoring the element in an operative ordinal position from its adjusted value position toward its "0" value position in step-by-step fashion simultaneously with the cyclic operation of the actuating means, means controlled by the restoration of the element in the operative ordinal position to its "0" value position for controlling the operation of the actuating means and the shifting means and mechanism, and manual means including a positive multiply key and a negative multiply key for selecting the sign character of a multiplication operation, the combination which comprises means for sequentially setting said elements differentially to correspond to the values "1" to "5" and the tens-complement of the values "6" to "9," positionable control means associated with said elements having one position indicative of a value of "1" to "5" and a second position indicative of a value of "6" to "9," means controlled by the positionable control means in the operative ordinal position for controlling the operation of the setting means by said operating means in accordance with the sign character determined by said keys whenever the said positionable control means in the operative ordinal position is in said one position and for controlling the operation of the setting means by said operating means in the opposite sign character whenever said control means is in said second position, and means for disabling operation of said restoring means for a single cycle whenever the positionable control means moves from its second position to its first position between two sequential series of ordinal operations.

19. In a calculating machine for performing multiplication operations having an accumulator, actuating means therefor, means for controlling the sign character of registrations on said accumulator by said actuating means, mechanism for shifting said accumulator relative to said actuating means, normally inactive means for setting said sign character controlling means, operating means for moving said inactive setting means into operative position relative to said sign character controlling means, power-driven means for cyclically operating the actuating means and said operating means, a shiftable multiplier storage mechanism including ordinally arranged multiplier value elements for registering a plural digit multiplier value, means for shifting said storage mechanism to bring successive elements into an operative ordinal position, means driven by said power means in cyclic synchronism with said actuating means for restoring the element in an operative ordinal position from its adjusted value position to its "0" value position in step-by-step fashion in each successive ordinal series of operations, means controlled by the restoration of the element in the operative ordinal position to its "0" value position for controlling the operation of the actuating means and the shifting means and mechanism and manual means including a positive multiply key and a negative multiply key for selecting the sign character of a multiplication operation, the combination which comprises means for sequentially setting said elements differentially to correspond to the values of "1" to "5" and the tens-complement of values of "6" to "9," positionable control means associated with said elements having one position indicative of a value of "1" to "5" and a second position indicative of a value of "6" to "9," means controlled by the positionable control means in the operative ordinal position for controlling the operation of the setting means by said operating means in accordance with the sign character determined by said keys whenever the said positionable control means in the operative ordinal position is in said one position and for controlling the operation of the setting means by said operating means in the opposite sign character whenever said control means is in said second position, an auxiliary restore means for restoring the element being shifted into an operative position a single increment during a shifting operation whenever the positionable control means remains in the second position in a second ordinal series of operations, and thereby reduce by "1" the number of cycles controlled by the element being shifted into the operative ordinal position in such an event.

20. In a calculating machine for performing multiplication operations having an accumulator, reversible actuating means therefor, means for controlling the sign character of registrations on said accumulator by said actuating means, mechanism for shifting said accumulator relative to said actuating means, normally inactive means for setting said sign character controlling means, operating means for moving said inactive setting means into operative position relative to said sign character controlling means, power-driven means for cyclically operating the actuating means and for operating said operating means, a shiftable multiplier storage mechanism including ordinally arranged multiplier value elements for registering a plural digit multiplier value, means for shifting said storage mechanism to bring successive elements into an operative ordinal position, means driven by said power means in cyclic synchronism with said actuating means for restoring the element in the operative ordinal position from its adjusted value position to its "0" value position in step-by-step fashion in each successive ordinal series of operations, means controlled by the restoration of the element in the operative ordinal position to a "0" value position for controlling the operation of the actuating means, said shifting means and said shifting mechanism, and manual means including a positive multiply key and a negative multiply key for selecting the sign character of a multiplication operation, the combination which comprises means for setting said elements differentially to correspond to the values of "1" to "5" and the tens-complement of the values of "6" to "9," positionable control means associated with said elements having one position indicative of a value of "1" to "5" and a second position indicative of a value of "6" to "9,"

means controlled by the positionable control means in the operative ordinal position for controlling the operation of the setting means by said operating means in accordance with the sign character determined by said keys whenever the said positionable control means in the operative ordinal position is in said one position and for controlling the operation of the setting means by said operating means in the opposite sign character whenever said control means is in said second position, and means for operating said shifting mechanism and said shifting means and for providing a single cycle of operation in the shifted position of said accumulator and said multiplier storage mechanism whenever the positionable control means is in its second position in the highest order of said elements.

21. In a cyclically operable calculating machine for performing multiplication operations, the combination comprising an ordinally shiftable accumulator, a mechanism for shifting the accumulator, actuating means for the accumulator, means for controlling the sign character of registrations on said accumulator by said actuating means, manual means for selecting the sign character of a multiplication operation, ordinally arranged multiplier value elements for registering a multiplier value, means for setting said elements differentially to represent a lower set of values and in a tens-complement position to represent a higher set of values, means for restoring incrementally to "0" position the element in an operative order, means responsive to the restoration of a settable element to "0" position to terminate operation of said actuating means in that order, means for shifting the relative position of the elements with respect to the means for restoring said elements to cause the adjacent element to become the next operative element, means operated by said responsive means at the conclusion of the series of cyclic operations in the operative order for operating said shifting mechanism and said shifting means, setting means jointly controlled by the next operative element and said manual means for setting said sign character controlling means during operation of the shifting means, and means operated by operation of the shifting means for restoring the next operative element one increment and thereby deduct a cycle of operation in the next ordinal series of operations whenever the last operative element and next operative element are representative of a higher set of values and to disable said restoring means for one cycle and thereby add a cycle of operation in the next ordinal series of operations whenever the last operative element was representative of a higher set of values and the next operative element is representative of a lower set of values.

References Cited in the file of this patent

UNITED STATES PATENTS

| | | |
|---|---|---|
| 1,205,481 | Rechnitzer | Nov. 21, 1916 |
| 1,409,575 | Rechnitzer | Mar. 14, 1922 |
| 1,922,971 | Mez | Aug. 15, 1933 |
| 2,170,406 | Hamann | Aug. 22, 1939 |
| 2,215,263 | Eichler | Sept. 17, 1940 |
| 2,371,752 | Friden | Mar. 20, 1945 |
| 2,374,333 | Crosman | Apr. 24, 1945 |
| 2,379,877 | Britten | July 10, 1945 |
| 2,397,745 | Kiel | Apr. 2, 1946 |
| 2,611,539 | Toorell | Sept. 23, 1952 |
| 2,706,082 | Lydfors | Apr. 12, 1955 |

FOREIGN PATENTS

| | | |
|---|---|---|
| 509,747 | Great Britain | July 20, 1939 |

UNITED STATES PATENT OFFICE
CERTIFICATION OF CORRECTION

Patent No. 2,933,247                              April 19, 1960

Grant C. Ellerbeck

It is hereby certified that error appears in the above numbered patent requiring correction and that the said Letters Patent should read as corrected below.

Column 2, line 43, for "multiplications" read -- multiplication --; line 45, for "substraction" read -- subtraction --; column 10, line 14, for "permitt he" read -- permit the --; column 11, line 44, strike out "to"; column 16, line 30, for "49" read -- 449 --; column 20, line 26, after "530" strike out the comma; column 21, line 51, for "carrier" read -- carries --; column 23, line 64, for "palne" read -- plane --; column 31, line 27, for "inter-ponents" read -- interponents --; column 34, line 4, for "line" read -- link --; line 33, for "rgiht" read -- right --; column 41, line 35, for the syllable "troll" read -- trol --; column 46, line 17, for "position,," read -- position, --; column 48, line 70, for "sending" read -- sensing --; column 50, line 2, for "desicribed" read -- described --; column 51, line 39, for "lifted" read -- shifted --; column 52, line 36, for "frameplate" read -- frame plate --; column 54, line 56, for "pins" read -- pin --; column 56, line 12, after "of" insert -- the --; column 57, line 20, for "enable" read -- enabled --; line 31, for "its" read -- it --; line 65, for "connection" read -- connecting --; column 58, line 69, for "being" read -- begins --; column 62, line 74, for "Figure" read -- Fig. --; column 65, line 11, for "valve" read -- value --; line 46, after "trip" insert -- the --; column 71, line 13, for "operations" read -- operation --; line 29, after "is" insert -- not --; same column 71, line 71, and column 73, line 68, for "substractively", each occurrence, read -- subtractively --.

Signed and sealed this 25th day of April 1961.

(SEAL)
Attest:

ERNEST W. SWIDER
Attesting Officer

DAVID L. LADD
Commissioner of Patents